(12) United States Patent
Cockerill et al.

(10) Patent No.: US 12,081,540 B2
(45) Date of Patent: *Sep. 3, 2024

(54) CONFIGURING ACCESS TO A NETWORK SERVICE BASED ON A SECURITY STATE OF A MOBILE DEVICE

(71) Applicant: Lookout, Inc., Boston, MA (US)

(72) Inventors: Aaron Cockerill, Los Gatos, CA (US);
David Richardson, Moraga, CA (US);
Daniel Thanos, Burlington, CA (US);
William Neil Robinson, Brentwood, CA (US); Brian James Buck, Livermore, CA (US); Kevin Patrick Mahaffey, San Francisco, CA (US)

(73) Assignee: Lookout, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/307,332

(22) Filed: May 4, 2021

(65) Prior Publication Data
US 2021/0258304 A1   Aug. 19, 2021

Related U.S. Application Data

(63) Continuation of application No. 16/241,504, filed on Jan. 7, 2019, now Pat. No. 11,038,876, which is a
(Continued)

(51) Int. Cl.
*H04L 9/40* (2022.01)

(52) U.S. Cl.
CPC ...... *H04L 63/0853* (2013.01); *H04L 63/0823* (2013.01); *H04L 63/083* (2013.01);
(Continued)

(58) Field of Classification Search
CPC ............ H04L 63/0853; H04L 63/205; H04L 63/0823; H04L 63/083; H04L 63/0876;
(Continued)

(56) References Cited

U.S. PATENT DOCUMENTS 3,416,032 A   12/1968   Jahns et al.
4,553,257 A   11/1985   Mori et al.
(Continued)

FOREIGN PATENT DOCUMENTS

CN   103167488   6/2013
EP   0965094   12/1999
(Continued)

OTHER PUBLICATIONS

Min, Byungho, and Vijay Varadharajan. "Secure dynamic software loading and execution using cross component verification." 2015 45th Annual IEEE/IFIP International Conference on Dependable Systems and Networks. IEEE, 2015.*
(Continued)

*Primary Examiner* — David Garcia Cervetti
(74) *Attorney, Agent, or Firm* — Greenberg Traurig

(57) ABSTRACT

In one approach, a first computing device receives a request from a second computing device. The request is for access by the second computing device to a service provided by a third computing device over a network. In response to receiving the request, the first computing device performs a security evaluation of the second computing device. The evaluation determines a risk level. The first computing device generates, based on the evaluation, a token for the second computing device. The token includes data encoding the risk level. The token is sent to the second computing device and/or third computing device. The sent data is used to configure the service provided to the second computing device.

21 Claims, 11 Drawing Sheets

Related U.S. Application Data continuation of application No. 15/619,356, filed on Jun. 9, 2017, now Pat. No. 10,218,697.

(52) U.S. Cl.
CPC ........ *H04L 63/0876* (2013.01); *H04L 63/105* (2013.01); *H04L 63/12* (2013.01); *H04L 63/1433* (2013.01); *H04L 63/1441* (2013.01)

(58) Field of Classification Search
CPC ... H04L 63/105; H04L 63/12; H04L 63/1433; H04L 63/102; H04L 63/1441; H04L 63/107; H04L 63/10; H04L 67/00; H04L 63/20; H04L 67/10015; H04W 12/60; H04W 12/63; H04W 12/08; G06F 21/57
See application file for complete search history.

(56) References Cited

U.S. PATENT DOCUMENTS

| | | |
|---|---|---|
| 5,319,776 A | 6/1994 | Hile et al. |
| 5,574,775 A | 11/1996 | Miller, II et al. |
| 5,715,518 A | 2/1998 | Barrere et al. |
| 6,092,194 A | 7/2000 | Touboul |
| 6,167,520 A | 12/2000 | Touboul |
| 6,185,689 B1 | 2/2001 | Todd, Sr. et al. |
| 6,269,456 B1 | 7/2001 | Hodges et al. |
| 6,272,353 B1 | 8/2001 | Dicker et al. |
| 6,301,668 B1 | 10/2001 | Gleichauf et al. |
| 6,453,345 B2 | 9/2002 | Trcka et al. |
| 6,476,828 B1 | 11/2002 | Burkett et al. |
| 6,480,962 B1 | 11/2002 | Touboul |
| 6,502,131 B1 | 12/2002 | Vaid et al. |
| 6,529,143 B2 | 3/2003 | Mikkola et al. |
| 6,658,393 B1 | 12/2003 | Basch et al. |
| 6,696,941 B2 | 2/2004 | Baker |
| 6,707,476 B1 | 3/2004 | Hochstedler |
| 6,748,195 B1 | 6/2004 | Phillips |
| 6,792,543 B2 | 9/2004 | Pak et al. |
| 6,804,780 B1 | 10/2004 | Touboul |
| 6,892,225 B1 | 5/2005 | Tu et al. |
| 6,907,530 B2 | 6/2005 | Wang |
| 6,959,184 B1 | 10/2005 | Byers et al. |
| 7,020,895 B2 | 3/2006 | Albrecht |
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,139,820 B1 * | 11/2006 | O'Toole, Jr. ......... H04L 63/123 701/472 |
| 7,152,244 B2 | 12/2006 | Toomey |
| 7,159,036 B2 | 1/2007 | Hinchliffe et al. |
| 7,159,237 B2 | 1/2007 | Schneier et al. |
| 7,171,690 B2 | 1/2007 | Kouznetsov et al. |
| 7,178,166 B1 | 2/2007 | Taylor et al. |
| 7,181,225 B1 | 2/2007 | Moton, Jr. et al. |
| 7,181,252 B2 | 2/2007 | Komsi |
| 7,203,909 B1 | 4/2007 | Horvitz et al. |
| 7,210,168 B2 | 4/2007 | Hursey et al. |
| 7,228,566 B2 | 6/2007 | Caceres et al. |
| 7,231,427 B1 | 6/2007 | Du |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,266,845 B2 | 9/2007 | Hypponen |
| 7,290,276 B2 | 10/2007 | Ogata |
| 7,304,570 B2 | 12/2007 | Thomas et al. |
| 7,305,245 B2 | 12/2007 | Alizadeh-Shabdiz et al. |
| 7,308,256 B2 | 12/2007 | Morota et al. |
| 7,308,712 B2 | 12/2007 | Banzhof |
| 7,325,249 B2 | 1/2008 | Sutton, Jr. et al. |
| 7,346,605 B1 | 3/2008 | Hepworth et al. |
| 7,355,981 B2 * | 4/2008 | Jorgenson ............. H04L 41/142 370/252 |
| 7,356,835 B2 | 4/2008 | Gancarcik et al. |
| 7,363,500 B2 | 4/2008 | Funk |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,397,424 B2 | 7/2008 | Houri |
| 7,397,434 B2 | 7/2008 | Mun et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,415,536 B2 | 8/2008 | Nakazawa |
| 7,433,694 B2 | 10/2008 | Morgan et al. |
| 7,437,158 B2 | 10/2008 | Russell |
| 7,464,407 B2 | 12/2008 | Nakae et al. |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,493,403 B2 | 2/2009 | Shull et al. |
| 7,502,620 B2 | 3/2009 | Morgan et al. |
| 7,515,578 B2 | 4/2009 | Alizadeh-Shabdiz et al. |
| 7,525,541 B2 | 4/2009 | Chun et al. |
| 7,526,297 B1 | 4/2009 | Holur et al. |
| 7,539,882 B2 | 5/2009 | Jessup et al. |
| 7,551,579 B2 | 6/2009 | Alizadeh-Shabdiz et al. |
| 7,551,929 B2 | 6/2009 | Alizadeh-Shabdiz et al. |
| 7,568,220 B2 | 7/2009 | Burshan |
| 7,610,273 B2 | 10/2009 | Kuppusamy et al. |
| 7,634,800 B2 | 12/2009 | Ide et al. |
| 7,640,585 B2 | 12/2009 | Lee et al. |
| 7,685,132 B2 | 3/2010 | Hyman |
| 7,685,629 B1 | 3/2010 | White et al. |
| 7,696,923 B2 | 4/2010 | Houri |
| 7,761,583 B2 | 7/2010 | Shull et al. |
| 7,768,963 B2 | 8/2010 | Alizadeh-Shabdiz |
| 7,769,396 B2 | 8/2010 | Alizadeh-Shabdiz et al. |
| 7,774,637 B1 | 8/2010 | Beddoe et al. |
| 7,783,281 B1 | 8/2010 | Cook et al. |
| 7,809,353 B2 | 10/2010 | Brown et al. |
| 7,809,366 B2 | 10/2010 | Rao et al. |
| 7,809,936 B2 | 10/2010 | Einloth et al. |
| 7,813,745 B2 | 10/2010 | Li |
| 7,818,017 B2 | 10/2010 | Alizadeh-Shabdiz et al. |
| 7,818,800 B1 | 10/2010 | Lemley, III et al. |
| 7,835,754 B2 | 11/2010 | Alizadeh-Shabdiz et al. |
| 7,856,234 B2 | 12/2010 | Alizadeh-Shabdiz et al. |
| 7,856,373 B2 | 12/2010 | Ullah |
| 7,861,303 B2 | 12/2010 | Kouznetsov et al. |
| 7,865,937 B1 | 1/2011 | White et al. |
| 7,877,784 B2 | 1/2011 | Chow et al. |
| 7,882,247 B2 | 2/2011 | Sturniolo et al. |
| 7,882,557 B2 | 2/2011 | Coskun et al. |
| 7,907,966 B1 | 3/2011 | Mammen |
| 7,916,661 B2 | 3/2011 | Alizadeh-Shabdiz et al. |
| 7,978,691 B1 | 7/2011 | Cole |
| 7,991,854 B2 | 8/2011 | Bahl |
| 7,999,742 B2 | 8/2011 | Alizadeh-Shabdiz |
| 8,001,610 B1 | 8/2011 | Chickering et al. |
| 8,014,788 B2 | 9/2011 | Alizadeh-Shabdiz et al. |
| 8,019,357 B2 | 9/2011 | Alizadeh-Shabdiz et al. |
| 8,024,711 B2 | 9/2011 | Albahari et al. |
| 8,031,657 B2 | 10/2011 | Jones et al. |
| 8,037,203 B2 | 10/2011 | Accapadi et al. |
| 8,042,178 B1 | 10/2011 | Fisher et al. |
| 8,054,219 B2 | 11/2011 | Alizadeh-Shabdiz |
| 8,087,067 B2 | 12/2011 | Mahaffey et al. |
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz et al. |
| 8,091,120 B2 | 1/2012 | Perrella et al. |
| 8,095,172 B1 | 1/2012 | Cole et al. |
| 8,099,764 B2 | 1/2012 | Herzog et al. |
| 8,108,555 B2 | 1/2012 | Awadallah et al. |
| 8,108,933 B2 | 1/2012 | Mahaffey |
| 8,112,797 B2 | 2/2012 | Coskun et al. |

(56) References Cited

U.S. PATENT DOCUMENTS

| | | |
|---|---|---|
| 8,121,617 B1 | 2/2012 | LaGrotta et al. |
| 8,126,456 B2 | 2/2012 | Lotter et al. |
| 8,126,866 B1 | 2/2012 | Barton et al. |
| 8,127,158 B2 | 2/2012 | Jessup et al. |
| 8,127,350 B2 | 2/2012 | Wei et al. |
| 8,127,358 B1 | 2/2012 | Lee |
| 8,135,395 B2 | 3/2012 | Cassett et al. |
| 8,151,327 B2 | 4/2012 | Eisen |
| D659,157 S | 5/2012 | Klein et al. |
| 8,195,196 B2 | 6/2012 | Haran et al. |
| 8,200,773 B2 | 6/2012 | Bluestone et al. |
| D664,430 S | 7/2012 | Kelly et al. |
| 8,214,910 B1 | 7/2012 | Gossweiler, III et al. |
| 8,225,103 B2 | 7/2012 | Chiou et al. |
| 8,228,234 B2 | 7/2012 | Paulson et al. |
| 8,229,392 B2 | 7/2012 | Bumiller et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,271,056 B2 | 9/2012 | Keohane et al. |
| 8,275,345 B2 | 9/2012 | Bumiller et al. |
| D671,132 S | 11/2012 | Woo |
| 8,321,949 B1 | 11/2012 | Green et al. |
| 8,332,922 B2 | 12/2012 | Dickinson et al. |
| 8,346,860 B2 | 1/2013 | Berg et al. |
| 8,347,386 B2 | 1/2013 | Mahaffey et al. |
| 8,352,738 B2 | 1/2013 | Parno et al. |
| 8,356,080 B2 | 1/2013 | Luna et al. |
| 8,359,016 B2 | 1/2013 | Lindeman et al. |
| 8,364,785 B2 | 1/2013 | Plamondon |
| 8,365,252 B2 | 1/2013 | Mahaffey et al. |
| 8,370,580 B2 | 2/2013 | Mobarak et al. |
| 8,370,933 B1 | 2/2013 | Buckler |
| 8,370,942 B1 | 2/2013 | Peterson et al. |
| D677,688 S | 3/2013 | Woo |
| 8,397,301 B2 | 3/2013 | Hering et al. |
| 8,401,521 B2 | 3/2013 | Bennett et al. |
| D680,131 S | 4/2013 | Anzures |
| 8,412,626 B2 | 4/2013 | Hirson et al. |
| 8,434,151 B1 | 4/2013 | Franklin |
| 8,447,856 B2 | 5/2013 | Drako |
| 8,452,956 B1 | 5/2013 | Kersey et al. |
| 8,463,915 B1 | 6/2013 | Kim |
| 8,464,335 B1 | 6/2013 | Sinha et al. |
| 8,467,768 B2 | 6/2013 | Mahaffey et al. |
| 8,484,332 B2 | 7/2013 | Bush et al. |
| 8,484,460 B1 | 7/2013 | Vaughn et al. |
| 8,504,775 B2 | 8/2013 | Plamondon |
| 8,505,102 B2 | 8/2013 | Cannings et al. |
| 8,521,131 B1 | 8/2013 | Ramalingam et al. |
| 8,533,844 B2 | 9/2013 | Mahaffey et al. |
| 8,538,815 B2 | 9/2013 | Mahaffey et al. |
| 8,561,144 B2 | 10/2013 | Mahaffey et al. |
| 8,588,870 B1 | 11/2013 | Vargantwar |
| 8,589,691 B1 | 11/2013 | Hackborn et al. |
| 8,627,476 B1* | 1/2014 | Satish .............. G06F 21/51 713/187 |
| 8,635,701 B2 | 1/2014 | Hilaiel et al. |
| 8,650,558 B2 | 2/2014 | DePoy |
| 8,650,649 B1 | 2/2014 | Chen et al. |
| 8,655,307 B1 | 2/2014 | Walker et al. |
| 8,677,497 B2 | 3/2014 | Basavapatna |
| 8,683,605 B1 | 3/2014 | Tenenboym et al. |
| 8,701,192 B1 | 4/2014 | Glick et al. |
| 8,738,765 B2 | 5/2014 | Wyatt et al. |
| 8,739,260 B1 | 5/2014 | Damm-Goossens |
| 8,756,432 B1 | 6/2014 | Chen et al. |
| 8,806,641 B1 | 8/2014 | Li et al. |
| 8,806,643 B2 | 8/2014 | Nachenberg |
| 8,806,647 B1 | 8/2014 | Daswani et al. |
| 8,806,657 B2 | 8/2014 | Mimatsu et al. |
| 8,814,650 B2 | 8/2014 | Cockerille et al. |
| 8,819,769 B1* | 8/2014 | van Dijk .............. H04L 67/303 726/1 |
| 8,819,803 B1* | 8/2014 | Richards .............. H04L 63/1483 709/224 |
| 8,843,627 B1 | 9/2014 | Baldi et al. |
| 8,843,752 B1* | 9/2014 | Priyadarshi .......... H04L 63/0823 713/168 |
| 8,868,915 B2* | 10/2014 | Counterman .......... H04L 63/062 713/176 |
| 8,869,259 B1 | 10/2014 | Udapa et al. |
| 8,869,279 B2 | 10/2014 | Shulman et al. |
| 8,914,893 B2 | 12/2014 | Zhao et al. |
| 8,949,243 B1 | 2/2015 | Kashyap et al. |
| 8,949,993 B2 | 2/2015 | Basavapatna |
| 8,950,002 B2 | 2/2015 | Radhakrishnan et al. |
| 8,973,088 B1 | 3/2015 | Leung et al. |
| 8,984,604 B2 | 3/2015 | Begley et al. |
| 8,990,933 B1 | 3/2015 | Magdalin |
| 8,997,181 B2 | 3/2015 | Mahaffey et al. |
| 8,997,231 B2 | 3/2015 | Karta et al. |
| 9,069,943 B2 | 6/2015 | Radhakrishnan et al. |
| 9,112,896 B2 | 8/2015 | Basavapatna et al. |
| 9,159,065 B2 | 10/2015 | Radhakrishnan |
| 9,166,966 B2 | 10/2015 | Radhakrishnan |
| 9,197,606 B2 | 11/2015 | Deschenes et al. |
| 9,208,215 B2 | 12/2015 | Mahaffey et al. |
| 9,215,074 B2 | 12/2015 | Wyatt et al. |
| 9,232,491 B2 | 1/2016 | Mahaffey |
| 9,288,223 B2 | 3/2016 | Sharabani et al. |
| 9,294,284 B1 | 3/2016 | Mao |
| 9,298,494 B2 | 3/2016 | Gathala et al. |
| 9,349,015 B1 | 5/2016 | Archer et al. |
| 9,367,680 B2 | 6/2016 | Mahaffey et al. |
| 9,378,373 B2 | 6/2016 | Sobel |
| 9,407,443 B2 | 8/2016 | Wyatt et al. |
| 9,407,640 B2 | 8/2016 | Mahaffey et al. |
| 9,495,194 B1* | 11/2016 | Twitchell, Jr. .......... G06F 3/067 |
| 9,503,463 B2 | 11/2016 | Karta et al. |
| 9,537,886 B1 | 1/2017 | Gareau |
| 9,589,129 B2 | 3/2017 | Richardson et al. |
| 9,591,003 B2 | 3/2017 | Johansson et al. |
| 9,602,531 B1 | 3/2017 | Wallace et al. |
| 9,609,020 B2* | 3/2017 | White .................... G06F 21/51 |
| 9,635,028 B2 | 4/2017 | Shepard et al. |
| 9,736,147 B1* | 8/2017 | Mead .................... G06F 21/31 |
| 9,787,681 B2* | 10/2017 | Clancy, III .............. H04L 63/10 |
| 9,824,353 B2 | 11/2017 | Li ...................... H04W 12/0433 |
| 9,867,043 B2* | 1/2018 | Aissi .................... H04W 12/35 |
| 9,894,099 B1 | 2/2018 | Jacobsen et al. |
| 9,940,454 B2 | 4/2018 | Richardson et al. |
| 9,948,744 B1* | 4/2018 | Billau .................. H04L 67/303 |
| 9,992,025 B2 | 6/2018 | Mahaffey et al. |
| 10,218,697 B2 | 2/2019 | Cockerill et al. |
| 10,225,740 B2* | 3/2019 | Bansal .................. H04L 67/56 |
| 10,256,979 B2 | 4/2019 | Mahaffey et al. |
| 10,387,269 B2* | 8/2019 | Muller .................. G06F 16/185 |
| 10,409,984 B1* | 9/2019 | McCauley .............. G06F 21/55 |
| 10,419,222 B2 | 9/2019 | Mahaffey et al. |
| 10,540,494 B2 | 1/2020 | Richardson et al. |
| 10,652,024 B2* | 5/2020 | Holness ................ H04L 43/10 |
| 10,715,542 B1* | 7/2020 | Wei ...................... G06F 16/958 |
| 11,038,876 B2 | 6/2021 | Cockerill et al. |
| 11,259,183 B2 | 2/2022 | Richardson et al. |
| 11,336,458 B2 | 5/2022 | Mahaffey et al. |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0087882 A1 | 7/2002 | Schneier et al. |
| 2002/0108005 A1 | 8/2002 | Larson et al. |
| 2002/0108058 A1 | 8/2002 | Iwamura |
| 2002/0157019 A1 | 10/2002 | Kadyk et al. |
| 2002/0183060 A1 | 12/2002 | Ko et al. |
| 2002/0191018 A1 | 12/2002 | Broussard |
| 2003/0028803 A1 | 2/2003 | Bunker et al. |
| 2003/0046134 A1 | 3/2003 | Frolick et al. |
| 2003/0070091 A1 | 4/2003 | Loveland |
| 2003/0079145 A1 | 4/2003 | Kouznetsov et al. |
| 2003/0115485 A1 | 6/2003 | Milliken |
| 2003/0120951 A1 | 6/2003 | Gartside et al. |
| 2003/0131148 A1 | 7/2003 | Kelley et al. |
| 2003/0233566 A1 | 12/2003 | Kouznetsov et al. |

(56) References Cited

U.S. PATENT DOCUMENTS

| | | |
|---|---|---|
| 2004/0015725 A1 | 1/2004 | Boneh et al. |
| 2004/0022258 A1 | 2/2004 | Tsukada et al. |
| 2004/0024706 A1 | 2/2004 | Leduc |
| 2004/0025042 A1 | 2/2004 | Kouznetsov et al. |
| 2004/0058644 A1 | 3/2004 | Saigo et al. |
| 2004/0120260 A1 | 6/2004 | Bernier |
| 2004/0133624 A1 | 7/2004 | Park |
| 2004/0158741 A1 | 8/2004 | Schneider |
| 2004/0185900 A1 | 9/2004 | McElveen |
| 2004/0199665 A1 | 10/2004 | Omar et al. |
| 2004/0203622 A1 | 10/2004 | Esque et al. |
| 2004/0205419 A1 | 10/2004 | Liang et al. |
| 2004/0209608 A1 | 10/2004 | Kouznetsov et al. |
| 2004/0221168 A1 | 11/2004 | Girard |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0010921 A1 | 1/2005 | Sueyoshi |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0102514 A1 | 5/2005 | Bergenwall et al. |
| 2005/0124323 A1 | 6/2005 | Ichihara |
| 2005/0125779 A1 | 6/2005 | Kelley et al. |
| 2005/0130627 A1 | 6/2005 | Calmels et al. |
| 2005/0131900 A1* | 6/2005 | Palliyll .............. G06F 16/9014 |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0240999 A1 | 10/2005 | Rubin et al. |
| 2005/0254654 A1 | 11/2005 | Rockwell et al. |
| 2005/0278777 A1 | 12/2005 | Loza |
| 2005/0282533 A1 | 12/2005 | Draluk et al. |
| 2006/0026283 A1 | 2/2006 | Trueba |
| 2006/0048142 A1 | 3/2006 | Roese et al. |
| 2006/0073820 A1 | 4/2006 | Craswell et al. |
| 2006/0075388 A1 | 4/2006 | Kelley et al. |
| 2006/0075472 A1 | 4/2006 | Sanda et al. |
| 2006/0080680 A1 | 4/2006 | Anwar et al. |
| 2006/0085357 A1 | 4/2006 | Pizarro |
| 2006/0095454 A1 | 5/2006 | Shankar et al. |
| 2006/0101518 A1 | 5/2006 | Schumaker et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0191011 A1 | 8/2006 | Korkishko et al. |
| 2006/0212931 A1 | 9/2006 | Shull et al. |
| 2006/0217115 A1 | 9/2006 | Cassett et al. |
| 2006/0218482 A1 | 9/2006 | Ralston et al. |
| 2006/0218636 A1 | 9/2006 | Chaum |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0005967 A1 | 1/2007 | Mister et al. |
| 2007/0011319 A1 | 1/2007 | McClure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Paul et al. |
| 2007/0028095 A1 | 2/2007 | Allen et al. |
| 2007/0028302 A1 | 2/2007 | Brennan et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0039053 A1 | 2/2007 | Dvir |
| 2007/0050471 A1 | 3/2007 | Patel et al. |
| 2007/0067581 A1 | 3/2007 | Baek |
| 2007/0071238 A1 | 3/2007 | Adams et al. |
| 2007/0074033 A1 | 3/2007 | Adams et al. |
| 2007/0074034 A1 | 3/2007 | Adams et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0094260 A1 | 4/2007 | Murphy et al. |
| 2007/0113090 A1* | 5/2007 | Villela .................. H04L 9/3247 713/170 |
| 2007/0143851 A1 | 6/2007 | Nicodemus et al. |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186275 A1 | 8/2007 | Shahbazi |
| 2007/0186282 A1 | 8/2007 | Jenkins |
| 2007/0190995 A1 | 8/2007 | Wang et al. |
| 2007/0192608 A1* | 8/2007 | De Arruda Villela ....................... H04L 63/104 713/176 |
| 2007/0214245 A1 | 9/2007 | Hamalainen et al. |
| 2007/0214504 A1 | 9/2007 | Milani Comparetti et al. |
| 2007/0220259 A1 | 9/2007 | Pavlicic |
| 2007/0220608 A1 | 9/2007 | Lahti et al. |
| 2007/0240127 A1 | 10/2007 | Roques et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0270212 A1 | 11/2007 | Cockerille et al. |
| 2007/0293263 A1 | 12/2007 | Eslambolchi et al. |
| 2007/0297610 A1 | 12/2007 | Chen et al. |
| 2008/0016347 A1 | 1/2008 | Maj et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0060062 A1 | 3/2008 | Lord |
| 2008/0065507 A1 | 3/2008 | Morrison et al. |
| 2008/0070495 A1 | 3/2008 | Stricklen et al. |
| 2008/0072329 A1 | 3/2008 | Herschaft |
| 2008/0086638 A1 | 4/2008 | Mather |
| 2008/0086773 A1 | 4/2008 | Tuvell et al. |
| 2008/0086776 A1 | 4/2008 | Tuvell et al. |
| 2008/0098464 A1 | 4/2008 | Mizrah |
| 2008/0098478 A1 | 4/2008 | Vaidya et al. |
| 2008/0109871 A1 | 5/2008 | Jacobs |
| 2008/0120611 A1 | 5/2008 | Aaron |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0168533 A1* | 7/2008 | Ozaki .................. G06F 21/577 726/1 |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0201780 A1* | 8/2008 | Khan .................. G06F 21/577 726/25 |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0244407 A1 | 10/2008 | Eklund |
| 2008/0250500 A1 | 10/2008 | Olson et al. |
| 2008/0271149 A1 | 10/2008 | Dettinger et al. |

(56) References Cited

U.S. PATENT DOCUMENTS

| | | |
|---|---|---|
| 2008/0275992 A1 | 11/2008 | Basty et al. |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0006956 A1 | 1/2009 | Bae et al. |
| 2009/0013399 A1 | 1/2009 | Cottrell et al. |
| 2009/0019546 A1* | 1/2009 | Park .............. G06F 21/55 726/22 |
| 2009/0064303 A1 | 3/2009 | Dickinson et al. |
| 2009/0064330 A1 | 3/2009 | Shraim et al. |
| 2009/0070283 A1 | 3/2009 | Kang et al. |
| 2009/0083852 A1 | 3/2009 | Kuo et al. |
| 2009/0106439 A1* | 4/2009 | Twitchell, Jr. ......... H04L 45/00 718/1 |
| 2009/0119143 A1 | 5/2009 | Silver et al. |
| 2009/0158390 A1 | 6/2009 | Guan |
| 2009/0172227 A1 | 7/2009 | Taylor et al. |
| 2009/0182517 A1 | 7/2009 | Gandhi et al. |
| 2009/0199298 A1 | 8/2009 | Miliefsky |
| 2009/0205016 A1 | 8/2009 | Milas |
| 2009/0205041 A1 | 8/2009 | Michalske |
| 2009/0205047 A1 | 8/2009 | Podjarny |
| 2009/0210702 A1 | 8/2009 | Welingkar et al. |
| 2009/0210712 A1 | 8/2009 | Fort |
| 2009/0240774 A1 | 9/2009 | Sachtjen et al. |
| 2009/0248623 A1 | 10/2009 | Adelman et al. |
| 2009/0282485 A1 | 11/2009 | Bennett |
| 2009/0292487 A1 | 11/2009 | Duncan et al. |
| 2009/0293125 A1 | 11/2009 | Szor |
| 2009/0300511 A1 | 12/2009 | Behar et al. |
| 2009/0300763 A1 | 12/2009 | Harvey et al. |
| 2009/0303066 A1 | 12/2009 | Lee et al. |
| 2009/0319998 A1 | 12/2009 | Sobel et al. |
| 2010/0005291 A1 | 1/2010 | Hulten et al. |
| 2010/0009758 A1* | 1/2010 | Twitchell, Jr. ......... H04L 67/06 709/227 |
| 2010/0011029 A1 | 1/2010 | Niemela |
| 2010/0019731 A1 | 1/2010 | Connolly et al. |
| 2010/0041946 A1 | 2/2010 | Kim |
| 2010/0058064 A1 | 3/2010 | Kirovski et al. |
| 2010/0058468 A1 | 3/2010 | Green et al. |
| 2010/0064341 A1 | 3/2010 | Aldera |
| 2010/0064344 A1 | 3/2010 | Wang |
| 2010/0085883 A1 | 4/2010 | Paster |
| 2010/0088398 A1 | 4/2010 | Plamondon |
| 2010/0095359 A1 | 4/2010 | Gordon |
| 2010/0097494 A1 | 4/2010 | Gum et al. |
| 2010/0100591 A1 | 4/2010 | Mahaffey et al. |
| 2010/0100939 A1 | 4/2010 | Mahaffey et al. |
| 2010/0100959 A1 | 4/2010 | Mahaffey |
| 2010/0100963 A1 | 4/2010 | Mahaffey |
| 2010/0100964 A1 | 4/2010 | Mahaffey et al. |
| 2010/0114634 A1* | 5/2010 | Christiansen ........ G06Q 30/018 705/317 |
| 2010/0115092 A1 | 5/2010 | Westin |
| 2010/0138501 A1 | 6/2010 | Clinton et al. |
| 2010/0154032 A1 | 6/2010 | Ollmann |
| 2010/0173658 A1 | 7/2010 | Fan et al. |
| 2010/0210240 A1 | 8/2010 | Mahaffey et al. |
| 2010/0218182 A1* | 8/2010 | Hahn .............. G06F 21/12 713/176 |
| 2010/0240419 A1 | 9/2010 | Horino |
| 2010/0250603 A1 | 9/2010 | Balakrishnaiah et al. |
| 2010/0262924 A1 | 10/2010 | Kalu |
| 2010/0275127 A1 | 10/2010 | Morita et al. |
| 2010/0299292 A1 | 11/2010 | Collazo |
| 2010/0299738 A1 | 11/2010 | Wahl |
| 2010/0306432 A1 | 12/2010 | Juarez et al. |
| 2010/0313270 A1 | 12/2010 | Kim et al. |
| 2010/0317324 A1 | 12/2010 | Brown et al. |
| 2010/0325035 A1 | 12/2010 | Hilgers et al. |
| 2010/0332593 A1 | 12/2010 | Barash et al. |
| 2010/0332680 A1 | 12/2010 | Anderson et al. |
| 2011/0016320 A1 | 1/2011 | Bergsten et al. |
| 2011/0022681 A1 | 1/2011 | Simeonov |
| 2011/0047033 A1 | 2/2011 | Mahaffey et al. |
| 2011/0047594 A1 | 2/2011 | Mahaffey et al. |
| 2011/0047597 A1 | 2/2011 | Mahaffey et al. |
| 2011/0047620 A1 | 2/2011 | Mahaffey et al. |
| 2011/0050503 A1 | 3/2011 | Fong et al. |
| 2011/0072262 A1 | 3/2011 | Amir et al. |
| 2011/0087690 A1 | 4/2011 | Cairns |
| 2011/0099377 A1 | 4/2011 | Hoornaert et al. |
| 2011/0107414 A1 | 5/2011 | Diab et al. |
| 2011/0111799 A1 | 5/2011 | Kothari et al. |
| 2011/0119765 A1 | 5/2011 | Hering et al. |
| 2011/0131204 A1 | 6/2011 | Bodin et al. |
| 2011/0145920 A1 | 6/2011 | Mahaffey et al. |
| 2011/0154439 A1 | 6/2011 | Patel et al. |
| 2011/0167474 A1 | 7/2011 | Sinha et al. |
| 2011/0171923 A1 | 7/2011 | Daly et al. |
| 2011/0173071 A1 | 7/2011 | Meyer et al. |
| 2011/0173698 A1 | 7/2011 | Polyakov et al. |
| 2011/0179136 A1* | 7/2011 | Twitchell, Jr. ......... H04W 4/21 709/217 |
| 2011/0225492 A1 | 9/2011 | Boettcher et al. |
| 2011/0225505 A1 | 9/2011 | Uchida et al. |
| 2011/0235624 A1 | 9/2011 | Scott et al. |
| 2011/0241872 A1 | 10/2011 | Mahaffey |
| 2011/0289423 A1 | 11/2011 | Kim et al. |
| 2011/0296401 A1 | 12/2011 | DePoy |
| 2011/0296510 A1 | 12/2011 | Hatlelid et al. |
| 2011/0301890 A1 | 12/2011 | Shirriff et al. |
| 2011/0307711 A1 | 12/2011 | Novak et al. |
| 2011/0314542 A1 | 12/2011 | Viswanathan et al. |
| 2011/0320307 A1 | 12/2011 | Mehta et al. |
| 2012/0005476 A1 | 1/2012 | Wei et al. |
| 2012/0011439 A1 | 1/2012 | Karn et al. |
| 2012/0023153 A1 | 1/2012 | Karasaridis |
| 2012/0023567 A1* | 1/2012 | Hammad .......... G06Q 20/4018 726/9 |
| 2012/0023583 A1 | 1/2012 | Sallam |
| 2012/0042257 A1 | 2/2012 | Aftab et al. |
| 2012/0042382 A1 | 2/2012 | Mahaffey |
| 2012/0054277 A1 | 3/2012 | Gedikian |
| 2012/0054847 A1 | 3/2012 | Schultz et al. |
| 2012/0060222 A1 | 3/2012 | Mahaffey et al. |
| 2012/0072569 A1 | 3/2012 | Xu |
| 2012/0084195 A1 | 4/2012 | Bauerschmidt et al. |
| 2012/0084836 A1 | 4/2012 | Mahaffey et al. |
| 2012/0084851 A1* | 4/2012 | Neystadt ............ G06F 21/335 726/9 |
| 2012/0084864 A1 | 4/2012 | Mahaffey et al. |
| 2012/0089963 A1 | 4/2012 | Claussen et al. |
| 2012/0096516 A1 | 4/2012 | Sobel et al. |
| 2012/0096555 A1 | 4/2012 | Mahaffey |
| 2012/0102568 A1 | 4/2012 | Tarbotton et al. |
| 2012/0108208 A1 | 5/2012 | Willis |
| 2012/0110174 A1 | 5/2012 | Wootton et al. |
| 2012/0117386 A1 | 5/2012 | Headley |
| 2012/0124239 A1 | 5/2012 | Shribman et al. |
| 2012/0129503 A1 | 5/2012 | Lindeman et al. |
| 2012/0159434 A1 | 6/2012 | Dang et al. |
| 2012/0159578 A1 | 6/2012 | Chawla et al. |
| 2012/0159598 A1 | 6/2012 | Kim et al. |
| 2012/0159607 A1 | 6/2012 | Wei et al. |
| 2012/0159636 A1 | 6/2012 | Pandya et al. |
| 2012/0166276 A1 | 6/2012 | Chitnis et al. |
| 2012/0173680 A1 | 7/2012 | Coskun et al. |
| 2012/0179801 A1 | 7/2012 | Luna et al. |
| 2012/0179814 A1 | 7/2012 | Swildens et al. |
| 2012/0185780 A1 | 7/2012 | Ma |
| 2012/0188064 A1 | 7/2012 | Mahaffey et al. |
| 2012/0196571 A1 | 8/2012 | Grkov et al. |
| 2012/0204033 A1* | 8/2012 | Etchegoyen ......... H04L 9/3231 713/175 |
| 2012/0210431 A1 | 8/2012 | Mika et al. |
| 2012/0215938 A1 | 8/2012 | Fletcher et al. |
| 2012/0222120 A1 | 8/2012 | Rim et al. |
| 2012/0233674 A1 | 9/2012 | Gladstone et al. |
| 2012/0233694 A1 | 9/2012 | Baliga et al. |
| 2012/0233695 A1 | 9/2012 | Mahaffey et al. |

(56) References Cited

U.S. PATENT DOCUMENTS

| | | |
|---|---|---|
| 2012/0240183 A1 | 9/2012 | Sinha |
| 2012/0246499 A1 | 9/2012 | Jessup et al. |
| 2012/0250658 A1 | 10/2012 | Eisl et al. |
| 2012/0254285 A1 | 10/2012 | Tiger et al. |
| 2012/0254634 A1 | 10/2012 | Chakra et al. |
| 2012/0259954 A1 | 10/2012 | McCarthy et al. |
| 2012/0278467 A1 | 11/2012 | Schneider |
| 2012/0290584 A1 | 11/2012 | De Bona et al. |
| 2012/0297456 A1 | 11/2012 | Rose et al. |
| 2012/0303735 A1 | 11/2012 | Raciborski et al. |
| 2012/0311659 A1 | 12/2012 | Narain et al. |
| 2012/0317153 A1 | 12/2012 | Parthasarathy et al. |
| 2012/0317233 A1 | 12/2012 | Redpath |
| 2012/0317266 A1 | 12/2012 | Abbott |
| 2012/0317370 A1 | 12/2012 | Luna |
| 2012/0324076 A1 | 12/2012 | Zerr et al. |
| 2012/0324094 A1 | 12/2012 | Wyatt et al. |
| 2012/0324259 A1 | 12/2012 | Aasheim et al. |
| 2012/0324568 A1 | 12/2012 | Wyatt et al. |
| 2012/0324581 A1* | 12/2012 | Economos, Jr. ...... H04W 12/08 726/25 |
| 2013/0013775 A1 | 1/2013 | Baumback et al. |
| 2013/0019311 A1 | 1/2013 | Swildens et al. |
| 2013/0023209 A1 | 1/2013 | Fisher et al. |
| 2013/0041946 A1 | 2/2013 | Joel et al. |
| 2013/0041974 A1 | 2/2013 | Luna et al. |
| 2013/0042124 A1 | 2/2013 | Isozaki et al. |
| 2013/0047034 A1 | 2/2013 | Salomon et al. |
| 2013/0047195 A1* | 2/2013 | Radhakrishnan ..... H04L 63/105 726/1 |
| 2013/0047224 A1 | 2/2013 | Radhakrishnan |
| 2013/0047242 A1 | 2/2013 | Radhakrishnan |
| 2013/0047253 A1 | 2/2013 | Radhakrishnan et al. |
| 2013/0054702 A1 | 2/2013 | Belchee et al. |
| 2013/0054796 A1 | 2/2013 | Baumback et al. |
| 2013/0054960 A1 | 2/2013 | Grab et al. |
| 2013/0055163 A1 | 2/2013 | Matas |
| 2013/0055372 A1 | 2/2013 | Chao et al. |
| 2013/0055401 A1* | 2/2013 | Kim .................. G06F 21/52 726/25 |
| 2013/0055405 A1 | 2/2013 | Zhao et al. |
| 2013/0061038 A1 | 3/2013 | Pao et al. |
| 2013/0067054 A1 | 3/2013 | Pulleyn et al. |
| 2013/0073859 A1* | 3/2013 | Carlson ............... H04L 9/3247 713/176 |
| 2013/0086682 A1 | 4/2013 | Mahaffey et al. |
| 2013/0090088 A1* | 4/2013 | Chevsky ............. H04L 63/0876 455/411 |
| 2013/0097318 A1 | 4/2013 | Gladstone et al. |
| 2013/0097660 A1* | 4/2013 | Das ..................... H04L 63/205 726/1 |
| 2013/0097706 A1 | 4/2013 | Titonis et al. |
| 2013/0097710 A1 | 4/2013 | Basavapatna et al. |
| 2013/0104197 A1 | 4/2013 | Nandakumar |
| 2013/0111597 A1 | 5/2013 | Gossweiler, III et al. |
| 2013/0117854 A1 | 5/2013 | Britton et al. |
| 2013/0130649 A1 | 5/2013 | Mahaffey et al. |
| 2013/0132330 A1 | 5/2013 | Hurwitz et al. |
| 2013/0132565 A1 | 5/2013 | Cetin et al. |
| 2013/0144785 A1 | 6/2013 | Karpenko et al. |
| 2013/0152047 A1 | 6/2013 | Moorthi et al. |
| 2013/0155879 A1 | 6/2013 | He et al. |
| 2013/0155899 A1* | 6/2013 | Gallagher ............ H04L 9/0819 370/254 |
| 2013/0159719 A1 | 6/2013 | Ha et al. |
| 2013/0166899 A1 | 6/2013 | Courtney et al. |
| 2013/0167136 A1 | 6/2013 | Goldman |
| 2013/0178270 A1 | 7/2013 | Flaherty et al. |
| 2013/0191662 A1 | 7/2013 | Ingrassia, Jr. et al. |
| 2013/0191918 A1 | 7/2013 | Nachenberg |
| 2013/0212160 A1 | 8/2013 | Lawson et al. |
| 2013/0212684 A1 | 8/2013 | Li et al. |
| 2013/0227683 A1 | 8/2013 | Bettini et al. |
| 2013/0239192 A1* | 9/2013 | Linga .................. H04L 63/061 726/3 |
| 2013/0247217 A1 | 9/2013 | Junod et al. |
| 2013/0254889 A1 | 9/2013 | Stuntebeck |
| 2013/0276120 A1 | 10/2013 | Dalcher et al. |
| 2013/0283377 A1 | 10/2013 | Das et al. |
| 2013/0290709 A1 | 10/2013 | Muppidi et al. |
| 2013/0294602 A1 | 11/2013 | Huxham et al. |
| 2013/0298242 A1* | 11/2013 | Kumar ................ H04L 63/0209 726/25 |
| 2013/0298244 A1 | 11/2013 | Kumar et al. |
| 2013/0303154 A1 | 11/2013 | Gupta et al. |
| 2013/0312058 A1* | 11/2013 | Thompson ............. G06F 21/54 726/1 |
| 2013/0318613 A1 | 11/2013 | Archer et al. |
| 2013/0318614 A1 | 11/2013 | Archer et al. |
| 2013/0325779 A1 | 12/2013 | Shahshahani et al. |
| 2013/0326476 A1 | 12/2013 | Wyatt et al. |
| 2013/0326477 A1 | 12/2013 | Wyatt et al. |
| 2013/0326500 A1 | 12/2013 | Park et al. |
| 2013/0333039 A1 | 12/2013 | Kelly |
| 2013/0346760 A1 | 12/2013 | Ignatchenko |
| 2014/0006418 A1 | 1/2014 | Forte et al. |
| 2014/0006464 A1* | 1/2014 | Pitts ..................... G06F 16/182 707/827 |
| 2014/0006796 A1* | 1/2014 | Smith .................. G06F 21/645 713/187 |
| 2014/0007222 A1* | 1/2014 | Qureshi ................ H04L 67/10 726/16 |
| 2014/0019241 A1 | 1/2014 | Treiser et al. |
| 2014/0019456 A1 | 1/2014 | Li et al. |
| 2014/0024348 A1 | 1/2014 | Hurst et al. |
| 2014/0041037 A1 | 2/2014 | Ashish et al. |
| 2014/0066015 A1* | 3/2014 | Aissi ..................... H04W 4/60 455/411 |
| 2014/0082738 A1 | 3/2014 | Bahl |
| 2014/0090077 A1 | 3/2014 | Jeong et al. |
| 2014/0096246 A1 | 4/2014 | Morrissey et al. |
| 2014/0109200 A1 | 4/2014 | Tootill et al. |
| 2014/0113588 A1 | 4/2014 | Chekina et al. |
| 2014/0115659 A1 | 4/2014 | Attfield et al. |
| 2014/0123289 A1 | 5/2014 | Hsiao et al. |
| 2014/0150096 A1 | 5/2014 | Moon et al. |
| 2014/0157381 A1 | 6/2014 | Disraeli |
| 2014/0181925 A1 | 6/2014 | Smith et al. |
| 2014/0181973 A1 | 6/2014 | Lee et al. |
| 2014/0188886 A1 | 7/2014 | Mahaffey et al. |
| 2014/0189808 A1 | 7/2014 | Mahaffey et al. |
| 2014/0196104 A1 | 7/2014 | Chari et al. |
| 2014/0199966 A1 | 7/2014 | Schushan |
| 2014/0215628 A1* | 7/2014 | Yan ..................... H04L 61/4511 726/25 |
| 2014/0237545 A1 | 8/2014 | Mylavarapu et al. |
| 2014/0244318 A1 | 8/2014 | Drake et al. |
| 2014/0283066 A1 | 9/2014 | Teddy et al. |
| 2014/0289833 A1 | 9/2014 | Briceno et al. |
| 2014/0295821 A1* | 10/2014 | Qureshi ................ H04W 4/50 455/419 |
| 2014/0298403 A1* | 10/2014 | Qureshi ................ H04L 63/20 726/1 |
| 2014/0317754 A1 | 10/2014 | Niemela et al. |
| 2014/0325586 A1 | 10/2014 | Halliday et al. |
| 2014/0331275 A1 | 11/2014 | Singh |
| 2014/0344446 A1* | 11/2014 | Rjeili .................... H04L 43/04 709/224 |
| 2014/0351573 A1 | 11/2014 | Martini |
| 2014/0359777 A1 | 12/2014 | Lam et al. |
| 2014/0379853 A1 | 12/2014 | Shelton |
| 2014/0380422 A1 | 12/2014 | Su |
| 2014/0380484 A1 | 12/2014 | Choi et al. |
| 2015/0006384 A1* | 1/2015 | Shaikh ................. G06Q 20/382 705/44 |
| 2015/0007325 A1 | 1/2015 | Eliseev et al. |
| 2015/0046339 A1 | 2/2015 | Wong et al. |
| 2015/0052605 A1* | 2/2015 | Yu ........................ G06F 21/561 726/23 |
| 2015/0067143 A1 | 3/2015 | Babakhan et al. |
| 2015/0067830 A1 | 3/2015 | Johansson et al. |

(56) References Cited

U.S. PATENT DOCUMENTS

| | | | |
|---|---|---|---|
| 2015/0067831 A1 | 3/2015 | Wawda et al. | |
| 2015/0067855 A1 | 3/2015 | Lee et al. | |
| 2015/0074390 A1 | 3/2015 | Stoback et al. | |
| 2015/0088955 A1 | 3/2015 | Hendrick et al. | |
| 2015/0089585 A1 | 3/2015 | Novack | |
| 2015/0095990 A1 | 4/2015 | Ranganathan et al. | |
| 2015/0135338 A1 | 5/2015 | Moskal | |
| 2015/0169877 A1 | 6/2015 | Mahaffey et al. | |
| 2015/0172057 A1 | 6/2015 | Mahaffey et al. | |
| 2015/0172060 A1 | 6/2015 | Mahaffey et al. | |
| 2015/0172146 A1 | 6/2015 | Mahaffey et al. | |
| 2015/0186892 A1 | 7/2015 | Zhang et al. | |
| 2015/0188913 A1* | 7/2015 | Teixeron | H04L 63/0838 713/155 |
| 2015/0188924 A1 | 7/2015 | Mahaffey et al. | |
| 2015/0188932 A1 | 7/2015 | King et al. | |
| 2015/0193781 A1* | 7/2015 | Dave | H04L 63/0807 705/318 |
| 2015/0195252 A1 | 7/2015 | Walter et al. | |
| 2015/0199515 A1* | 7/2015 | Qureshi | G06F 21/566 726/22 |
| 2015/0207820 A1 | 7/2015 | Klug et al. | |
| 2015/0220734 A1 | 8/2015 | Nalluri et al. | |
| 2015/0229651 A1 | 8/2015 | Nicodemus et al. | |
| 2015/0235015 A1 | 8/2015 | Holler et al. | |
| 2015/0244737 A1 | 8/2015 | Siman | |
| 2015/0256345 A1* | 9/2015 | Vaid | H04L 9/3268 713/158 |
| 2015/0256550 A1 | 9/2015 | Taylor et al. | |
| 2015/0324616 A1 | 11/2015 | Alarabi | |
| 2015/0326586 A1 | 11/2015 | Khesin | |
| 2015/0372994 A1* | 12/2015 | Stuntebeck | H04W 12/02 713/156 |
| 2015/0381621 A1* | 12/2015 | Innes | H04W 12/069 726/7 |
| 2016/0021135 A1* | 1/2016 | Chesla | H04L 63/1416 726/23 |
| 2016/0027011 A1 | 1/2016 | Ninomiya et al. | |
| 2016/0080408 A1* | 3/2016 | Coleman | G06F 21/577 726/22 |
| 2016/0086184 A1 | 3/2016 | Carpenter et al. | |
| 2016/0099963 A1* | 4/2016 | Mahaffey | H04L 63/166 726/25 |
| 2016/0099972 A1 | 4/2016 | Qureshi et al. | |
| 2016/0112450 A1 | 4/2016 | Basavapatna et al. | |
| 2016/0119195 A1 | 4/2016 | Blondeau et al. | |
| 2016/0127898 A1* | 5/2016 | Gupta | G06F 21/43 726/7 |
| 2016/0142858 A1* | 5/2016 | Molinet | H04L 67/025 709/203 |
| 2016/0148011 A1* | 5/2016 | Lee | G06F 21/629 726/28 |
| 2016/0192154 A1* | 6/2016 | Modica | G01S 5/16 455/456.1 |
| 2016/0203491 A1* | 7/2016 | Ranganathan | G06F 21/33 705/44 |
| 2016/0218881 A1 | 7/2016 | Adams | |
| 2016/0226872 A1* | 8/2016 | Oberheide | H04L 63/0876 |
| 2016/0239650 A1 | 8/2016 | Mao et al. | |
| 2016/0321452 A1* | 11/2016 | Richardson | H04W 12/12 |
| 2016/0323746 A1* | 11/2016 | Milchtaich | H04W 12/08 |
| 2016/0344729 A1* | 11/2016 | Slaight | G06Q 10/08 |
| 2016/0352526 A1* | 12/2016 | Adler | G06Q 90/00 |
| 2016/0366586 A1* | 12/2016 | Gross | H04L 63/0876 |
| 2016/0373478 A1 | 12/2016 | Doubleday et al. | |
| 2017/0024135 A1 | 1/2017 | Christodorescu et al. | |
| 2017/0039568 A1* | 2/2017 | Tunnell | G06F 21/33 |
| 2017/0041036 A1 | 2/2017 | Phung et al. | |
| 2017/0060497 A1* | 3/2017 | Maezawa | G06F 21/567 |
| 2017/0063865 A1* | 3/2017 | Belchee | G06F 21/577 |
| 2017/0075677 A1* | 3/2017 | Gross | G01R 31/44 |
| 2017/0103215 A1 | 4/2017 | Mahaffey et al. | |
| 2017/0104790 A1 | 4/2017 | Meyers et al. | |
| 2017/0126696 A1 | 5/2017 | Duffell et al. | |
| 2017/0134412 A1 | 5/2017 | Cheng et al. | |
| 2017/0146970 A1 | 5/2017 | Joo et al. | |
| 2017/0147810 A1 | 5/2017 | Richardson et al. | |
| 2017/0163616 A1* | 6/2017 | Smith | H04L 63/061 |
| 2017/0171200 A1* | 6/2017 | Bao | H04L 9/3213 |
| 2017/0230402 A1 | 8/2017 | Greenspan et al. | |
| 2017/0251013 A1* | 8/2017 | Kirti | H04L 63/1441 |
| 2017/0255932 A1 | 9/2017 | Aabye et al. | |
| 2017/0262609 A1 | 9/2017 | Perlroth et al. | |
| 2017/0262849 A1* | 9/2017 | Hammad | G06Q 20/322 |
| 2017/0289139 A1* | 10/2017 | Guo | H04L 9/40 |
| 2017/0295159 A1* | 10/2017 | Arora | G06F 21/6218 |
| 2017/0318000 A1 | 11/2017 | Louis et al. | |
| 2017/0331828 A1 | 11/2017 | Caldera et al. | |
| 2017/0332238 A1* | 11/2017 | Bansal | H04L 67/125 |
| 2017/0345004 A1 | 11/2017 | Cowan | |
| 2017/0359306 A1* | 12/2017 | Thomas | H04L 63/145 |
| 2017/0366553 A1 | 12/2017 | Shetye et al. | |
| 2018/0004937 A1* | 1/2018 | Shannon | H04L 9/088 |
| 2018/0020029 A1* | 1/2018 | Cetin | G06F 21/552 |
| 2018/0025148 A1* | 1/2018 | Jain | G06F 21/35 713/166 |
| 2018/0025344 A1* | 1/2018 | L. | G06Q 20/3229 705/44 |
| 2018/0026944 A1 | 1/2018 | Phillips | |
| 2018/0026976 A1 | 1/2018 | White et al. | |
| 2018/0054417 A1* | 2/2018 | Schibuk | H04L 9/3242 |
| 2018/0054433 A1 | 2/2018 | Junod et al. | |
| 2018/0054455 A1* | 2/2018 | Bercovich | H04L 63/1441 |
| 2018/0077188 A1* | 3/2018 | Mandyam | H04L 67/01 |
| 2018/0077195 A1* | 3/2018 | Gathala | H04L 63/1433 |
| 2018/0082059 A1* | 3/2018 | Bender | H04L 63/1425 |
| 2018/0082301 A1 | 3/2018 | Chan-Bauza et al. | |
| 2018/0082302 A1 | 3/2018 | Chan-Bauza et al. | |
| 2018/0082303 A1 | 3/2018 | Chan-Bauza et al. | |
| 2018/0124033 A1* | 5/2018 | Greenspan | G06F 21/31 |
| 2018/0189478 A1 | 7/2018 | Richardson et al. | |
| 2018/0198629 A1* | 7/2018 | Deymonnaz | H04L 9/0894 |
| 2018/0234464 A1* | 8/2018 | Sim | H04L 9/3213 |
| 2018/0262524 A1* | 9/2018 | Deshpande | G06F 21/44 |
| 2018/0294969 A1* | 10/2018 | Holness | H04L 9/3247 |
| 2018/0316598 A1* | 11/2018 | Twitchell, Jr. | H04L 63/0442 |
| 2018/0351944 A1* | 12/2018 | Cho | H04L 9/3228 |
| 2018/0359244 A1 | 12/2018 | Cockerill et al. | |
| 2019/0141030 A1 | 5/2019 | Cockerill et al. | |
| 2019/0274042 A1* | 9/2019 | Gupta | H04L 63/0876 |
| 2019/0294464 A1* | 9/2019 | Twitchell, Jr. | H04L 67/1097 |
| 2019/0363893 A1 | 11/2019 | Mahaffey et al. | |
| 2020/0089869 A1 | 3/2020 | Richardson et al. | |
| 2021/0258304 A1* | 8/2021 | Cockerill | H04L 63/105 |
| 2022/0174494 A1 | 6/2022 | Richardson et al. | |

FOREIGN PATENT DOCUMENTS

| | | |
|---|---|---|
| EP | 2765750 | 8/2014 |
| EP | 2884784 | 6/2015 |
| GB | 2430588 | 3/2007 |
| KR | 1020090044656 | 5/2009 |
| KR | 101143999 | 5/2012 |
| WO | 2005101789 | 10/2005 |
| WO | 2006110181 | 10/2006 |
| WO | 2008007111 | 3/2007 |
| WO | 2007081356 | 7/2007 |
| WO | 2008057737 | 5/2008 |
| WO | 2010048218 | 4/2010 |
| WO | 2010048220 | 4/2010 |
| WO | 2012027588 | 1/2012 |
| WO | 2013147891 | 10/2013 |
| WO | 2014063124 | 4/2014 |
| WO | 2015101522 | 7/2015 |
| WO | 2016162687 | 10/2016 |

OTHER PUBLICATIONS

HTTP Strict Transport Security (HSTS), IETF RFC 6797, web page downloaded from https://tools.ietf.org/html/rfc6797,May 5, 2017, 47 pages.

(56) References Cited

OTHER PUBLICATIONS

Hervas et al., "Towards the ubiquitous visualization: Adaptive user-interfaces based on the Semantic Web", Interacting with Computers 23, pp. 40-56, 2011, Elsevier B.V.
International Patent Application PCT/US2013/043569, International Search Report and Written Opinion, Aug. 27, 2013.
International Patent Application PCT/US2016/028149, International Search Report and Written Opinion, May 17, 2016.
International Search Report and Written Opinion, International Application No. PCT/US2018/036562, Oct. 18, 2018.
International Search Report and the Written Opinion of the International Searching Authority for PCT/US17/35016, date mailed Sep. 22, 2017, 12 pages.
J. S. Poulin et al.; The business case for software reuse; 1993 IBM; pp. 567-594; <http://ieeexplore.ieee.org/stamp/stamp.jsp?tp=&arnumber=5387336>.
Jefferies, Charles P. "Webroot AntiVirus 2010 With Spy Sweeper Review," Notebook Review, available at http://www.notebookreview.com/default.asp?newsID=5700&review=Webroot+AntiVirus+2010+With+Spy+Sweeper+Review, retrieved on May 18, 2011, published on Jun. 22, 2010, 3 pages.
Jan Bosch; Maturity and Evolution in Software Product Lines Approaches, Artefacts and Organization; 2002 Springer; pp. 257-271; <http://link.springer.com/chapter/10.1007/3-540-45652-X_16>.
Jan Spooren, Davy Preuveneers, and Wouter Joosen, "Mobile device fingerprinting considered harmful for risk-based authentication", In Proceedings of the Eighth European Workshop on System Security (EuroSec '15). ACM, New York, NY, USA, 2015.
Jung, Jaeyeon et al. "DNS Performance and the Effectiveness of Caching," IEEE/ACM Transactions on Networking, vol. 10, Issue 5, Oct. 2002, pp. 589-603.
K. Benton, Joyeon Jo, Yoohwan Kim. Signature Check: A Protocol to Detect Man-In-The-Middle Attack in SSL. ACM CSIIRW '11 Oct. 12-14, 2011, 4 pages.
Keane, Justin K. "Using the Google Safe Browsing API from PHP," Mad Irish, Aug. 7, 2009, available at http://www.madirish.net/node/245, retrieved Mar. 30, 2012, published on Aug. 7, 2009, 5 pages.
Kincaid, Jason "Urban Airship Brings Easy Push Notifications To Android," TechCrunch, available at http://techcrunch.com/2010/08/10/urban-airship-brings-easy-push-notifications-to-android/, retrieved on Jun. 16, 2011, published on Aug. 10, 2010, 5 pages.
Leiva Torres et al., "A Gesture Inference Methodology For User Evaluation Based On Mouse Activity Tracking", Proceedings of The IADIS International Conference Interfaces and Human Computer Interaction 2008, part of the IADIS Multi-Conference on Computer Science and Information Systems 2008, MCCSIS'08, pp. 18-26, IADIS Press, 2008.
Liljeberg, M. et al. "Optimizing World-Wide Web for Weakly Connected Mobile Workstations: An Indirect Approach," Second International Workshop on Services Distributed and Networked Environments, Jun. 5-6, 1995, pp. 132-139.
Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.
McAfee Artemis Technology—Always-On, Real-Time Protection, 2008.
McAfee Knowledge Base Corporate KB60224, last modified on Jan. 19, 2010.
McAfee Technical Brief zero day to real time, 2008.
McAfee, Internet Archive, Way Back Machine, available at <http://web.archive.org/web/20080517102505/www.mcafeesecure.com/us/technology-intro.jsp>, retrieved Feb. 23, 2011, 2 pages.
Non-Final Office Action dated Apr. 14, 2011 for U.S. Appl. No. 12/255,614, filed Oct. 21, 2008; pp. 1-6.
Non-Final Office Action dated Dec. 26, 2012 for U.S. Appl. No. 13/160,382, filed Jun. 14, 2011; pp. 1-23.

Non-Final Office Action dated Mar. 24, 2011 for U.S. Appl. No. 12/255,635, filed Oct. 21, 2008; pp. 1-17.
Norton Insight A solution to Performance, published on Aug. 29, 2008.
Notice of Allowance dated Nov. 3, 2011 for U.S. Appl. No. 12/255,632, filed Oct. 21, 2008; pp. 1-5.
PCT "International Search Report and Written Opinion of the International Searching Authority for PCT/US2013/027166", mailed on Jun. 19, 2013.
PCT "International Search Report and Written Opinion of the International Searching Authority for PCT/US13/66676," mailed Jan. 16, 2014.
PCT International Preliminary Report on Patentability for PCT/US2011/049182; Mailed on Mar. 7, 2013; pp. 1-9.
PCT International Search Report and Written Opinion of the International Searching Authority for PCT/US2009/061370; Mailed on Dec. 14, 2009; pp. 1-12.
PCT International Search Report and Written Opinion of the International Searching Authority for PCT/US2009/061372; Mailed on Mar. 24, 2010.
PCT International Search Report and Written Opinion of the International Search Authority for PCT/US2013/67109, mailed Apr. 16, 2014; pp. 1-16.
PCT, "International Search Report and Written Opinion of the International Searching Authority for PCT/US2011/049182", mailed on Dec. 23, 2011.
Pogue, David "Simplifying the Lives of Web Users," The New York Times, available at http://www.nytimes.com/2010/08/19/technology/personaltech/19pogue.html, retrieved May 17, 2011, Published On Aug. 18, 2010, 5 pages.
PagerDuty, available at http://www.pagerduty.com, retrieved on Sep. 14, 2011, published on Jun. 6, 2009, 23 pages.
"Preventing attacks on a user's history through CSS: visited selectors", "How CSS can be used to query a user's browser history", L. David Baron, Mozilla Corporation, Internet Archive, Way Back Machine, available at https://web.archive.org/web/201311011024118/http://dbaron.org/mozilla/visited-privacy, Retrieved Oct. 16, 2017, 3 pages.
Prey, available at http://preyproject.com/, retrieved Jan. 10, 2012, published on May 16, 2009, 4 pages.
Qualys, "Executive Dashboard," Internet Archive, Way back Machine, availble at <http://web.archive.org/web20080507161417/www.qualys.com/products/screens/?screen=Executive+Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.
Ravi et al., "Context-aware Battery Management for Mobile Phones," In Proceedings of the 2008 Sixth Annual IEEE International Conference on Pervasive Computing and Communications (PERCOM 2008), IEEE Computer Society, Washington, DC, USA, pp. 224-233.
Reardon, Marguerite, "Mobile Phones That Track Your Buddies," Cnet, available at <http://news.cnet.com/Mobile-phones-that-track-your-buddies/2100-1039_3-6135209.html, retrieved Mar. 30, 2012, published on Nov. 14, 2006, 6 pages.
Richardson, Alexis, "Introduction to RabbitMQ", Google UK, available at http://www.rabbitmq.com/resources/google-tech-talk-final/alexis-google-rabbitmq-talk.pdf, retrieved on Mar. 30, 2012, 33 pages, published on Sep. 25, 2008.
Richard Lippmann et al.; The Effect of Identifying Vulnerabilities and Patching Software on the Utility of Network Intrusion Detection; 2002 Springer; pp. 307-326; <http://link.springer.com/chapter/10.1007/3-540-36084-0_17>.
Summerson, Cameron "5 Android Antivirus Apps Compared, Find Out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.

(56) References Cited

OTHER PUBLICATIONS

Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.
Software Engineering Institute, Carnegie Mellon; "Securing Your Web Browser", Dormann et al., web page downloaded Nov. 4, 2013 from http://www.cert.org/tech_tips/securing_browser/, pp. 1-17.
Software Engineering Institute, Carnegie Mellon; "Securing Your Web Browser", Dormann et al., Internet Archive, Way Back Machine, available at https://web.archive.org/web/20131015224907/http://www.cert.org/tech_tips/securing_browser/, Retrieved Oct. 16, 2017,15 pages.
Song, Hui and Cao, Guohong. "Cache-Miss-Initiated Prefetch in Mobile Environments," Dept. of Computer Science and Engineering, The Pennsylvania State University, Computer Communications, vol. 28, Issue 7, May 2, 2005, pp. 741-753.
Sprint Nextel, Mobile Locator, Internet Archive, Way Back Machine, available at http://web.archive.org/web/20080901070835/http://www.nextel.com/en/solutions/gps/mobile_locator.html, 2 pages, Retrieved Jan. 16, 2013.
Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.
U.S. Appl. No. 13/160,447. Prosecution history.
U.S. Appl. No. 12/255,614; Prosecution history available (including OA dated Apr. 14, 2011).
Unicode Technical Report #39 Unicode Security Mechanisms, web page downloaded May 5, 2017 from https://unicode.org/reports/tr39/, 27 pages.
Virus Total, VT Community, www.virustotal.com/index.html; Dated Dec. 16, 2011; 44 Pages.
Wen et al., "Online Prediction of Battery Lifetime for Embedded and Mobile Devices", LNCS (2005) , Computer Science Department, University of California, Santa Barbara (15 pages).
Wendy Roll; Towards Model-Based and CCM-Based Applications for Real-Time Systems; 2003 IEEE; 8 pages; <http://ieeexplore.ieee.org/stamp/stamp.jsp?tp=&arnumber=1199238>.
Windows Update, Internet Archive, Way Back Machine, available at <http://web.archive.org/web/20071022193017/http://en.wikipedia.org/wiki/Windows_Update> Retrieved Feb. 23, 2011, 3 pages.
Wu, Yi et al. "Performance Analysis of DNS with TTL Value 0 as Location Repository in Mobile Internet," IEEE Wireless Communications and Networking Conference (WCNC), Mar. 11-15, 2007, pp. 3250-3255.
Zhang et al., "Accurate Online Power Estimation and Automatic Battery Behavior Based Power Model Generation for Smartphones," CODES/ISSS (2010). ACM, New York, NY, USA, pp. 105-114.
Zhang et al., "PowerVisor: a battery virtualization scheme for smartphones," In Proceedings of the third ACM workshop on Mobile cloud computing and services (MCS 2012). ACM, New York, NY, USA, pp. 37-44.
vica Crnkovic et al.; A Classification Framework for Software Component Models; 2011 IEEE; pp. 593-615; <http://ieeexplore.ieee.org/stamp/stamp.jsp?tp=&arnumber-5587419>.
"Android Cloud to Device Messaging Framework," Google Code Labs, available at http://code.google.com/android/c2dm/, retrieved on Sep. 14, 2011, published on Apr. 11, 2011, 9 pages.
"BlackBerry Push Service Overview," available at http://us.blackberry.com/developers/platform/pushapi.sp#tab_tab_resources, retrieved on Sep. 14, 2011, published on Nov. 6, 2010, 21 pages.
"Get the Physical Location of Wireless Router From its MAC Address (BSSID)," Coderrr, available at http://codernr.wordpress.com/2008/09/10/get-the-physical-location-of-wireless-router-from-its-mac-address-bssid/, retrieved on Mar. 30, 2012, published on Sep. 12, 2008, 13 pages.

"Hooking—Wikipedia, the Free Encyclopedia," Wikipedia, available at http://web.archive.org/web/20100415154752/http://en.wikipedia.org/wiki/Hooking, retrieved Mar. 30, 2012, published on Apr. 15, 2010, 6 pages.
"Pidgin The Universal Chat Client," Pidign, available at http://www.pidgin.im/, retrieved Sep. 14, 2011, published on May 1, 2007, 14 pages.
"Twilio Cloud Communications Web Service API for Building Voice and SMS Applications," Twilio, available at http://www.twilio.com, retrieved Sep. 14, 2011, published on Jun. 5, 2008, 12 pages.
"Understanding Direct Push," Microsoft, Feb. 18, 2009, available at http://technet.microsoft.com/en-us/library/aa997252(v=exchg.80).aspx, retrieved on Mar. 30, 2012, published on Feb. 18, 2009, 3 pages.
"Urban Airship: Powering Modern Mobile," available at http://urbanairship.com/products/, retrieved on Sep. 16, 2011, published on Feb. 19, 2010, 14 pages.
"eSoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 30, 2012, published on Mar. 23, 2010, 2 pages.
"zVeloDB URL Database," zVelo, available at https://zvelo.com/technology/zvelodb-url-database, retrieved Mar. 30, 2012, published on Jan. 21, 2012, 2 pages.
U.S. Appl. No. 13/160,447. Prosecution history available.
"Berry Locator", available at http://www.mobireport.com/apps/bl/, retrieved on Aug. 10, 2011, published Feb. 8, 2008.
"F-Secure Mobile Security for S60 User's Guide," F-Secure Corporation 2009, 34 pages.
"Firefox," Wikipedia, Jul. 20, 2011, available at <http://en.wikipedia.org/wiki/firefox> retrieved Aug. 10, 2011, 37 pages.
"I'm Aza Raskin@aza. I make shiny things. I simplify.", "Vote! How to Detect the Social Sites Your Visitors Use", web page downloaded Nov. 4, 2013 from http://www.ararask.in/blog/postlsocialhistoryjs, pp. 1-83.
"Java Virtual Machine," Wikipedia, Aug. 7, 2011, available at <http://en.wikipedia.org/wiki/Java_Virtual_Machine> retrieved Aug. 10, 2011, 7 pages.
"Kaspersky AV," Kaspersky Lab 1997-2007, 1 page.
"Kaspersky Mobile Security-Anti Theft", Kaspersky Lab 2008, available at http://www.kaspersky.com/kaspersky_mobile_security, 2 Pages.
"Kaspersky Mobile Security-Home Computer Security," Kaspersky Lab 2008, available at <http://www.kaspersky.com/kaspersky_mobile_security> , 1 pages.
"Norton Smartphone Security," Symantec, 2007, available at <http://www.symantec.com/norton/smartphone-security> retrieved Oct. 21, 2008, 2 pages.
"PhoneBak PDA Phone Anti-theft software for your PDA phone", 2007, Bak2u Pte Ltd (Singapore) pp. 1-4.
"PhoneBak: Mobile Phone Theft Recovery Software", 2007, Westin Tech.
"Real world Computing" Jun. 16, 2008 (PC Pro) pp. 1.
"Sprint—Report that your device is lost or stolen", web page downloaded Apr. 11, 2013 from http://support.sprint.com/support/article/Report_that_your_device_is_lost_or_stolen/case-ba416758-20090629-143222.
"Symantec Endpoint Protection," Symantec, 2008, available at <http://www.symantec.com/business/products/family.sp?familyid=endpointsecurity>, 6 pages.
"Symantec Mobile Security Suite for Windows Mobile," Symantec, 2008, available at <http://www.symantec.com/business/products/sysreq.jsp?pcid=2241&pvid=mobile_security_suite_1>, 5 pages.
"Virgin Media—Phone Lost or Stolen?", web page downloaded Apr. 11, 2013 from http://www.virginmobile.com/vm/ukCoverage.do?contentId=insurance.howdoi.sm283.
"Amazon.com: Mining the Web Discovering Knowledge from Hypertext Data (9781558607545): Soumen Chakrabarti: Books", Amazon available at http://www.amazon.com/exec/obidos/ASIN/1558607544/, retrieved on Jun. 7, 2012, published on Dec. 13, 2001, pp. 1-7.

(56) References Cited

OTHER PUBLICATIONS

Banerjee et al., "Users and Batteries: Interactions and Adaptive Energy Management in Mobile Systems", LNCS 4717, (2007), pp. 217-234.
Benyon et al., "Applying user modelling to human-computer interaction design" AI Review 7, pp. 199-225, 1993, Kluwer Academic Publishers.
COMODO Group, Inc. website history page using wayback machine, "Digital Code Signing, Code Signing Certificates—COMODO", 2013, May 11, p. 1-6.
Clickatell, available at http://www.clickatell.com, retrieved Sep. 14, 2011, published on Jan. 18, 2011, 11 pages.
Content Security Policy 1.0, "W3C Candidate Recommendation Nov. 15, 2012", Internet Archive, Way Back Machine, available at https://web.archive.org/web/20131102204842/http://www.w3org/TR/CSP/, Retrieved Oct. 16, 2017, 10 pages.
Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.
Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.
David M. Nicol, Model-Based Evaluation: From Dependability to Security, 2006, IEEE, pp. 1-17.
E. Kirda, C. Kruegel. Protecting Users Against Phishing Attacks with AntiPhish. COMPSAC 2005, pp. 1-8.
European Patent Application 16789745.3, Extended Search Report, Aug. 1, 2018.
European Patent Application 13800352.0, Partial Search Report, Dec. 22, 2015.
European Patent Application No. 13800352.0, Extended European Search Report, May 17, 2016.
Extended European Search Report, EP18814342.4, mailed on Nov. 17, 2020.
Ferreira et al., "Understanding Human-Smartphone Concerns_A Study of Battery Life," In Proceedings of the 9th International conference on Pervasive computing (Pervasive 2011), Kent Lyons, Jeffrey Hightower, and Elaine M. Huang (Eds.). Springer-Verlag, Berlin, Heidelberg, pp. 19-33.
Fette, Ian "Understanding Phishing and Malware Protection in Google Chrome," The Chromium Blog, available at http://blog.chromium.org/2008_11_01_archive.html, retrieved on May 17, 2011, published on Nov. 14, 2008, 6 pages.
Fisher, Oliver, "Malware? We Don't Need No Stinking Malware!", Google, available at http://googlewebmastercentral.blogspot.com/2008/10/malware-we-dont-need-no-stinking.html, retrieved on Mar. 30, 2012, published on Oct. 24, 2008, 11 pages.
Fido Alliance, Universal 2nd Factor (U2f) Overview, FIDO Alliance Proposed Standard Oct. 9, 2014, http://www.fidoalliance.org/specs/fido-u2f-v1.0-ps-20141009/fido-u2f-overview-v1.0-ps-20141009.html, pp. 1-17, downloaded Dec. 26, 2014.
Final Office Action dated Feb. 1, 2011 for U.S. Appl. No. 12/255,626, filed Oct. 21, 2008; pp. 1-18.
Fleurey et al., "A Domain Specific Modeling Language Supporting Specification, Simulation and Execution of Dynamic Adaptive Systems", MODELS 2009, LNCS 5795, pp. 606-621, 2009, Springer-Verlag Berlin Heidelberg.
Ghazarian et al., "Automatic detection of users' skill levels using high-frequency interface events", User Model User adap-Itnter 20, pp. 109-146, 2010, Springer Science+Business Mediea B.V.
Gianluigi Caldiera et al.; Identifying and Qualifying Reusable Software Components; 1991 IEEE; pp. 61-70; < http://ieeexplore.ieee.org/stamp/stamp.jsp?tp=&arnumber=67210>.
Grafio "Stay Secure," Opera Software, Sep. 29, 2008, available at <http://widgets.opera.com/widget/4495> retrieved Oct. 21, 2008, 4 pages.
HTC "Mobile Wipe Smart Phone Management", pp. 1-4, published on Dec. 5, 2007, retrieved on Dec. 5, 2007.

* cited by examiner

CONFIGURING ACCESS TO A NETWORK SERVICE BASED ON A SECURITY STATE OF A MOBILE DEVICE

PRIORITY CLAIM AND CROSS-REFERENCE TO RELATED APPLICATIONS

The present application is a continuation application of U.S. patent application Ser. No. 16/241,504 filed Jan. 7, 2019, and entitled "Managing Access to Services Based on Fingerprint Matching", which is a continuation application of and claims priority to U.S. patent application Ser. No. 15/619,356 filed Jun. 9, 2017, issued as U.S. Pat. No. 10,218,697 on Feb. 26, 2019, and entitled "Use of Device Risk Evaluation to Manage Access to Services," the entire disclosures of which applications are hereby incorporated herein by reference.

The present application is related to U.S. Pat. No. 8,087,067, issued Dec. 27, 2011, titled "SECURE MOBILE PLATFORM SYSTEM," by Mahaffey et al., the entire contents of which is hereby incorporated by reference as if fully set forth herein.

The present application is also related to U.S. Publication No. US 2016/0099963, published Apr. 7, 2016, titled "METHODS AND SYSTEMS FOR SHARING RISK RESPONSES BETWEEN COLLECTIONS OF MOBILE COMMUNICATIONS DEVICES," by Mahaffey et al., U.S. Pat. No. 8,397,301, issued Mar. 12, 2013, titled "SYSTEM AND METHOD FOR IDENTIFYING AND ASSESSING VULNERABILITIES ON A MOBILE COMMUNICATION DEVICE," by Hering et al., and U.S. application Ser. No. 14/109,725, filed Dec. 17, 2013, titled "SYSTEM AND METHOD FOR IDENTIFYING AND ASSESSING VULNERABILITIES ON A MOBILE COMMUNICATIONS DEVICE," by Hering et al., the entire contents of which are hereby incorporated by reference as if fully set forth herein.

The present application is also related to U.S. Pat. No. 9,589,129, issued Mar. 7, 2017, titled "DETERMINING SOURCE OF SIDE-LOADED SOFTWARE," by Richardson et al., the entire contents of which is hereby incorporated by reference as if fully set forth herein.

FIELD OF THE TECHNOLOGY

At least some embodiments disclosed herein relate to security evaluation in computer systems, and more particularly, but not limited to performing a security evaluation associated with access or attempted access by a computing device to a service (e.g., an online service provided by a service provider).

BACKGROUND

Mobile devices such as cell phones and personal digital assistants (PDAs) can be attacked by exploits or viruses that are specifically adapted for the mobile environment. Exploits can take advantage of security vulnerabilities associated with a mobile device in order to execute malicious code or perform undesired actions on the device. Potentially, exploits can bypass permissions or policies set by the user, manufacturer, operating system, or mobile operator and give the attacker complete control of the device. Mobile viruses are typically spread by downloading infected programs or files. Some viruses only become active if the recipient chooses to accept the virus file and run it on the mobile device. Other viruses, when combined with exploits, are self-propagating worms that may not need user intervention in order to spread, potentially creating a very severe and widespread security problem.

Devices may be compromised by viruses and exploits over wide area networks, such as the Internet or a cellular network, and local wireless networks, such as Wi-Fi or Bluetooth. For example, some devices which are equipped with Bluetooth allow other nearby Bluetooth-enabled devices to transfer files or other data such as contact information. Bluetooth-enabled devices that are infected with viruses often search for nearby devices that are in "discoverable" mode. When an infected device discovers a target, it may send a virus disguised as a security update or another item designed to fool the target device's user into accepting the transfer and executing the virus. If a virus were to utilize an exploit instead of disguising itself in order to get a target user to accept the file transfer, a device which is in "discoverable" mode could become infected without the user being able to intervene.

In addition to being able to propagate viruses, exploits may be able to directly perform malicious actions on vulnerable devices. Such exploits may be used by attackers to steal information, charge money to the target device's phone bill, or prevent a device from functioning properly. Although vulnerabilities which take advantage of exploits may be fixed if the software vendor responsible for the vulnerability provides a patch or firmware upgrade, such fixes are often costly and time consuming to release and difficult for users or IT organizations to apply.

It is desired that both individual users and IT organization be able to verify that their security protection is functioning properly and be aware of the security state of their devices so as to be able to remediate or investigate issues as early as possible. If a device or group of devices has a security problem or has recently been attacked, the user or administrator responsible may not immediately know because mobile devices and existing solutions may not continuously present security status information and attempt to push important events to users and administrators.

What is needed in some cases is a system and method for identifying, reporting, and preventing mobile security problems and for providing security information concerning the state of a mobile device or group of mobile devices to a user or administrator. The system and method should keep users or administrators continuously aware of security status, recent security-related events, and potential security threats without requiring them to repeatedly seek out security-related information.

Because of inherent security concerns, mobile communications devices such as mobile phones, PDAs, and smartphones have yet to provide the same breadth of trusted connectivity found on desktop and laptop computer platforms. For example, mobile device users are less likely to access confidential information and/or perform financial transactions with a mobile communications device because such devices are not sufficiently secure. Similarly, service providers such as banks, online payment services and providers of confidential information are less likely to offer access to their services through mobile communications devices. As a result, mobile communications device users are limited by the types and availability of many online services. This is because present methods for securing mobile communications devices do not contemplate many ways users may wish to access online services and online service providers, and are therefore inadequate for providing a secure platform for access to and from online services or service providers.

Previous methods for securing mobile communications devices focus on an all-or-nothing approach. Access to or from the mobile device is either granted or not granted based upon whether the device meets certain standards, possesses certain configurations, or adheres to certain policy rules. If the device passes these standards, access is granted. If the device is deficient in any way, access is denied. Such an approach does not consider the types or levels of access required by certain service providers, nor does this approach contemplate the security and repair capabilities of the device itself. Indeed, prior art security systems and methods ignore the recent activity of the mobile device in relation to its overall security state. Furthermore, prior art security systems are typically limited to authorizing access to a given network, making them unsuitable for controlling access and access levels to services and service providers based on a device's security state.

What is therefore needed in some cases is a system and method for providing security for mobile communications devices that considers the security state of the device and provides a platform for integrating with services and service providers.

Detecting attacks on a mobile communications device presents challenges not found on traditional computing platforms. Mobile communications devices lack the hardware, software and memory resources of a traditional computer. As such, storing vast signature databases on the mobile communications device is not feasible, and running complicated analysis systems strains the device's memory, battery, and CPU. Other security solutions have been found unsuccessful at detecting attacks specifically directed to a mobile communications device, since mobile communications devices provide functionalities not found on traditional computers. For example, a mobile communications device may be attacked via network data, files, or executables received over various network interfaces such as Bluetooth, Wi-Fi, infrared, or cellular networks.

One of the issues that make it difficult to protect mobile communications devices from undesirable applications is the many different types of data and applications that are available for such devices. While service providers are able to manage the network traffic in providing applications, there is no current way to effectively monitor the behavior of these applications after they have been installed on a user's mobile communications device. As a further result, it is difficult to identify new, previously unknown malicious applications by their behavior and to track and prevent the spread or dissemination of damaging applications and data once they have been released to the network. It would be desirable to provide a system that can actively monitor a group of mobile communications devices in order gather data about the installation and behavior of applications on mobile communications devices.

Also, the source of an access request may be difficult to determine. For example, an enterprise employee visiting London, England on vacation with a sudden, urgent business issue may use free Wi-Fi in a coffee shop to VPN from her iPhone into her enterprise computer, which she left up and running in California. The employee may use that VPN access to command the enterprise computer to access enterprise resources. Typically, the enterprise backend would not know that the enterprise computer is projecting its display and sending enterprise data all the way to London. The enterprise would also not know the security status of the Wi-Fi connection or the iPhone.

What is therefore needed in some cases is a method for determining whether to allow or deny an access request based on knowledge of the source of the access request and knowledge of the security of the computing devices and network infrastructure involved in the transmission of the access request.

SUMMARY OF THE DESCRIPTION

Systems and methods for security evaluation associated with a request for access by a computing device to a service (e.g., an online or network service) are described herein. Various embodiments are described below.

In one embodiment, a method includes: receiving a request regarding access by a first computing device (e.g., a mobile device of a user) to a service; in response to the request, performing, by a second computing device (e.g., an evaluation server, or a server of an identity provider), an evaluation of the first computing device; and performing, by the second computing device, an action (e.g., authorizing access to the service) based on the evaluation.

In one embodiment, a method includes: receiving a request regarding access by a first computing device to a service; in response to the request, performing, by a second computing device, an evaluation of a configuration of the first computing device, wherein the evaluation comprises determining a risk level; and performing, by the second computing device, an action based on the evaluation, wherein the action comprises sending a communication to a computing device of an identity provider, the communication indicating the risk level. In one embodiment, the service is provided by a service provider, and the identity provider is of record with the second computing device and/or the service provider as the identity provider to use for requests for access to the service. In one embodiment, the identity provider determines whether to authorize access (and/or to what extent to permit such access) to the service by the first computing device based on the risk level in the received communication.

The disclosure includes various methods and devices which perform the above methods and systems, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
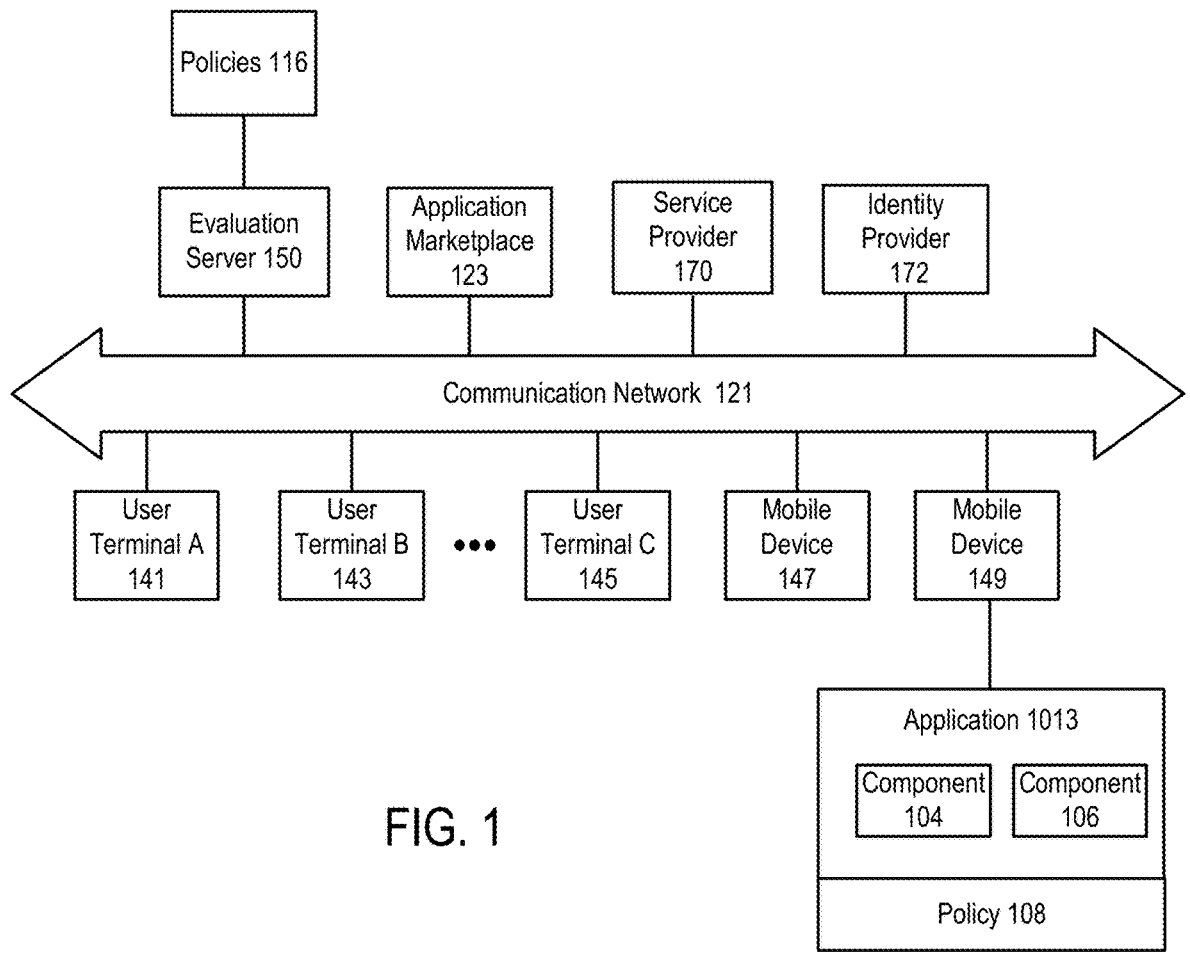
FIG. 1 shows a system for performing a security evaluation by an evaluation server 150 in response to a request for access to a service provided by a service provider, according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Various embodiments regarding evaluation of device risk performed in response to a request for access to a service are described below. The evaluation may be performed, for example, by the evaluation server 150 above. In one embodiment, a method includes: receiving a request regarding access by a first computing device (e.g., mobile device 149 of FIG. 1) to a service; in response to the request, performing, by a second computing device (e.g., evaluation server 150 of FIG. 1), an evaluation of a configuration of the first computing device; and performing, by the second computing device, an action based on the evaluation.

In one embodiment, the service is provided by a third computing device (e.g., service provider 170 of FIG. 1), and the request is received from the first computing device or from the third computing device. In one embodiment, the request is received from a computing device of an identity provider 172 in FIG. 1.

In one embodiment, the evaluation determines that the configuration is not secure, and the action is blocking access by the first computing device to the service.

In one embodiment, the service is provided by a third computing device, the method further comprises receiving first data from the first computing device that is used in the evaluation, and the action is sending the first data to the third computing device.

In one embodiment, the first data is received from a software component installed on the first computing device, and the software component obtains the first data from the first computing device. In one embodiment, the second computing device receives aggregated information as described in U.S. Publication No. US 2016/0099963, discussed below. The evaluation is performed using at least the aggregated information.

In one embodiment, the action is sending a communication to a third computing device that grants access to the service by the first computing device, wherein software is installed on the first computing device, and wherein the evaluation comprises at least one of determining a source of the software, evaluating authenticity of the software, or analyzing at least one component of the software.

In one embodiment, the evaluation determines an extent of security risk for the configuration of the first computing device, and wherein an extent of access to the service provided to the first computing device is based on the determined extent of security risk. For example, a security component 6735c, as is described below, may allow access to the service in a limited fashion (e.g., run with output quarantined).

In one embodiment, the evaluation determines that the configuration passes a security threshold, and the action is sending a communication to a third computing device regarding the passed security threshold.

In one embodiment, a third computing device provides the service, and the method further comprises: generating a token for the first computing device, the token comprising first data encoding a risk level determined from the evaluation; and providing the token to the first computing device, wherein the first data is used by the third computing device to configure the service provided to the first computing device.

In one embodiment, the third computing device is configured to determine, using the first data, a risk state associated with providing service to the first computing device.

In one embodiment, the service is provided by a third computing device, and the method further comprises: extracting first data from a communication received from the first computing device or the third computing device, wherein the communication includes the request, or the communication is received subsequent to receiving the request; and performing the evaluation using the first data.

In one embodiment, the request regarding access to the service is generated by an application executing on the first computing device; performing the evaluation comprises determining an authenticity of the application; and performing the evaluation further comprises assessing a context of a user of the first computing device, the context comprising at least one of: a location of the first computing device, a device location for a prior login made to the service by the user, an event associated with a presence of the user on a computing device other than the first computing device, or credentials associated with the user that have become unsecure.

In one embodiment, the first computing device is associated with a domain, the method further comprises receiving a communication from a third computing device associated with the domain, and the evaluation comprises using data from the communication to evaluate the configuration of the first computing device.

In one embodiment, access to the service requires that a software component is installed on the first computing device, and the method further comprises: in response to determining that the software component is not installed on the first computing device, sending a communication to the first computing device requesting installation of the software component; after sending the communication, determining that the software component is installed on the first computing device; and in response to determining that the software component is installed on the first computing device, sending a communication to cause a third computing device to grant the access to the service.

In one embodiment, a non-transitory computer-readable storage medium stores computer-readable instructions, which when executed, cause a first computing device to: receive a request regarding access by a second computing device to a service; in response to the request, perform an evaluation of the second computing device; and perform, by at least one processor, an action based on the evaluation.

In one embodiment, the instructions further cause the first computing device to receive security data from a software component installed on the second computing device, wherein the evaluation is performed using the security data to determine a security state of the second computing device, and wherein the action is authorizing access to the service by the second computing device at an access level dependent on the determined security state.

In one embodiment, a system includes: at least one processor of a first computing device; and memory storing instructions configured to instruct the at least one processor to: receive a request regarding access by a second computing device to a service; in response to the request, perform an evaluation of the second computing device; and perform an action based on the evaluation.

In one embodiment, a third computing device provides the service, and the first computing device is recorded by the third computing device as an identity provider for requests to access the service.

In one embodiment, a fourth computing device is an identity provider (e.g., identity provider 172 of FIG. 1), and the action is sending a communication from the first computing device to the fourth computing device that authorizes access to the service by the second computing device.

In one embodiment, the instructions are further configured to instruct the at least one processor to receive security state information regarding a state of the second computing device, wherein the evaluation is performed using the security state information to determine a security state of the second computing device, wherein the action is authorizing access to the service by the second computing device at an access level depending on the determined security state, and wherein the security state information comprises at least one of a device identifier, a configuration, a setting, information on a security event, or a device state.

Various methods are described in U.S. Publication No. US 2016/0099963, titled "METHODS AND SYSTEMS FOR SHARING RISK RESPONSES BETWEEN COLLECTIONS OF MOBILE COMMUNICATIONS DEVICES," and incorporated by reference, for determining an enterprise risk level, for sharing security risk information between enterprises by identifying a security response by a first enterprise and then sharing the security response to a second enterprise when a relationship database profile for the first collection indicates the security response may be shared. Methods are also provided for determining whether to allow a request from an originating device where the request may have been initiated by a remote device. In one embodiment, the security risk information is used in the security evaluation performed (e.g., by the evaluation server 150 of FIG. 1 above or by another computing device) in response to the access request above. In one embodiment, the security evaluation may be performed as described in U.S. Publication No. US 2016/0099963. In one embodiment, data obtained from a mobile communications device is evaluated by the evaluation server 150 of FIG. 1 above to determine if granting the device access to a service presents a security threat.

In one embodiment, aggregated information as described in U.S. Publication No. US 2016/0099963 is used in the security evaluation above. In one embodiment, a method is provided for passing aggregated information, such as source information, along with an access request. In the embodiment, aggregated information may be used to determine whether to allow an attempt to access a resource. The aggregated information may include, for example, user authentication information and source information, and source information may include, for example, information about the state of the initiating and originating computing devices, attributes or identifies of applications being used in the access attempt, and similar information from any intermediate ("intervening" or "chained") application or computing device that is part of the access attempt.

The aggregated information may be passed with the access request in a number of ways, including, for example: as SAML security assertion extensions, as additional HTTP headers, or via a separate flow. In a further example, a single sign-on (SSO) provider (or Identity Services Provider, such as for example identity provider 172 of FIG. 1 above) may piggyback the aggregated information onto an access request (or responses), and security components on computing devices in the access request chain may add their contributions to the aggregated information in the SSO information flow.

As described in FIG. 67 (note that this figure is shown only in U.S. Publication No. US 2016/0099963), a system 6700 employs a method for determining whether to allow or deny an access request 6745 based on a destination security component 6735*c* being able to evaluate source information from any computing device involved in the transmission of access request 6745. In FIG. 67, a user 6705 initiates access request 6745 using a computing device 6710. Computing device 6710 transmits access request 6745 to a computing device 6720 using a network connection 6715, which in turn relays access request 6745 to a destination computing device 6730 using a network connection 6725. Computing device 6710 is both an initiating computing device and an originating computing device. Computing device 6710 is the initiating computing device because the user used it to initiate access request 6745. Computing device 6710 is also the originating computing device because the actual request was transmitted from computing device 6710 to destination computing device 6730. Computing device 6720 is a terminal device, i.e., computing device 6720 is the device that transmits access request 6745 to destination computing device 6730. Computing device 6720 is also an intermediate computing device in that it is between the initial computing device 6710 and destination computing device 6730 along the route of access request 6745. Computing devices 6710, 6720 create a series 6740 of computing devices by which access request 6745 is initiated, originated, and transmitted to destination computing device 6730. In a series of one computing device the single computing device performs the functions of initiating the request, originating the request, and transmitting the request to the destination computing device.

In FIG. 67 of U.S. Publication No. US 2016/0099963, computing devices 6710, 6720, and 6730 are running instances of a security component 6735*a*, 6735*b*, and 6735*c*, respectively. Security components 6735*a*, 6735*b*, and 6735*c* monitor the respective computing device and determine if the device is secure ("trusted") or not, according to policies under which the security components are operating. Security components 6735*a*, 6735*b*, and 6735*c* monitor, e.g., the inputs, outputs, communications, applications, and network connections of their respective devices. Security components 6735*a*, 6735*b*, and 6735*c* are thereby able to determine, for example, whether their respective computing devices initiated access request 6745, originated access request 6745, or transmitted (or "relayed") access request 6745 received from another computing device. In monitoring a device, security components 6735*a*, 6735*b*, and 6735*c* may identify computing devices that communicate with the monitored computing device and associate those identities with any communications from or to the identified computing device. Additionally, security components 6735*a*, 6735*b*, and 6735*c* may communicate with each other regarding the security state and other information regarding their monitored computing devices. Furthermore, security components 6735*a*, 6735*b*, and 6735*c* may communicate to each other information relating to access request 6745, such as whether the monitored device initiated access request 6745, whether the monitored device originated access request 6745, whether the monitored device transmitted access request 6745 received from another device, the identity of any device that controlled the monitored device to cause the monitored device either originate access request 6745 or to control another device, and the identity of any device that transmitted access request 6745 to the monitored device. For example, security component 6735*a* may communicate with security components 6735*b* and 6735*c*, sending source information 6755 to security component 6735*b* in parallel with access request 6745. Source information 6755 may include that computing device 6710 is trusted (or not), that computing device 6710 initiated access request 6745 (i.e., was not being controlled by another device), and that computing device 6710 originated access request 6745 (i.e., created and sent access request 6745). Security component 6735*b* may receive this information and may itself communicate to security component 6735*c*, sending source information 6765 to security component 6735*c* in parallel with access request 6745. Source information 6765 may include that computing device 6720 is trusted (or not) and that computing device 6720 received access request 6745 from computing device 6710. Security component 6735*b* may also forward source information 6755 to security component 6735*c* in parallel with access request 6745.

As described in U.S. Publication No. US 2016/0099963, responses to an access request other than or in addition to "allow" and "deny" are allowed. For example, if the access request related to running an application on the destination computing device and the associated source information indicted that a computing device in the series was untrusted, security component 6735*c* may allow the request in a limited fashion (e.g., run with output quarantined), or deny the request and initiate or suggest to the user the uninstallation of the target application.

In one embodiment, a source of a software component on one or more of the series of computing devices by which an access request is transmitted (as described in U.S. Publication No. US 2016/0099963) may be determined as described below in the section titled "Side-Load Protection". In one embodiment, these software components may further be analyzed as described below in the section titled "Analyzing Components of an Application", or as otherwise described below.

U.S. Pat. No. 8,087,067, titled "SECURE MOBILE PLATFORM SYSTEM," and incorporated by reference, describes a secure platform which enables mobile devices, such as a cell phones, smartphones, or PDAs, to have relationships with services or service providers that are controlled by the state of security on each device. In one example, the platform is comprised of a server that receives data from security software on a mobile device regarding the device's security state. The platform enables access to a service to be granted, denied, or limited based on the security state of the mobile device. The platform may provide two-way communications between a mobile device and a service so that the platform can enforce access security both from the client to the service and from the service to the client. Furthermore, the platform allows services or service providers to evaluate the security state of a device independently of using the platform to communicate with the device.

As described in U.S. Pat. No. 8,087,067, a system provides, by a software component on a computing device (e.g., for components on any one or more devices in a series of devices transmitting an access request, as discussed above), a dynamic assessment of a security state of a computing device (e.g., this assessment may be performed by the evaluation server 150 of FIG. 1 above). Here, the user of a mobile communications device may request access to a service provider. This may be where the user attempts to access a banking service or other network based service using software installed on a handset. This request may be managed by a server, which receives the request from the computing device. The server may access a database or other memory to determine whether it has updated security state information for the device. If not, then, this security state information is obtained from the device. Once obtained, the security state for the device may be assessed. If the security state is acceptable, then the device may have access to the service provider. If the device security state is unacceptable, then access may be limited or denied. The acceptability of a device's security state and the level of access to the mobile communications device may be set, for example, by the service provider. In various embodiments, the access control as described by U.S. Pat. No. 8,087,067 may be used to control access to the service provided by service provider 170 of FIG. 1 above.

A system and method for reporting security information relating to a mobile device are described in U.S. Publication No. US 2010/0100964, published Apr. 22, 2010, now U.S. Pat. No. 8,060,936, issued Nov. 15, 2011, titled "SECURITY STATUS AND INFORMATION DISPLAY SYSTEM," by Mahaffey et al., the entire contents of which is hereby incorporated by reference as if fully set forth herein. In one embodiment, the security evaluation performed above (e.g., by the evaluation server 150 of FIG. 1 above) is a security assessment as described in U.S. Publication No. US 2010/0100964. This security assessment is displayed in various formats on the mobile device display or on a client computer. A security component identifies security events on the mobile device that are processed on the mobile device or by a server. The security component then determines a security assessment for the mobile device based upon the detected security events. The security assessment display may be persistent in the form of a desktop widget or dashboard on a client computer, or home-screen item on the mobile device. This allows a user or administrator to verify that security protection on the device is functioning and to be alerted if the device needs attention without having to specifically seek the information, thereby enabling immediate response to potential security problems.

A method for evaluating security is described in U.S. Publication No. US 2014/0325586, published Oct. 30, 2014, now U.S. Pat. No. 9,307,412, issued Apr. 5, 2016, titled "METHOD AND SYSTEM FOR EVALUATING SECURITY FOR AN INTERACTIVE SERVICE OPERATION BY A MOBILE DEVICE," by Halliday et al., the entire contents of which is hereby incorporated by reference as if fully set forth herein. This method evaluates security during an interactive service operation by a mobile communications device and includes launching, by a mobile communications device, an interactive service configured to access a server over a network during an interactive service operation, and generating a security evaluation based on a plurality of trust factors related to a current state of the mobile communications device, to a security feature of the application, and/or to a security feature of the network. When the security evaluation is generated, an action is performed based on the security evaluation. In one embodiment, the evaluation server 150 above performs an evaluation as described by U.S. Publication No. US 2014/0325586, including use of a threshold as described therein. In one embodiment, these plurality of trust factors are included in the first data above received by the evaluation server 150 for use in the evaluation. In one embodiment, the action performed by the evaluation server 150 is an action as described by U.S. Publication No. US 2014/0325586.

FIG. 1 shows a system for performing a security evaluation by an evaluation server 150 in response to a request for access to a service provided by a service provider 170, according to one embodiment. In FIG. 1, the user terminals (e.g., 141, 143, . . . , 145) and/or mobile devices (e.g., 147, 149) are used to access and/or communicate with evaluation server 150, service provider 170, identity provider 172, application marketplace 123 (e.g., an Android or Google Play store or marketplace, or an enterprise application store), and/or a developer server (not shown) over a communication network 121 (e.g., the Internet, a wide area network, a local network, or other wired or wireless communications network).

Network 121 may be used to download and remotely install applications selected from marketplace 123 (e.g., using Google Play or the Android Market). Marketplace 123 may include one or more web servers (or other types of data communication servers) to communicate with the user terminals (e.g., 141, 143, . . . , 145) and mobile devices 147, 149. Each of these applications may initiate or originate an access request for a service provided by service provider 170.

Specifically, mobile device 149 may download a new application 1013 from application marketplace 123 or a developer server (not shown). An application obtained from the developer server is signed using a signing certificate.

New application 1013 has components 104 and 106. Application 1013 may generate an access request that is transmitted to evaluation server 150 (e.g., transmitted using a series of computing devices originating with mobile device 149). In one embodiment, component 104 is a software component (e.g., a security component) that generates or obtains data regarding a risk configuration of a computing device (e.g., a risk configuration of mobile device 149, on which a user initiates a request for access). For example, a user action in a user interface displayed on mobile device 149 causes component 104 to initiate an access request for a service provided by a computing device of service provider 170. The access request is transmitted to evaluation server 150, which performs a security evaluation of a configuration of mobile device 149 based on various factors, as discussed below in more detail.

If evaluation server 150 authorizes the access, server 150 sends a communication over network 121 to service provider 170 regarding authorizing access to the service. In an alternative embodiment, evaluation server 150 sends this communication to identity provider 172, which then performs additional authentication or identification services. In one embodiment, server 150 determines a risk level for mobile device 149 and includes this risk level in the communication to service provider 170 and/or identity provider 172.

In one embodiment, when component 104 makes a request for access to the service, the request is first sent to service provider 170. Then, service provider 170 forwards the access request to evaluation server 150. Evaluation server 150 performs a security evaluation of risk factors associated with mobile device 149. If the evaluation determines that the configuration is not secure, server 150 blocks access by mobile device 149 to the service.

In one embodiment, the security evaluation is based on data received from the mobile device 149. At least a portion of this data can be sent to service provider 170 and/or identity provider 172 along with a result of the security evaluation. In one embodiment, this data is received from component 104, or from another software component such as component 106 that is on mobile device 149. The data sent to evaluation server 150 is obtained from the mobile device using this software component.

In one embodiment, the security evaluation by server 150 includes determining a source of application 1013, component 104, and/or component 106. In one embodiment, the security evaluation includes evaluating authenticity of software on mobile device 149 and/or analyzing at least one component installed or otherwise stored on mobile device 149.

In one embodiment, the security evaluation determines an extent of security risk for mobile device 149 based on a plurality of factors. The extent of access to the service provided to mobile device 149 is based on this extent of security risk.

In one embodiment, the security evaluation determines that a risk configuration of mobile device 149 passes a security threshold. If the threshold is passed, server 150 sends a communication to service provider 170 and/or identity provider 172 regarding the passed security threshold. This communication may include data obtained from mobile device 149 and used in the security evaluation above.

In one embodiment, a token is generated for mobile device 149. This token includes data that encodes a risk level determined from the security evaluation. The token is provided to mobile device 149 by evaluation server 150 or another computing device such as service provider 170. The risk level and/or data obtained and used in the security evaluation is provided to service provider 170 to configure the service provided to mobile device 149. In one embodiment, service provider 170 uses the risk level and/or data from the security evaluation to determine a risk state associated with providing the service to mobile device 149.

The service may be dynamically reconfigured periodically and/or in real-time as subsequent security evaluations are performed for mobile device 149. Also, if the risk state fails a threshold determination, then the user of mobile device 149 may be alerted by a display or other communication on mobile device 149 that the service is blocked. In addition, the user may be requested to take remedial action using mobile device 149 and/or another computing device of the user.

In one embodiment, if it is determined by evaluation server 150 in a security evaluation, performed after a user has started receiving a service, that a risk level associated with mobile device 149 exceeds a threshold or is otherwise un-trusted, then an open session of the user with the service from service provider 170 can be closed. Also, any token of device 149 indicating a healthy or safe configuration of the device can be revoked or destroyed. This prevents further access to the service by the device. In one embodiment, if access to a service is terminated as just described, identity provider 172 can be notified of the change by evaluation server 150. Also, a level of access to the service can be decreased based on the newly-determined risk level, instead of terminating all access to the service.

In one embodiment, if it is determined by evaluation server 150 that mobile device 149 is not configured correctly or adequately as determined by a risk level, various actions may be taken. For example, mobile device 149 may be instructed to take a photo that is uploaded to server 150, acquire a device location and upload to server 150, and/or erase sensitive data on mobile device 149. Other examples include disabling login credentials, instructing the user how to remediate the problem, allowing login by the user, but denying access to certain services, revoking a token already in use by the device, and/or changing a password for the service.

In one embodiment, data used in the security evaluation by evaluation server 150 is extracted from one or more communications received from mobile device 149, from service provider 170, and/or identity provider 172. In some cases, such communication can be the communication that includes the access request. In other cases, the communication is received prior to or subsequent to receiving the access request.

In one embodiment, the access request is generated by application 1013, which is executing on mobile device 149. Performing the security evaluation includes determining the authenticity of application 1013, for example as discussed below.

In one embodiment, the security evaluation can include assessing a context of a user of mobile device 149. This context can be determined by various factors including a location of mobile device 149, a device location for at least one prior login made by the user (e.g., a prior login to the service), an event associated with the presence of the user on a computing device other than mobile device 149 (e.g., this other device may be a tablet, a laptop, or a watch device of the user), or credentials associated with the user that have become unsecure (e.g., credentials that have been identified from monitoring of the dark web).

In one embodiment, mobile device 149 is associated with a domain. Evaluation server 150 performs an evaluation using data from one or more prior communications received by evaluation server 150. These prior communications may be provided from other computing devices associated with the domain.

In one embodiment, access to the service from service provider 170 requires that a software component is installed on mobile device 149. In response to determining that the software component is not installed, the communication is sent to the mobile device requesting installation of the software component. After sending this communication, evaluation server 150 determines whether the software component is properly installed on mobile device 149. If so, server 150 sends a communication to cause service provider 170 or identity provider 172 to authorize or grant access to the service.

In various embodiments, access to a service provided by service provider 170 is conditioned on a successful evaluation of various risk-based factors. Mechanisms that may be used to authenticate a device, user, and/or application by evaluation server 150 include one or more of the following: requiring that an SSL client certificate be supplied for each access request by mobile device 149, evaluating authentication factors provided from network connection establishment (e.g., Wi-Fi, VPN, cellular, etc.) by mobile device 149, or evaluating authentication factors provided from establishment of a network tunnel or proxy connection for mobile device 149.

In various embodiments, factors used in a security evaluation by evaluation server 150 to allow or deny access to a service are now described below:

1. Various device factors associated with mobile device 149 include determining whether the device is compromised, such as whether an operating system is compromised, whether the device is up-to-date, such as whether a vulnerable operating system version is in use. Further factors include determining a presence of malware, or determining whether the device has a secure configuration. For example, determining whether a bad SSL root identified for certificate authorities is installed on the device, an anomalous VPN/proxy is identified, whether device encryption enabled, and/or whether a pin code is enabled. Further factors include evaluating hardware-backed authentication associated with mobile device 149. For example, determining whether a device key is stored in a secure enclave, or whether a server provides a nonce which mobile device 149 signs with hardware to prove presence of hardware-stored key.

2. Various user factors may be used in the security evaluation. These factors may include biometric factors such as a fingerprint, or knowledge-based factors such as whether a user of mobile device 149 is able to answer knowledge-based questions (e.g., about the user's background or prior life or work activities).

3. Various application factors may be used in the security evaluation. These factors may include determining whether application 1013 on mobile device 149 is an authorized or allowed version of the application. For example, whether the application is the official enterprise application or an unofficial version. Also, these factors include determining whether the application is up-to-date, such as whether there is a known vulnerability in this particular application.

4. Various context factors may be used in the security evaluation. These factors may include determining a location of device 149, other recent user logins and respective devices/locations associated with these logins, and/or other user-present events (e.g., a badge in, CCTV facial recognition, Wi-Fi connections, and Bluetooth beacon detections).

In various embodiments, various mechanisms are used to authorize access to the service by service provider 170, as now described below:

1. At authentication time, one or more the following mechanisms may be used:
    a SAML proxy when the user is logging into a service using mobile device 149 (e.g., evaluation server 150 is the SAML identity provider of record, that proxies to a secondary identity provider if and only if risk factors are evaluated and pass a threshold).
    an MFA (multi-factor authentication) challenge performed by identity provider 172 (e.g., identity provider 172 requires an MFA challenge from evaluation server 150, which is successfully complete if and only if risk factors are evaluated by server 150 as being OK). As another example, integration occurs by API integration or in a rotating-code MFA system by an on-device client requiring information from the server in order to access its random seed).
    As a risk check performed by identity provider 172 (e.g., identity provider 172 communicates with evaluation server 150 using an API at time of authentication).
    As a pre-set state known to identity provider 172 (e.g., evaluation server 150 pre-sets a device/user/application risk state in identity provider 172, then evaluation server 150 changes this risk in real-time as results from subsequent security evaluations change).
    SSL client certificates whose validity changes dynamically by evaluation server 150 operating dynamic OCSP or CRL services.

2. At network connection time (e.g. VPN, Wi-Fi, cellular, or other network), various mechanisms are used to determine which of network segments associated with the network connection should be authorized, as follows:
    Network verifies a risk state as part of connection establishment by an on-device client (e.g., component 104) providing information to a network authentication service.
    Mobile device 149 provides a service that the network can query (e.g., an HTTP server running on the device).
    The network can consult a third-party risk service to retrieve the latest risk information about mobile device 149.

3. The following mechanisms can be used for each access request or interaction by mobile device 149:
    An identity-aware proxy that validates a risk level associated with mobile device 149 on a per-request basis. The service is configured only to allow requests from the identity-aware proxy (e.g., via only accepting requests from a particular IP address, or via request augmentation such as signed headers or tokens).

4. Out-of-band authentication:
    A service authenticates a device, application, user, etc., and requests a risk status of any/all of the foregoing from evaluation server 150.

Variations of Security Evaluation

Various additional embodiments of performing a security evaluation in response to an access request are now described below. The embodiments below do not limit the generality of the foregoing discussion.

In one embodiment, upon the user of a device or the device directly requesting the use of a service, the evaluation server determines whether a certain client application is present on the device. If the client application is not present and/or activated, then the evaluation server requires the delivery, installation and/or activation of the client application on the device before access to the service is granted.

If it is determined that the certain client application is present and activated, then the client application checks to see if the device is configured sufficiently well. In one embodiment, the device is sufficiently configured for service access if an evaluation of factors by the evaluation server passes a threshold.

In one embodiment, if it is determined that the certain client application is installed on mobile device 149, evaluation server 150 attempts to uniquely identify mobile device 149 based on information that the evaluation server 150 has previously stored and/or information received as part of authenticating mobile device 149. For example, the received information includes information regarding the type of device, the operating system the device is running, an IP address provided by the device, etc. In one embodiment, the foregoing information regarding the device is cross-referenced with a data set stored for a given enterprise. Based on this cross-referencing, evaluation server 150 can send a push notification to the device (e.g., a Google cloud message for an Android device).

In one embodiment, evaluation server 150 stores (e.g., in one or more databases accessible by server 150) a plurality of snapshots of the security configuration of mobile device 149 and other computing devices that have requested access to service provider 170. Each of these snapshots comprises data for a particular device as used in prior security evaluations. These stored snapshots can be used in performing a new security evaluation.

In one embodiment, for latency reasons, evaluation server 150 determines the time that the device last checked in with server 150 and was in a secure state (e.g., determined to be an acceptable or low-risk device). If the device was determined secure at this last check-in, evaluation server 150 determines that there is no need to wake up or otherwise interact with that device in real-time for a new security evaluation. Instead, evaluation server 150 authorizes access to the service in reliance on the prior snapshot, or prior risk state determination that falls within a predetermined time period.

In one embodiment, if evaluation server 150 determines that the client application is not installed on mobile device 149, evaluation server 150 creates a fingerprint of mobile device 149. This fingerprint comprises all information previously collected and/or newly-obtained about device 149. For example, some of this information is extracted from the communications with mobile device 149 as part of an authentication or identity communication flow.

Also, for example, this extracted information includes who the user is, what type of device is being used by the user, data extracted from the one or more HTTP or other headers of communications from the device (e.g., these headers may data regarding what service application the device is attempting to access), what operating system version the device is using, the IP address of the device, etc.

Evaluation server 150 checks to determine if this device fingerprint matches other data for fingerprints of any other devices that have interacted with evaluation server 150. In one case, these devices are other devices of the user of mobile device 149. In some cases, if the client application is not installed on the device, evaluation server 150 sends a communication causing mobile device 149 to request that the user install the client application.

In one embodiment, evaluation server 150 collects data from the device and sends the data to a cloud back-end server system accessible to server 150 in order to compare the collected data to other data that evaluation server 150 has collected. Types of data collected include, for example, an application inventory of all apps installed on the device, version numbers for the apps, and what are the hashes and unique identifiers associated with those applications. Evaluation server 150 fingerprints the filesystem of the device (e.g., firmware, etc.) and calculates a fingerprint for the device so evaluation server 150 can determine when a device is running modified firmware or other (improperly) modified software.

In one embodiment, evaluation server 150 collects information regarding how the network is behaving (e.g., the network communication path between evaluation server 150 and mobile device 149, or communications by mobile device 149 with other computing devices). For example, evaluation server 150 runs a series of behavioral tests on each network to which mobile device 149 connects (e.g., whether the device is sending potentially hack-able communications to random or unknown servers; whether there been any attempt to downgrade the TLS or other secure version of protocol being used for communication; and/or whether the certificates that the device is receiving from these requests are valid, etc.).

In one embodiment, at least a portion of data associated with the security evaluation by evaluation server 150 is sent to service provider 170. The service provider can configure a policy regarding the type of data that is sent by evaluation server 150 (e.g., using a console provided to the service provider by evaluation server 150). Use of this policy can group the device based on the evaluated data into a risk class (e.g., high-risk or low-risk). Evaluation server 150 only communicates to service provider 170 the class of risk based on the previously-determined or configured policy (e.g., using the console) of the service provider.

In one embodiment, data collected by evaluation server 150 is fed into an identity access engine on identity provider 172. This fed data can be correlated with or joined with other data sets stored by identity provider 172.

In one embodiment, evaluation server 150 monitors numerous computing devices (e.g., 10,000 or more devices that are monitoring and/or managed as to policies 116). For example, when an enterprise is attacked, typically it is more than just one individual device that is attacked. Evaluation server 150 monitors for the rise or occurrence of certain types of events that are detected across one or more of these devices associated with a given enterprise. The level of risk determined by evaluation server 150 in the security evaluation may be correlated with the number of devices that are affected by an event. In one embodiment, such monitored information is fed into a security information event management (SIEM) system. This is where data from evaluation server 150 can also be fed. The SIEM system can also be used to detect the above correlation to the above prior risk events, snapshots, or fingerprints.

In one embodiment, various configuration settings of the device can be checked as part of the security evaluation by the evaluation server, as follows:

A. For Android devices: Is a developer mode enabled or disabled? Is USB debugging enabled or disabled? Is "Nearby Devices" sharing on or off? (this can include a list of content to share, or a list of allowed or denied devices). Is the lock screen disabled, or if it is enabled, is the setting for making passwords visible on or off, is a PIN or a pattern or a password used, what is the secured lock time, is "Smart Lock" off or on, for on-body detection, for trusted places, for trusted devices, or unlocking for a trusted voice? Are there any other "trust agents" installed (e.g., like Google Smart Lock)? Are these apps configured with access to usage data? Are there CA certificates in the Trusted Credentials store that are anomalous (e.g., not ordinarily there), or whose presence violates enterprise policy? Is the device configured to allow or disallow security policy updates? Is there a SIM card lock or not on the device? Is there a factory data reset password or not? Is encryption for the device enabled or disabled? If there is an external SD card, is it configured to be encrypted or not? Is the installation of applications from unknown sources allowed or disallowed? Are there any apps configured to be device administrators? Are any of the apps disallowed by enterprise policy to be a device administrator? Are there any anomalous apps set as default applications, or apps disallowed by enterprise policy? Are there any accessibility apps enabled on the device? Is the verify apps setting enabled or disabled? Are there any installed keyboards?

B. For iOS devices: Is the lock screen disabled or enabled? Is the device configured to ask to join networks or not? Is Bluetooth on or off? Are there devices configured to be allowed to Bluetooth connect? Is a personal hotspot configured on or off? Is Wi-Fi assist configured on or off? Which apps have notifications configured to show on lock screen? Is Handoff configured on or off? Is Car Play configured off or on; if on, for what list of cars? Are there any installed keyboards? Are there any VPN configurations?

In one embodiment, for any of the above configuration settings, an enterprise policy that applies to the device (e.g., such as stored on administrative server 302) may determine the associated risk levels for each configuration or setting item. In one embodiment, this may be the determining of a risk result that is higher or lower than a threshold. This determination may be used to allow greater or fewer degrees of freedom regarding access to the service.

For any of the above configuration settings, where there is an enterprise or default policy that determines the associated risk levels for each configuration or setting item, the administrator may specify a combination method for the individual risk levels, for example, the maximum (riskiest) level, or an additive risk level (e.g., adding risk levels to create a total risk level), etc. The result may be compared with a threshold which is configured, or may be compared with a threshold percentile level for a comparable group of users or devices, for example this device's risk level is higher than a predetermined percentage (e.g., 75%) of all peer group users.

Alternatively, the comparison may be made with a comparable group of users or devices at large (in the world or other defined group of users or devices) vs. just users or devices within a particular enterprise. The peer group may be based on a user's role within an organization, the threshold may be based on the user's role within an organization, the threshold may be based on an inherent risk sensitivity associated with a user role, or the threshold may be based on the current set of data and/or services and/or apps which reside upon the device.

In one embodiment, if the device is determined to be configured correctly, or passes a threshold of configuration correctness (even though not fully correctly configured), the client application on the device informs the service provider that the device is correctly configured. In an alternative embodiment, the client application informs the service provider that the device is configured above a threshold, but not fully configured. The service provider permits the device to access the service (in a variation, the service provider permits the device to access some portion of the service but not the complete service (e.g., a user can check a balance on an account, but cannot transfer money)).

In one embodiment, in the above discussion, the service provider may itself also be an identity provider (e.g., a single sign-on (SSO) provider, or a provider of a service/function such as Active Directory or similar).

In one embodiment, all of the functions above are provided, but instead of using a separate client application on the device, the attestation functionality is provided via an SDK that controls the active application in the device directly. In other words, a software component is a part of the active application on the device that makes the request for access to the service.

In one embodiment, the dark web may be monitored to determine if user credentials have been leaked to the dark web. Upon detection of user credentials in the dark web, a notification is provided to an administrator console that user accounts have been identified as appearing on the dark web.

In one embodiment, the evaluation server collects data sets of leaked credentials from the dark web. This data may include e-mails, e-mails and passwords, or e-mails and passwords and the service they are associated with. If there are strong or weak matches against the totality of all legitimate identities that the evaluation server is aware of (e.g., that belong to users or customers of an enterprise or other service), then this information is fed into an identity system of identity provider so that appropriate actions can be taken.

For example, if an e-mail is dumped onto the dark web, even though there is not a password found, a user's security may be compromised (e.g., the password may be stolen even though not found by the evaluation server). In this case, as a precaution, the user is asked to reset her password. Alternatively, multi-factor authentication can be required the next time a login is attempted by this user on a service. Alternatively, all authorization tokens that have been issued for this user can be revoked.

In one embodiment, the evaluation server or another computing device stores hashes of passwords in a database. In case of a leak of a password to the dark web, the evaluation server compares a hash of the leaked password to these stored hashes.

In one embodiment, the administrator may trigger remediation. For example, the administrator may force a change of passwords, or force closing of any session which may currently be open using the leaked user credentials.

In one embodiment, the analysis functions performed by the evaluation server can be done via an SDK that is injected into a client application that the user is currently using on the user's device. One example is an identity provider (e.g., Okta has an app that facilitates single sign-on using a user device). The Okta app can include an SDK that incorporates the security evaluation functionality above so that the app can make risk decisions itself instead of having to consult another application or computing device.

In one embodiment, a use case is a business-to-consumer use case. For example, a bank can decide that before customers are permitted to login to a banking application, or attempt to initiate a large balance transfer, the evaluation server checks the risk level of the device. The bank can require that the user install an application that incorporates or uses the security evaluation discussed above.

In one embodiment, multi-factor authentication generates a soft token on a user mobile device. The risk level determined by the evaluation server can be incorporated into the token that is generated. The evaluation server uses a multi-factor authentication application, or this functionality can be integrated into a service application using an SDK as discussed above. When the user is generating the token, the token indicates that this is a trusted device that belongs to the user, and also that the device is in a given risk state, such as one of several classifications of risk. Also, other types of information can be encoded in the token that is generated. The user is not aware of the level of risk encoded in the token, and the entering of the token is also communicating information about the security status of the device.

In various embodiments, additional aspects of risk may be incorporated as factors in the security evaluation. For example, a version number of the application on the user device can be used as a factor.

In one embodiment regarding an IoT device, a module on that device can be interrogated. For example, the module can be used to check to see if communications are going through a secure VPN, check a firmware version, check typical requests to see if the requests look healthy or secure, or to personalize the device to enterprise ownership. In another example, a device phones home to a designated server that does a challenge response mechanism to authenticate the device.

In one embodiment, all checks in a security evaluation list are run through. If the checks are successfully done, then a credential challenge dialog is presented to a user on the device (e.g., in a login screen). In one embodiment, if a risk level is determined to be too high, login credentials are disabled.

In one embodiment, if a user takes a device out of compliance, a token on the device that indicates the device is healthy (or able to access services) is destroyed or removed. A different token can be used for each of several services.

In one embodiment, if an Apple watch or other computing device associated with the user is present, then this is a factor indicating the user is likely to be the normal user. In one embodiment, another factor is a determination that there is an unexpected proxy in the series of devices that transmit an access request.

In one embodiment, there are cases where the evaluation server determines that a device should not be trusted without first requiring installation of a client application on the device. For example, based on headers received by the evaluation server, it is determined that the device is running an older operating system that is deemed as being unacceptably old. So, a security evaluation does not necessarily require consulting a client application on the user device. There are cases where the evaluation server can make a decision not to trust the device (e.g., solely from a SAML request) even though no client application is on the device.

In one embodiment, a user of mobile device 149 is attempting to log into a service at the domain service.com provided by service provider 170. The user enters her username and password. Based on the user entering her e-mail address or the domain name of the e-mail address, service provider 170 redirects this access request to identity provider 172 (e.g., an identity sign-on provider such as the Okta service). The user then provides her username and password to identity provider 172. In one example, this communication occurs over protocols like SAML 2.0 or OOP (Security Assertion Markup Language (SAML) is an XML-based data format for exchanging authentication and authorization data). In one embodiment, SAML chaining is used with multiple identity providers that all consult each other before a user can log in.

In one embodiment, the service request to service.com is made by an application on mobile device 149 that is associated with service.com. This application is configured to communicate with evaluation server 150 when an access request is made to the service.com domain. Evaluation server 150 is configured to communicate with identity provider 172 if server 150 determines that the device is in a secure state. If server 150 determines that the device is insecure, server 150 can request that the user remediate any issue identified.

In one embodiment, evaluation server 150 checks that a device is free of threats and is compliant with a corporate policy corresponding to service provider 170. Regarding vulnerabilities and this policy, these can be configured by service provider 170 based on the service provider's desired risk threshold. For example, for the risk of an operating system version that is too old, the service provider sets the policy as to whether the service provider wants to prevent access to that device. In other cases, regarding behavior and configuration, a determination can be made whether the application running on the device is compliant with policy, whether the way that the device is configured is compliant with policy, whether there is a passcode set, etc.

In one embodiment, the level of risk as determined by the security evaluation leads to access to some services, but not to other services. For example, access to some resources may be permitted, but not to other resources (e.g., resources required to send money). The determined level of risk is used to set the level of access provided to the service.

Side-Load Protection

Various embodiments regarding side-load protection are discussed below. These embodiments do not limit the generality of the foregoing discussion regarding security evaluation.

As used herein, "side-loading" or "side-loaded" as used to characterize an application or other software indicates obtaining or obtained from a source that is not the default authorized channel for obtaining applications for the type of device (e.g., the default channel may be set by the administrator of the device such as by using an administrator server, or be set by any computing device different than the device onto which the application is to be installed). Examples of a source that is not the default authorized channel include a source that is not trusted, not known, or not authorized.

A source may be trusted for various reasons, including, for example, that the source is an authorized Google Play store or Apple App Store. Other examples include a source identified by an administrator of mobile devices (e.g., for a large corporation with thousands of employees) for use by users in downloading new software. In another example, a source may be trusted based on a prior history with that source (e.g., extensive prior downloads without negative incidents). Also, a source of prior copies of software may have been previously trusted, but at the time of sourcing a particular software file or component, the source is untrusted, so that the software is considered as being side-loaded.

Other examples of a side-loaded application include an application obtained from a source that is not known, and thus is untrusted, for example because there is no prior history of interaction with the source, or there is no independent confirmation or information that the source can be trusted. In another example, when referring to Android apps, an application is side-loaded if it is installed using an application package in APK format onto an Android device, after downloading the application package from a website other than Google Play. This side-loading is possible if the user has allowed "Unknown Sources" in her security settings on her computing device (this setting allows the installation of non-market apps).

The embodiments set forth herein are implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player.

An administrator defines and deploys policies for an organization. In some embodiments, the organization may be a family or other social group, and the administrator role may be performed by a parent or guardian, or may be performed by a third party service provider. Such a third party service provider may be a provider of security services, or the network operator, or a provider of content services. The additional levels of protection and control that organizations such as enterprises desire can also be advantageous for consumers, but consumers are typically not knowledgeable enough to perform administrator roles. Thus, there is often a need for third party service providers to act as technically-oriented admins. The consumer or parent or guardian as an admin may specify preferences corresponding to high-level policy decisions, and a technical admin can configure underlying services to meet these high-level policy decisions. As used in this disclosure, the term "administrator" or "admin" includes, but is not limited to, all such administrators (e.g., technical admin, consumer, parent, guardian, service provider, etc.) as described in this paragraph.

As mentioned above, users of mobile devices install applications from numerous various sources that are beyond the control of an administrator. In some embodiments, within a mobile network, the network operator can perform various admin functions as described in this disclosure. Also, the embodiments described herein are not limited to use solely in enterprise BYOD situations, but are also useful, for example, in other cases such as where a consumer wishes to administer all devices for the members of her family, or all of her personal devices (e.g., phone, watch, laptop, desktop computer, etc.).

In one example, a component is a part of an application (e.g., an application that is installed by a user from an Android or other software application marketplace and then executes on a mobile device). In one example, a component is provided by the application's creator or by a third party.

In another example, the component may be code provided by an ad network or an analytics network.

In yet another example, components are linked libraries/SDKs that are packaged within an application. This is code that is within the application, but the code is developed by a third party and provides the ability for an application developer to integrate certain behaviors of that component into the developer's application (e.g., displaying a certain type of ads from a certain ad network such as LeadBolt). In another example, a set of data (e.g., in a file or a database) that is used by an application may be considered as a component of that application. Also, in some examples, data used by an application can be considered as known or unknown, or trusted or untrusted.

In one embodiment, a component (e.g., a component associated with an ad network) may have multiple behaviors associated with it (e.g., notification display, settings changes, and/or information collection). For example, the behaviors of the BTController application (discussed further below) is the summation of the behaviors of its constituent components. In some cases, components may provide the ability to selectively opt-out of individual behaviors. However, in other cases, this is not possible, and in order to opt out of any set of behaviors, a user must opt-out of the entire component.

Various embodiments described below for side-load protection relate to determining a source of software that is loaded on or otherwise transferred to a computing device. It is typically desired to determine the source in order to assess the risk of the software and make a determination or decision whether further action should be taken with respect to the software such as, for example, blocking installation of the software onto the computing device.

Sources of software (e.g., software loaded by user onto her laptop computer or mobile device) may include various numerous, non-limiting examples. For example, sources may include various channels of distribution for software applications. These channels may include the Google play store or the Apple App Store, other websites, various file sharing or transfer servers, peer-to-peer file-sharing systems (e.g., BitTorrent), and other network or computer system transfer sources for software. In addition to the foregoing types of sources, other sources include software accessed are installed locally such as by user inserting a USB memory drive into a computing device, or pairing two mobile devices using a Bluetooth connection.

There are various ways that a source of an application can be determined. In one embodiment, the source of an app on Android can be determined by calling getInstallerPackageName( ). In another embodiment, a source of software may be, for example, the "default" and/or "normal" channel for an operating system (OS) or other software, such as defined by an administrator server that manages computing devices for an enterprise.

In various embodiments, channels can be considered or deemed to be white-listed or black-listed. White-listed channels are trusted, and black-listed channels are untrusted. For example, applications from white-listed channels are generally considered as being trusted software, and applications from black-listed channels are generally considered as being untrusted software.

The software itself that is side-loaded includes various examples. For example, the software may be an application, a widget, an executable file, binary code, firmware, operating system components or updates, and other forms of executable software. Examples further include other files, such as office documents or PDF files, that may contain components like scripts or macros which are themselves executable. In some cases, such an embedded executable component may have associated with it identifiers or signing key information which can be used to separately determine the source of that executable component. An application itself may contain another application, for example, where an application for a mobile device which contains within it another related application which is intended for installation on a wearable or other personal or external device.

In various embodiments, the source of side-loaded software may be determined in various ways. For example, channel identifiers (channel IDs) associated with an application may be compared to various white lists and black lists. In another example, prior experience with the same or similar software on other computing devices may be used to make an assessment of the source of software being currently installed on a particular device. For example, various components of a currently-sourced software application can be identified and compared to components of software previously analyzed for prior installations made on other computing devices.

In another example, characteristics (e.g., a signing certificate or other signature of an application) associated with the developer of the software may be used to determine the source. In another example, the behavior of software either as installed on a mobile device or as determined by execution in a controlled environment may be used for making an identification of the source of the software. For example, the behavior of software newly being installed may be the same or similar as prior known malware.

In various embodiments, as each software application is assessed for making a determination of source, a source identifier is associated with the software. The source identifier is used by a mobile device or other computing device on which the software is being installed. The mobile device can communicate with an evaluation server using the source identifier as a basis for side-load protection activities, as discussed below. An application identifier is also associated with the software for tracking data related to the application. In one embodiment, an application identifier is an identifier used to identify a particular application. Examples of such identifiers include an application package name, an application title and version, or an arbitrary identification number (binary or otherwise).

In some embodiments, even a trusted source (e.g., the Google Play Store) may provide certain applications that are unauthorized or undesirable in at least one aspect. For example, a banking enterprise may authorize obtaining of a banking application from a designated enterprise website (e.g., a Bank of America website to which a user or a mobile device authenticates itself). An administrator of the enterprise desires that users download the banking application from this designated website, which the administrator considers to be a trusted source. However, a user might download the same or similar banking application from another source. This other source may be trusted for most applications. For example, the Google Play Store may be considered by an administrator server to be a trusted source for most applications downloaded to a device.

However, for the above particular banking application, the enterprise administrator only considers the application to be obtained from a trusted source if that source is the designated website. Any banking application obtained from the Google Play Store is considered to have been obtained from an untrusted source.

A source (such as previously identified and assigned to a source identifier) from which an undesirable application has been obtained can be set to or marked as being untrusted (either generally for all software obtained from that source, or untrusted, but only with respect to certain defined software). For the example of the banking application above, the Google Play Store can be deemed to be untrusted source for this application.

In one embodiment, evaluation server 150 stores data that associates source identifiers with application identifiers of those applications for which the respective source is considered untrusted (e.g., the banking application from the Google Play Store above). This stored data is used in later comparisons of source identifiers for new applications being installed on a computing device. The source identifier for a new application is compared to such previously-associated source identifier/application identifier records. If the new application is determined to be the same as or similar to the previous application (e.g., a previous application obtained in an unauthorized manner from the Google Play Store), than the new application is likewise considered to have been obtained from an untrusted source. For example, the similarity of the new application to the previous application can be determined by component analysis as described herein. In one case, a new, same-or-similar banking application obtained from the Google Play Store has an application state (or a state designation) set to untrusted in response to this determination.

In various embodiments, a mobile device on which an application is being installed stores state data. The state data includes a mobile device state and an application state for each application stored on or installed on the mobile device. The mobile device state may have values including trusted, untrusted, and unknown. The state of unknown indicates that a determination has not yet been made whether the mobile device is trusted or untrusted, or that an event has occurred on the device which could require re-assessment and could change the mobile device state. The application state may have values including trusted and untrusted. An application having a state of untrusted will, for example, not be executed.

Various embodiments described below also discuss state designations. A state designation is generally an indication by a computing device to be used by another computing device for setting a state. The state designation may have values of trusted and untrusted. The state may be the mobile device state or an application state. For example, the mobile device may receive a state designation from an evaluation server and then set the mobile device state (or alternatively an application state) based on the state designation. An application identifier will be associated with the state designation in order to identify the applicable application.

In some cases, the evaluation server communicates with an administrator server, which itself may make determinations of state designations that are sent to the evaluation server. The evaluation server uses a state designation from the administrator server in order to make a decision at the evaluation server regarding a state designation to send to the mobile device. The state designations may be selected based on various factors including the source of software, its source identifier, component or behavior analysis of software, etc., as discussed herein.

In various embodiments, based on the mobile device state and/or the application state, various actions may be performed with respect to the mobile device. For example, the mobile device may be denied access to a corporate network, or an application may be disabled.

In some embodiments, the source of the application may be determined during the process of assessing authenticity of the application, as discussed herein. For example, an application that is determined as not being authentic can have its source added to a blacklist.

In some embodiments, an application can be monitored for fraudulent behavior. If fraudulent behavior is identified, the source of the application can be added to a blacklist.

In some embodiments, installation of an application onto a computer device can be monitored. The signature associated with the application or other characteristics of the signer of the application can be used to assess the source.

In some embodiments, the manner of usage of an application on a computing device can be monitored. The usage or behavior of components of the application on the device that are inconsistent with a user or administrator-designated policy can be identified. In such event, the source and/or the application can be deemed as untrusted.

There are various examples of policies that may be used on mobile or other computing devices. For example, a user policy may define the handling of components 104 and 106 on mobile device 149. A policy may be defined by behavioral preferences established by a user and/or an administrator, and this policy is enforced on new applications installed on the mobile device. In another example, a policy may apply to a particular identified application.

In other examples, policies may be defined and applied to control or restrict the behavior of applications and their components. This can include the identification of advertising networks and defining policies to permit various opt-out actions for these advertising networks.

In some embodiments, a component analysis of an application can be used to relate components of a new application to a database of characteristics for known bad components. If the component in the new application corresponds to a known bad component, the source of the software can be identified as untrusted.

In various embodiments, side-load protection services are used by an administrator of numerous mobile devices, for example, for a company having thousands of employees. Mobile device management software is executed on an administrator server that provides a console for the administrator. The console provides information to the administrator regarding source information and statistics for side-loaded applications of managed devices. The administrator server communicates with the evaluation server as part of the side-load protection services.

In addition to the security evaluation discussed above, evaluation server 150 may also provide protection against side-loaded applications. In various embodiments, evaluation server 150 performs side-load protection as discussed below. The system of FIG. 1 may also be used for protection against side-loaded applications, in which user terminals 141-145 and mobile devices 147-149 communicate with evaluation server 150, according to various embodiments. Mobile devices may include, for example cell phones, smartphones, and tablet devices such as the iPhone device or an Android tablet. Mobile devices may also include automobiles, planes, or other vehicles that include a computing device, such as an embedded computing or communication system that communicates via the Internet over a cellular phone system, or other portable computing devices (e.g., devices that pair with a mobile device using Bluetooth, such as an Apple watch). The mobile devices communicate with evaluation server 150 and optionally an application marketplace 123, and/or a developer server (not shown), according to various embodiments as described below.

Additional examples of mobile devices include devices that are part of what is called "the internet of things" (IOT).

In the IOT there are multiple devices which operate on their own, without accompanying and attendant users. Such devices may be mobile or sessile; they may have various sensors and computing and communication capabilities and may run applications; schematically they can be considered substantially similar to a mobile device. Such "things" may have occasional interactions with their owners or administrators, who may monitor the things or modify settings on these things. Such owners or administrators play the role of users with respect to the "thing" devices. In some examples, the primary mobile device of a user may be an administrator server with respect to a paired "thing" device that is worn by the user (e.g., an Apple watch). In an embodiment, a "thing" or a device, e.g., one intended for use as a health or medical device, may have an embedded white list defining trusted sources for applications, or may have an administrator associated with that device, e.g., an administrator working for the medical device manufacturer or distributor, who can control the side-loading policies for that device.

As mentioned above, in FIG. 1, the user terminals (e.g., 141, 143, ..., 145) and/or mobile devices (e.g., 147, 149) are used to access and/or communicate with evaluation server 150, application marketplace 123 (e.g., an Android or Google Play store or marketplace, or an enterprise application store), and/or developer server (not shown) over a communication network 121 (e.g., the Internet, a wide area network, a local network, or other wired or wireless communications network).

Network 121 may be used to download and remotely install applications selected from marketplace 123 (e.g., using Google Play or the Android Market). Marketplace 123 may include one or more web servers (or other types of data communication servers) to communicate with the user terminals (e.g., 141, 143, ..., 145) and mobile devices 147, 149.

Specifically, mobile device 149 may download a new application 1013 from application marketplace 123 or developer server. An application obtained from developer server is signed using a signing certificate. New application 1013 has components 104 and 106.

In an alternative embodiment, an application or other software has been preloaded onto mobile device 149. In this case, assessment of this application alone (or assessment of this application along with a set of or all applications installed on mobile device 149) can be performed. In one embodiment, this preloaded application includes components that are assessed and handled such as described herein for new applications being installed on a mobile or other computing device.

Mobile device 149 stores a user policy 108. The new application 1013 may be compared to user policy 108 during or after installation. Evaluation server 150 includes a data repository of policies 116 (e.g., user policies). User policy 108 of mobile device 149 may be compared to policies 116. An administrator server (not shown) may provide some policies in policies 116 (e.g., as regards usage of or installation of applications onto mobile device 149).

In one example, an owner of an Android phone (e.g., mobile device 149) may visit a web site hosted by marketplace 123 and select a free poker game application for remote installation on mobile device 149. The user may authenticate itself to marketplace 123 by its email address (e.g., Gmail address) and password.

The marketplace 123 is connected to respective data storage facilities to store applications, messaging account data for users, user preference data, and other data. A messaging server (not shown) may be connected to communication network 121 to deliver messages (e.g., email or text) to user terminals 141-145 or one of a user's mobile devices 147, 149.

In one embodiment, a software server (not shown) may be coupled to communicate with application marketplace 123 and/or mobile devices 147, 149 by communication network 121. The software server stores, for example, an application (e.g., the Ad Network Detector discussed below) in memory. The application stored on the software server is sent to application marketplace 123, where it is stored for later download and installation by a user. For example, the user of mobile device 149 may access marketplace 123 to download and install the application. In another embodiment, the software server is developer server, or another computing device, and may be used to upload an application to marketplace 123.

In one embodiment, the software server communicates with the application (now executing on mobile device 149 after installation by the user). The application is configured to identify at least one behavior on mobile device 149 as discussed herein. The at least one behavior is associated with each of a plurality of components of a plurality of other applications installed on the mobile device 149 (e.g., other applications previously downloaded by the user from the Google Play service), and the at least one behavior includes a first behavior associated with a first component.

Evaluation server 150 may receive at least one behavioral preference of the user (e.g., from mobile device 149 and/or from an administrator of the mobile device). The at least one behavioral preference may be determined by the application based on input from the user (e.g., a user selection from a menu or results list) or the administrator.

The server stores the at least one behavioral preference (e.g., stores in a memory of the server) for later uses such as responding to queries from other computing devices regarding the intent of the user of mobile device 149. In one embodiment, the Ad Network Detector discussed below may manage these behavioral preferences on behalf of a user for these networks.

Identity provider 172 may be coupled to communication network 121. The identity provider 172 may communicate with, for example, evaluation server 150. For example, evaluation server 150 may obtain information from the identity provider regarding one or more software components for a side-loaded application being analyzed to determine its source.

In an alternative embodiment, the identity provider includes a database, which stores component identities (and optionally some or all of policies 116). Mobile device 149 may include applications that have been previously installed on mobile device 149. These applications may be installed from application marketplace 123 or the developer server.

The user policy 108 is stored locally in a memory of mobile device 149. In one embodiment, during operation, as discussed in more detail below, user policy 108 may be used to define the handling of components 104 and 106 on mobile device 149.

In one embodiment, a user policy for mobile device 149 may alternatively (or in addition to user policy 108) be stored as one of policies 116 on the evaluation server 150 and/or the identity provider. A user or administrator policy may be enforced on mobile device 149 using either a local user policy or a remote user policy, or a combination thereof.

As discussed in more detail below, after an application 102 is installed on mobile device 149, components 104 and 106 may be identified and behaviors exhibited on mobile device 149 may be attributed to one or more components 104 and 106. Any given component (e.g., component 104) may be present in several different applications on mobile device 149 and/or may be common to numerous copies or versions of an application that have been installed on mobile or other computing devices for large numbers of other users. In one embodiment, this commonality of component presence permits observing and collecting structural and behavioral data associated with the component (e.g., how the component behaves on other mobile devices). This known component data may be stored in a database (not shown) of evaluation server 150, and the component data may be associated with a particular component identity. Thus, a data repository of prior component data can be used to compare to data more recently obtained for new components (such as those identified in newly-installed applications on mobile device 149). The results of the component comparison can also be used when determining a source of an application.

More specifically, as characteristics and behaviors associated with components on mobile device 149 are identified and attributed, these characteristics and behaviors may be compared with known characteristics and behaviors stored either locally on mobile device 149 or stored remotely on the identity provider (which was discussed above) as data associated with component identities (these identities may also be associated with previously-determined sources of the corresponding applications). The results from such comparisons in combination with determination of source, and/or mobile device state or application state, may be used for making decisions regarding configuration and/or disabling of one or more particular components on the mobile device or other computing device (e.g. user terminal 141), as discussed in greater detail below.

Although FIG. 1 illustrates an exemplary system implemented in client-server architecture, embodiments of the disclosure can be implemented in various alternative architectures. For example, the evaluation server 150 may be implemented via a peer to peer network of user terminals in some embodiments, where applications and data/information from mobile devices are shared via peer to peer communication connections.

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

Figure 2:
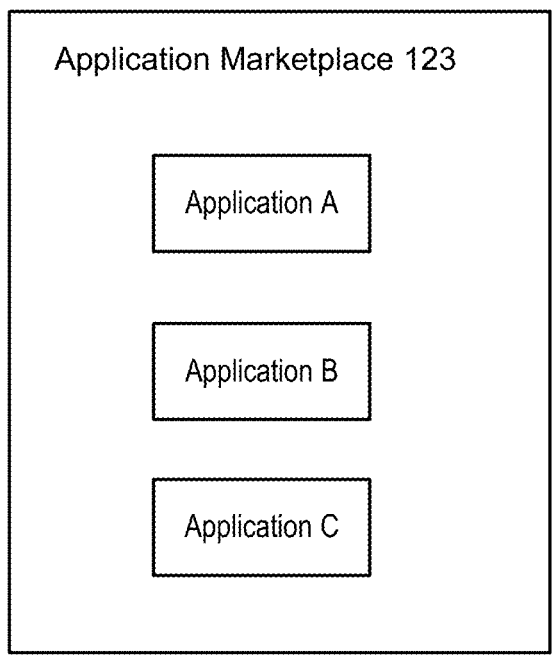
FIG. 2 shows an application marketplace offering multiple applications for remote installation on mobile devices, according to one embodiment.

FIG. 2 shows a web page of an application marketplace 123 (e.g., the Google Play service) offering multiple applications (A, B, C) for remote installation on mobile devices, according to one embodiment. A user accesses the web page and selects an application for remote installation. The user may pay for the application on a web page provided by marketplace 123 (unless the application is free of charge). The application marketplace 123 may be a trusted source of applications. It should be noted that in other embodiments, a marketplace such as Google Play is not limited to access only via a web page, but also may be accessed via an application installed on a mobile device, such as the Google "Play Store" application on Android.

An example of an application available for download from the Google Play Store is an application known as "BTController". Some user reviews for this application have included complaints about excessive advertisements on the user's mobile device after installation. Thus, this may be considered an undesirable application (e.g., Google Play could be defined as untrusted with respect to this particular application). For example, evaluation server 150 can store a record associating a source identifier for the Google Play Store with an application identifier for this undesirable application. In response to a request from a mobile device requesting a state designation for a new application being installed on the mobile device that has been determined to be similar to this undesirable application, evaluation server 150 sends a state designation having a value of untrusted.

Figure 3:
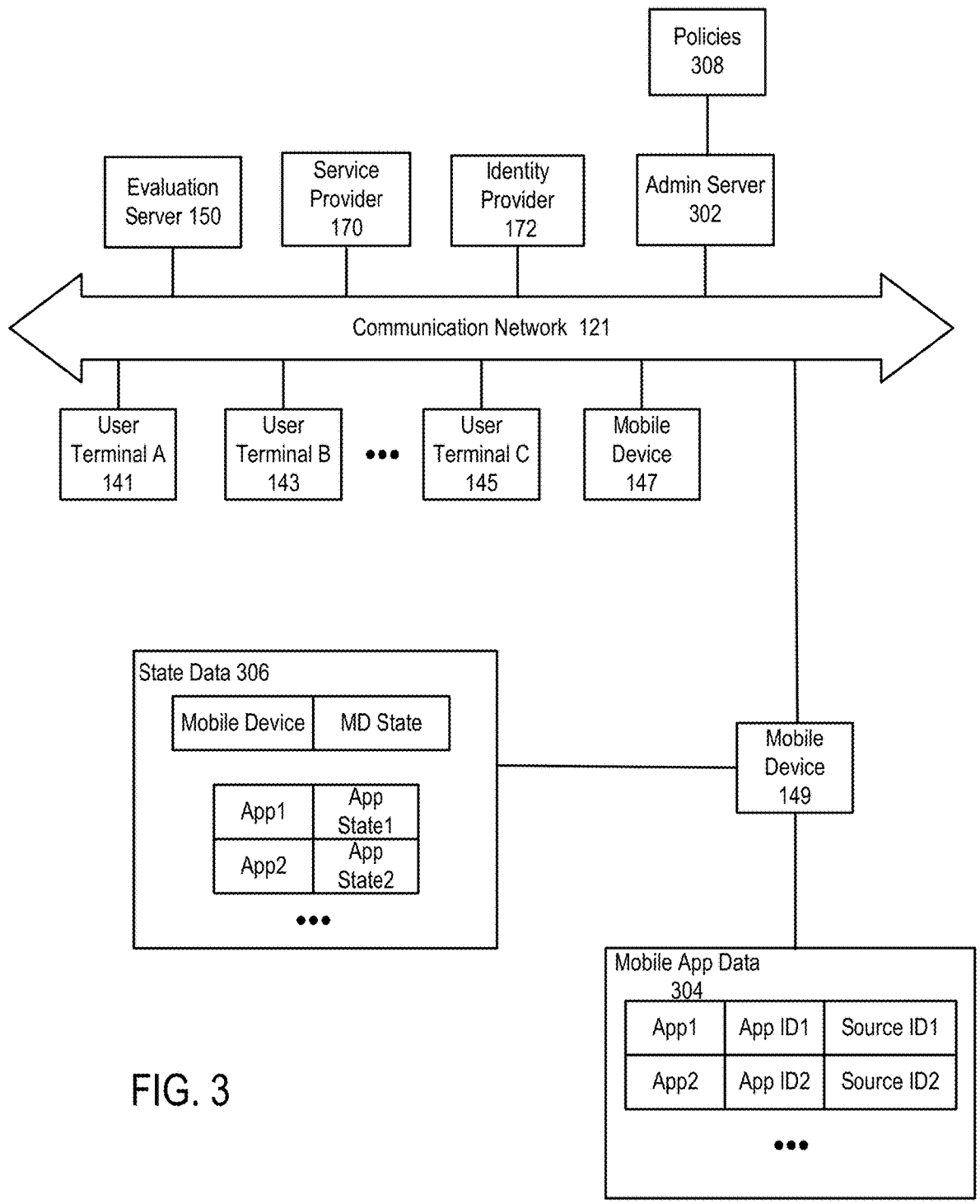
FIG. 3 shows the system of FIG. 1 further illustrating an administrator server that communicates with the evaluation server 150, according to various embodiments.

FIG. 3 shows the system of FIG. 1 further illustrating an administrator server 302 communicating with the evaluation server 150, according to various embodiments. Administrator server 302 stores policies 308 (e.g., user policies), which relate to mobile device management of mobile device 149 and other mobile devices. Policies 308 may be shared with evaluation server 150, as mentioned above. In an alternative embodiment, evaluation server 150 and administrator server 302 could be the same computing device.

In one embodiment, evaluation server 150 uses one of policies 308 that is applicable to mobile device 149 as part of evaluating risk associated with mobile device 149. In one embodiment, this policy may be used to determine a threshold that a risk configuration of mobile device 149 must pass in order to access a service provided by service provider 170.

Administrator server 302 and evaluation server 150 communicate during side-load protection using network 121. This communication includes sharing of data regarding applications associated with mobile device 149, and the providing of state designations from administrator server 302 to evaluation server 150. The provided state designations may be based on data repositories and analysis of an application and/or its source as performed by administrator server 302.

Mobile device 149 stores state data 306 and mobile application data 304. State data 306 includes a mobile device state and an application state for each of the applications installed or stored on mobile device 149. The mobile device state and the application state may be set based on communications received from evaluation server 150.

The mobile application data 304 includes an application identifier for each application of mobile device 149 and a source identifier for each such application. This source identifier identifies the source from which the application has been obtained. In one example, this source is a channel identifier provided in a field of data for an application package downloaded from an application marketplace. In other cases, the application does not contain any identification of source, but a source is determined and assigned to the application based on analysis of the application, or by observation of how an application file is provisioned to a computing device, as described herein.

Figure 4:
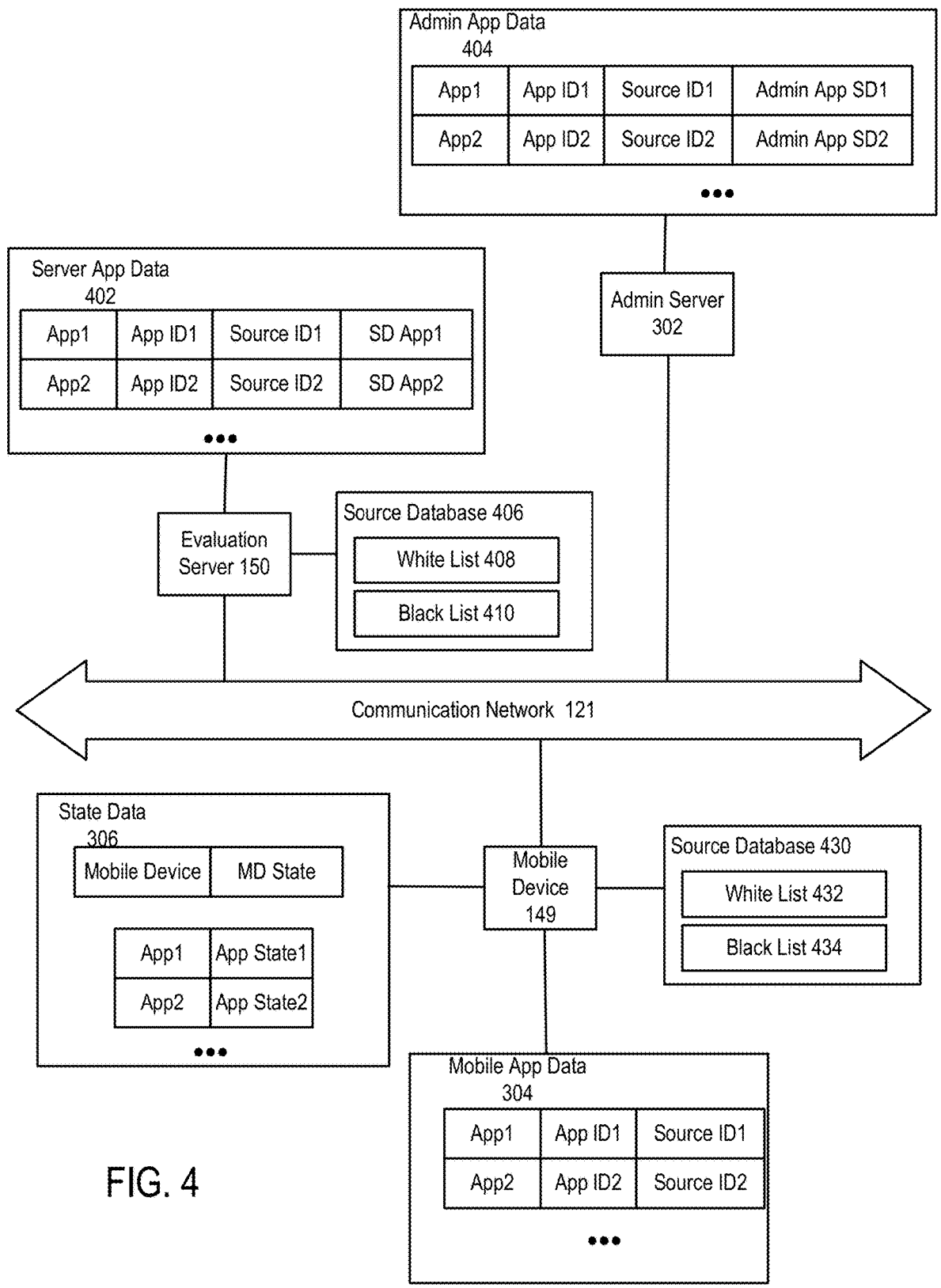
FIG. 4 shows the system of FIG. 3 further illustrating state designations stored at the evaluation server and the administrator server, according to various embodiments. In one embodiment, a state designation is received from one of a plurality of computing devices in a series of devices that transmit an access request. The state designation is used by the receiving computing device to set a state as described below. A state determined using a received state designation may be used in the security evaluation performed, for example, by the evaluation server. In one embodiment, an action performed by the evaluation server based on a security evaluation includes sending a state designation to mobile device 149.

FIG. 4 shows the system of FIG. 3 further illustrating state designations stored at the evaluation server 150 and the administrator server 302, according to various embodiments. More specifically, evaluation server 150 stores server application data 402 and further comprises a source database 406. Application data 402 includes a set of records, each record for an application stored on mobile device 149, and the record including an application identifier, a corresponding source identifier, and a state designation.

In one embodiment, application data 402 is used by evaluation server 150 in performing a security evaluation and response to an access request from mobile device 149. Other data that may be used in this evaluation includes data from source database 406, and/or application data 404 provided from administrator server 302.

The application identifier and source identifier are received from mobile device 149, for example, in one or more messages. In reply to these messages, evaluation server 150 sends a message with one or more state designations for each application identifier. Evaluation server 150 compares source identifiers from mobile device 149 with source identifiers in white list 408 and black list 410 of source database 406. White list 408 contains a list of source identifiers that have been previously determined to be trusted. Black list 410 includes a list of source identifiers that have been previously determined to be untrusted.

In some cases, evaluation server 150 determines and sends state designations to mobile device 149 without any interaction with administrator server 302. However, in other cases, evaluation server 150 sends a message to administrator server 302 providing an application identifier and source identifier along with the requests that administrator server 302 determine a state designation.

Administrator server 302 stores administrator application data 404, which includes application identifiers and source identifiers received from evaluation server 150. Administrator server 302 determines an administrator state designation for an application, as was mentioned above. This administrator state designation is sent to evaluation server 150, which uses the administrator state designation to set a state designation of the evaluation server for sending to mobile device 149. The state designation sent to mobile device 149 may be different than the administrator state designation that was received by evaluation server 150.

Various non-limiting embodiments for side-load source assessment and protection are now described below. In one embodiment, a non-transitory computer-readable storage medium stores computer-readable instructions, which when executed, cause a first computing device to: determine, by the first computing device, whether a first source identifier of a first application matches a white list of source identifiers; determine whether the first source identifier matches a black list of source identifiers; and send, by the first computing device to a second computing device, at least one message comprising the first source identifier and a first application identifier for the first application.

In one embodiment, the determining whether the first source identifier matches the black list is performed in response to the first source identifier not matching the white list. In one embodiment, the determining whether the first source identifier matches the white list is performed in response to the first source identifier not matching the black list. In one embodiment, the determining whether the first source identifier matches the white list is performed simultaneously with the determining whether the first source identifier matches the black list.

In one embodiment, the computer-readable instructions further cause the first computing device to, in response to the first source identifier matching the black list, set a device state of the first computing device to untrusted, and send the at least one message to the second computing device, the at least one message further comprising the device state. The computer-readable instructions may further cause the first computing device to store the device state, wherein the device state can be set to values including trusted and untrusted.

In one embodiment, the computer-readable instructions further cause the first computing device to, in response to the first source identifier not matching the black list, set a first application state for the first application to unknown, and send the at least one message to the second computing device, the at least one message further comprising the first application state. The computer-readable instructions may further cause the first computing device to store data for a plurality of applications, the data comprising an application state and a source identifier for each of the applications, wherein each application state can be set to values including known and unknown.

In one embodiment, the computer-readable instructions further cause the first computing device to receive a message from the second computing device, the message comprising a first state designation for the first application. In one embodiment, the computer-readable instructions further cause the first computing device to set the device state to the first state designation. In one embodiment, the device state is set to the first state designation only if a device state of the first computing device is not set to untrusted.

In one embodiment, the computer-readable instructions further cause the first computing device to, prior to determining whether the first source identifier matches the white list, receive the white list from the second computing device. In one embodiment, the first computing device is a vehicle, a personal communications device, a wearable digital device, an electronic kiosk, a general purpose computer, an electronic document reader, a tablet, a laptop computer, a smartphone, a digital camera, a residential domestic appliance, a television, a digital music player, or a computing device that is embedded in a vehicle or other piece of machinery.

In one embodiment, a method includes: storing, by a first computing device, data for a plurality of applications associated with a second computing device, the data comprising a state designation for each of the applications, wherein the state designation can be set to values including trusted and untrusted; receiving, by the first computing device from the second computing device, a first application identifier and a first source identifier, each for a first application; setting, by the first computing device, a first state designation for the first application, wherein the first state designation is to be used for setting a state on the second computing device; and sending, by the first computing device, the first state designation to the second computing device. The state to be set may be a device state, or an application state for an application stored on the second computing device.

In one embodiment, the setting the first state designation comprises: sending, by the first computing device, over a network, the first application identifier and the first source identifier to a third computing device; receiving, from the third computing device, a second state designation for the first application; and setting the first state designation based on the second state designation.

In one embodiment, the setting the first state designation comprises: determining whether the first source identifier matches a white list of source identifiers; and in response to the first source identifier matching the white list, setting the first state designation to trusted.

In one embodiment, the setting the first state designation comprises: determining whether the first source identifier matches a white list of source identifiers; and in response to the first source identifier not matching the white list, determining whether the first source identifier matches a black list of source identifiers.

In one embodiment, the setting the first state designation further comprises, in response to the first source identifier matching the black list, setting the first state designation to untrusted. In one embodiment, the setting the first state designation further comprises, in response to the first source identifier not matching the black list: sending the first application identifier and the first source identifier to a third computing device; and setting the first state designation based on a second state designation received from the third computing device. In one embodiment, the method further comprises updating the black list based on the second state designation.

In one embodiment, a system includes: at least one processor; and memory storing instructions configured to instruct the at least one processor to: receive, from a first computing device, a first application identifier and a first source identifier, each for a first application of the first computing device; determine whether the first source identifier matches a white list of source identifiers; and determine whether the first source identifier matches a black list of source identifiers; send the first application identifier and the first source identifier over a network to a second computing device; receive, from the second computing device, a first state designation for the first application; set a second state designation based on the first state designation; and send the second state designation to the first computing device.

In one embodiment, the determining whether the first source identifier matches the black list is performed in response to the first source identifier not matching the white list. In one embodiment, the sending the first application identifier and the first source identifier to the second computing device is performed in response to the first source identifier not matching the black list. In one embodiment, the instructions are further configured to instruct the at least one processor to update the white list based on the first state designation.

In one embodiment, the system further comprises a database storing data for a plurality of applications associated with the first computing device, the data comprising a source identifier and a state designation for each of the applications, wherein each state designation can be set to values including trusted and untrusted.

In one embodiment, the first source identifier is based on a signature of the first application. In one embodiment, the instructions are further configured to instruct the at least one processor to receive a trusted source identifier from the second computing device, and update the white list based on the trusted source identifier. In one embodiment, the instructions are further configured to instruct the at least one processor to receive a trusted source identifier from the second computing device, and update the black list based on the trusted source identifier.

Figure 5:
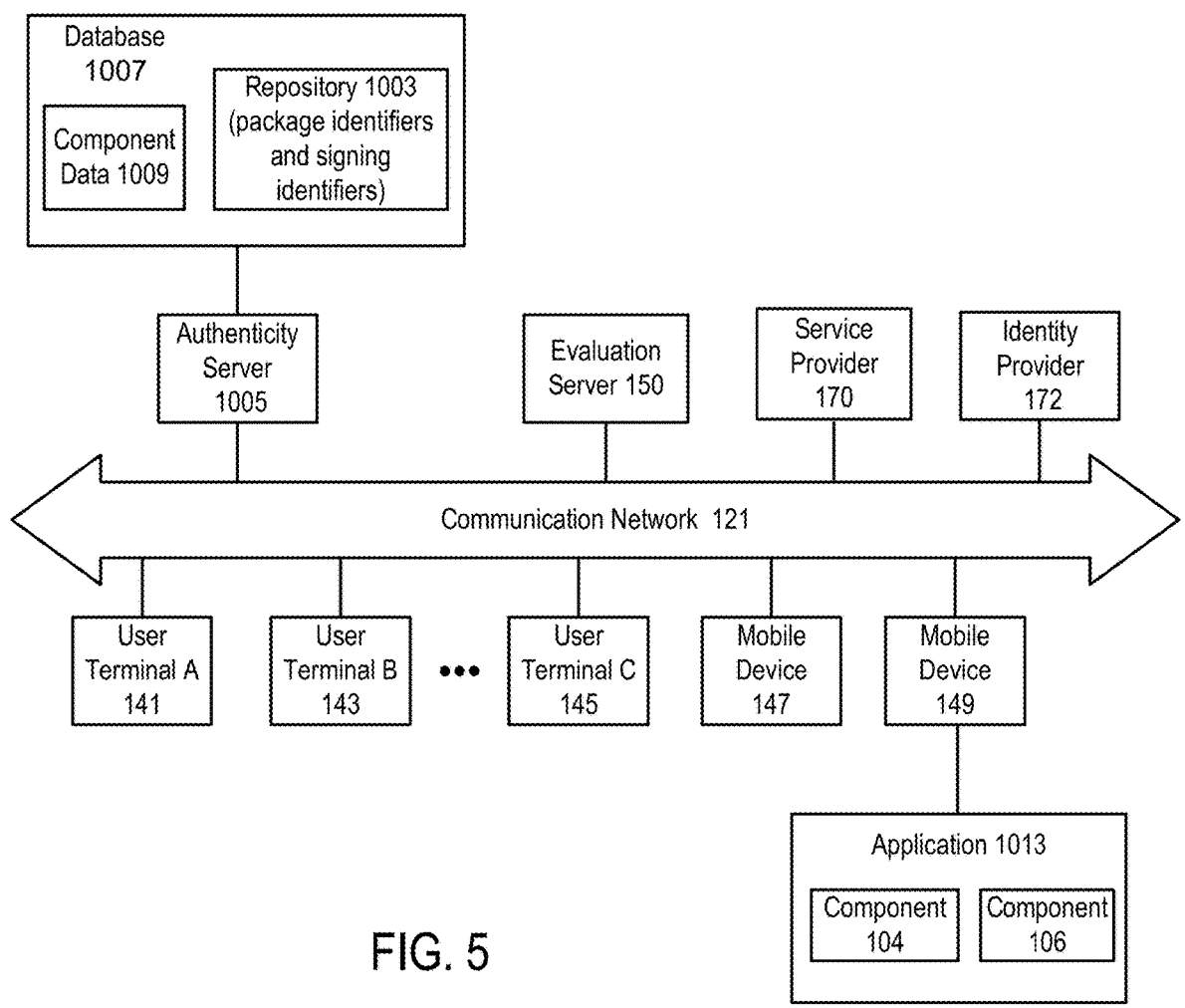
FIG. 5 shows a system for security protection, in which an evaluation server communicates with an authenticity server regarding an application accessing a service, according to one embodiment. The application may initiate or originate the access request that is sent to the evaluation server.

FIG. 5 shows a system for evaluating a source for applications, in which a evaluation server 150 communicates with an authenticity server 1005 regarding applications installed or being installed on mobile device 149, according to one embodiment. In making a determination of the source of software for mobile device 149, evaluation server 150 communicates with mobile device 149 and authenticity server 1005, and optionally an administrator server (not shown) as discussed above.

In one embodiment, the source of software for mobile device 149 is used by evaluation server 150 in performing a security evaluation for a risk level of mobile device 149 in response to a request initiated by mobile device 149 to access the service provided by service provider 170.

Authenticity server 1005 includes a database 1007, which stores component data 1009 and a repository 1003. Repository 1003 contains package identifiers and signing identifiers for applications being installed on mobile device 149. Various embodiments relating to authenticity server 1005 are discussed in greater detail below.

Figure 6:
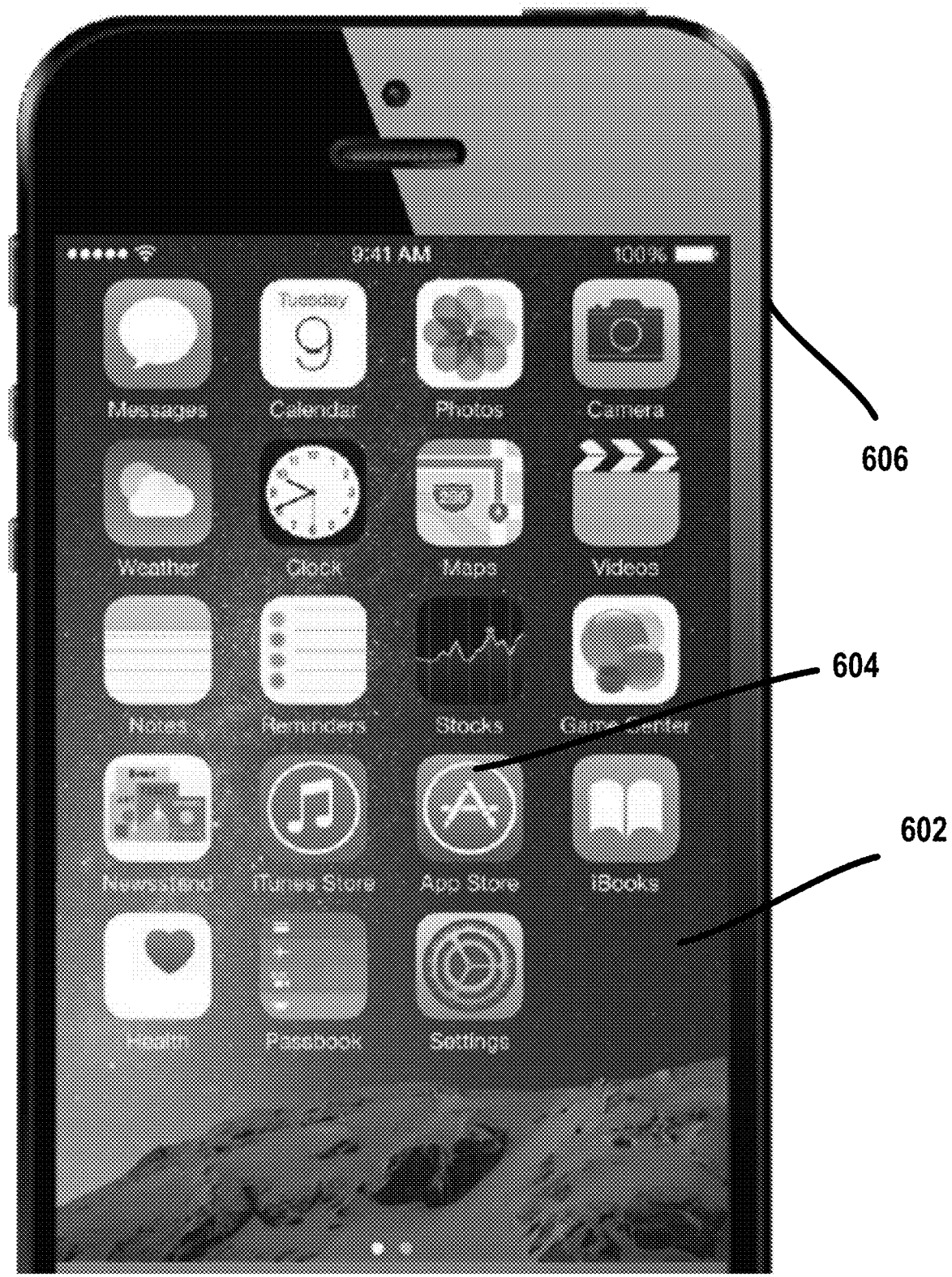
FIG. 6 shows a display of a mobile device of a user, in which the display presents an icon to the user for an application store, according to one embodiment.

FIG. 6 shows a display 602 of a mobile device 606 of a user, in which the display 602 presents an icon 604 to the user for an application store (e.g., Apple App Store), according to one embodiment. In one embodiment, mobile device 606 is mobile device 149 of FIG. 1. Display 602 presents other icons correspond to applications loaded onto mobile device 606.

Figure 7:
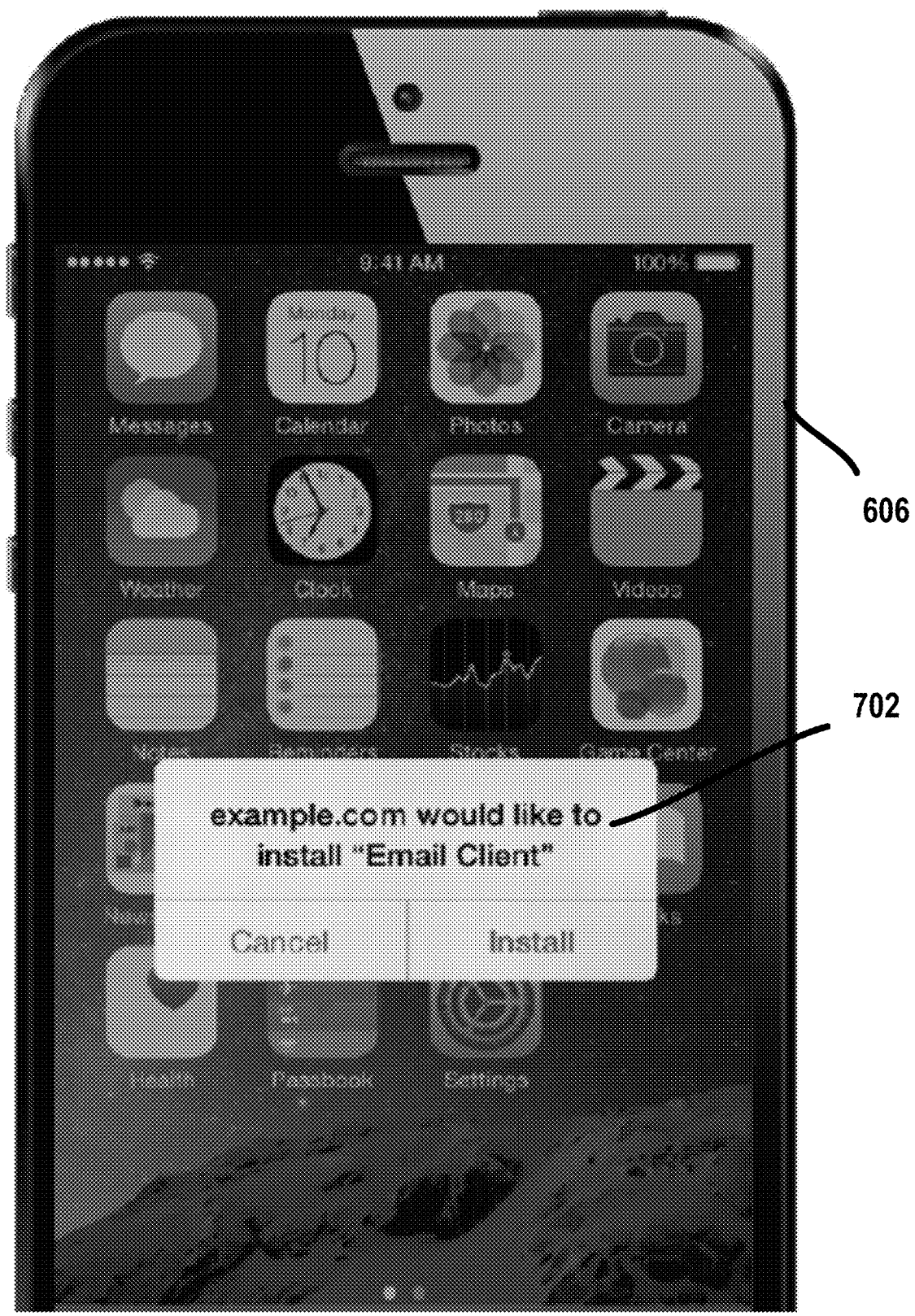
FIG. 7 shows the display of the mobile device of FIG. 6, on which a notification is presented to the user for approving installation of a software client on the mobile device, according to one embodiment.

FIG. 7 shows the display of the mobile device 606, on which a notification 702 is presented to the user for approving installation of a software client (i.e., "Email Client") on mobile device 606, according to one embodiment. Enterprise administrators typically are not concerned with malware in an established application store such as the Apple App Store. Enterprise users are typically trained to install applications from other sources such as mobile device management and websites designated by the administrator.

Figure 8:
FIG. 8 shows the display of the mobile device of FIG. 6, on which a notification is provided to query a user whether to trust an application from a software developer, according to one embodiment.

FIG. 8 shows the display of the mobile device 606, on which a notification 802 is provided to query a user whether to trust an application from an identified software developer, according to one embodiment. Enterprise signing certificates can be used to sign an application so that it can be distributed to any device. An administrator of the enterprise may desire that its users only install applications from an established application marketplace or applications that are signed by the enterprise signing certificate.

Figure 9:
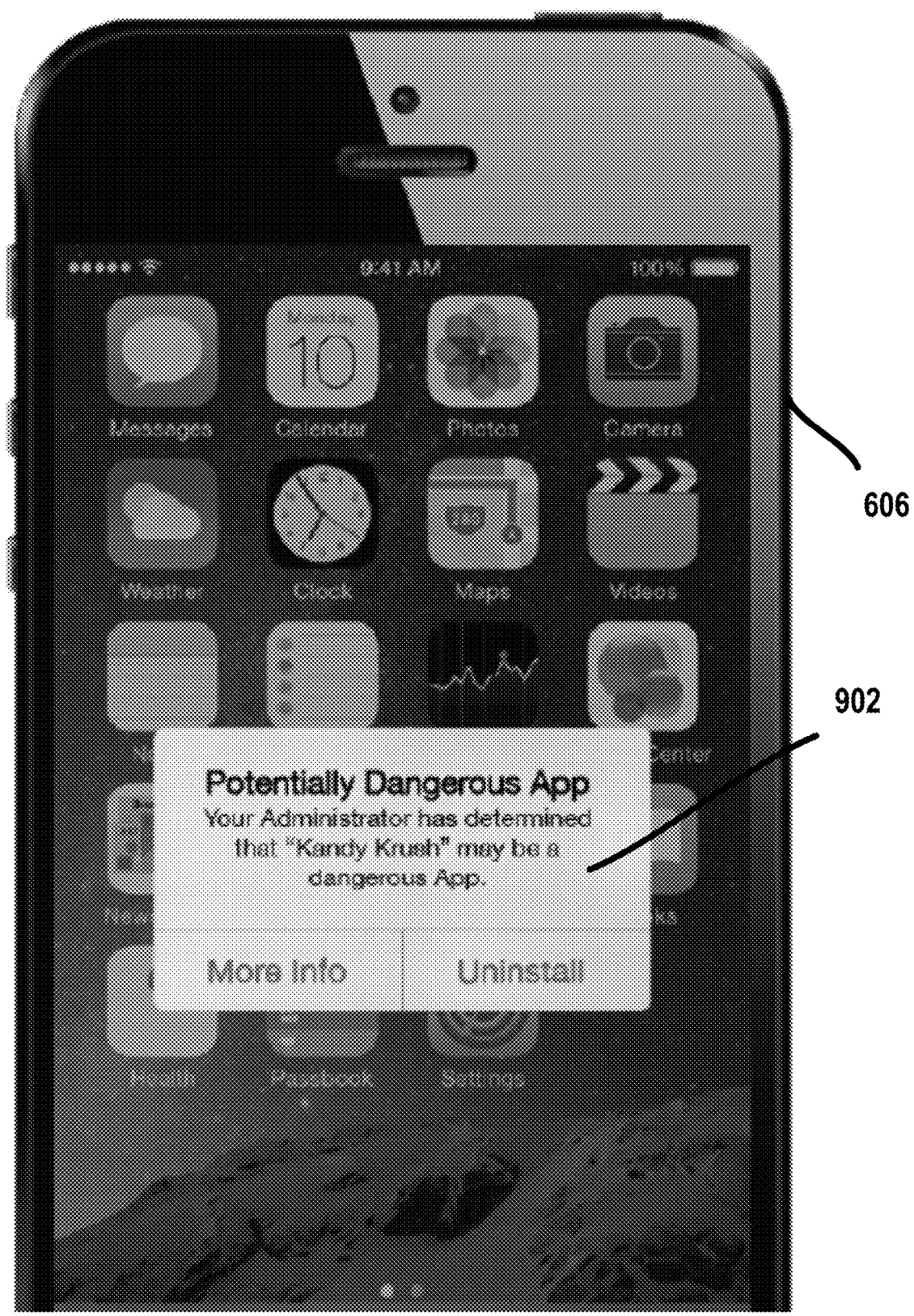
FIG. 9 shows the display of the mobile device of FIG. 6, on which a notification is provided from an evaluation server or an administrator server indicating that an application being installed may be from an untrusted source, according to one embodiment.

FIG. 9 shows the display of the mobile device 606, on which a notification 902 is provided from evaluation server 150 or administrator server 302 indicating that an application being installed may be from an untrusted source, according to one embodiment. The source of this application has been determined to be an untrusted source based on the various methods as described herein.

Figure 10:
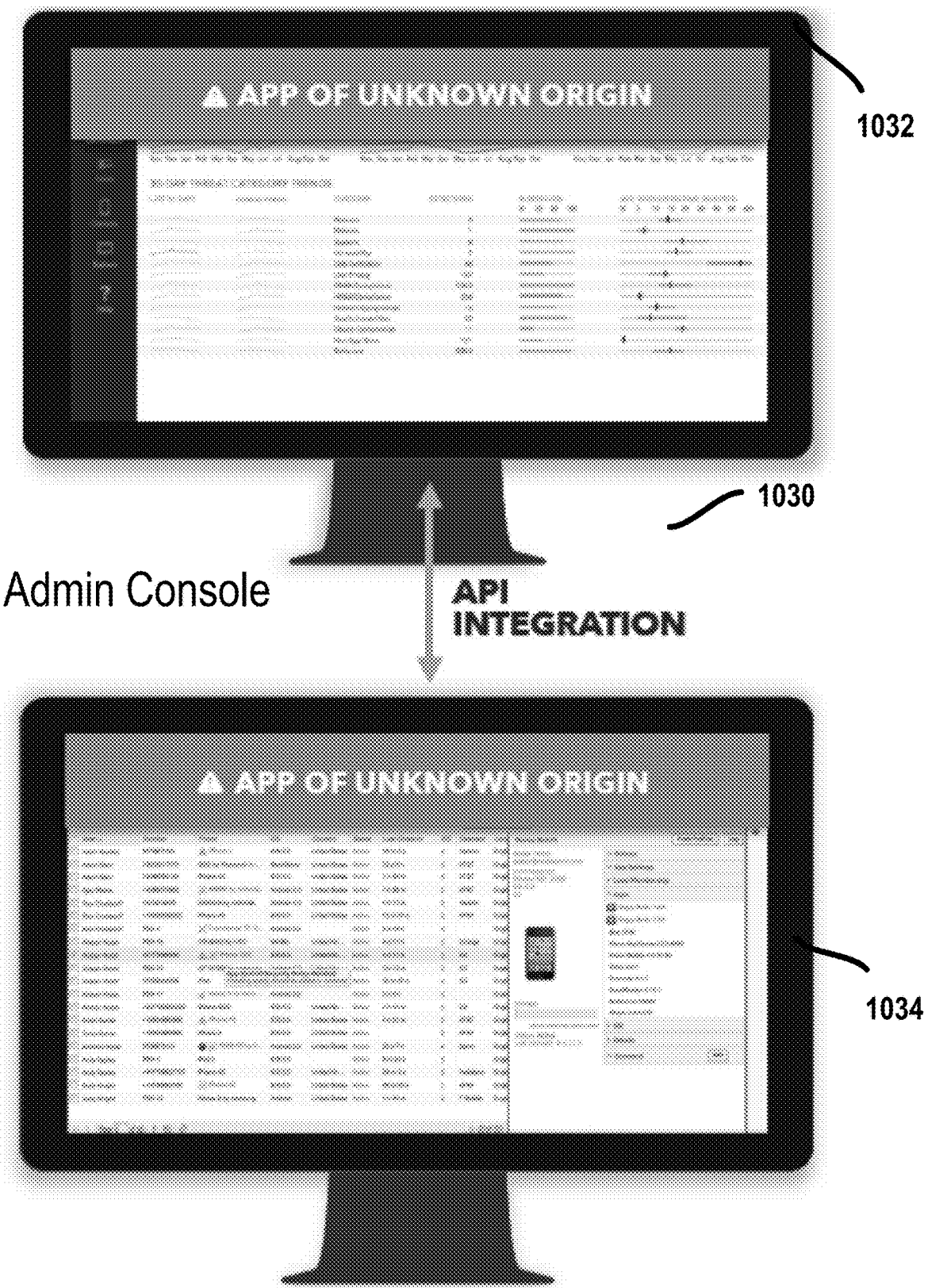
FIG. 10 shows a user console (indicated as "side-load server console") of an evaluation server in communication via an application programming interface with a user console of an administrator server, according to one embodiment.

FIG. 10 shows a user console 1032 of evaluation server 150 in communication via an application programming interface with a user console 1034 of administrator server 302, according to one embodiment. Console 1032 provides a display to the user of a variety of information including a list of side-loaded applications detected as potential malware, along with metadata for such applications including signers, permissions, and frameworks. The same information may be provided to console 1034 over network 121. After detection of malware or other undesired side-loaded applications, an administrator can control remediation activities on mobile devices such as mobile device 149.

Figure 11:
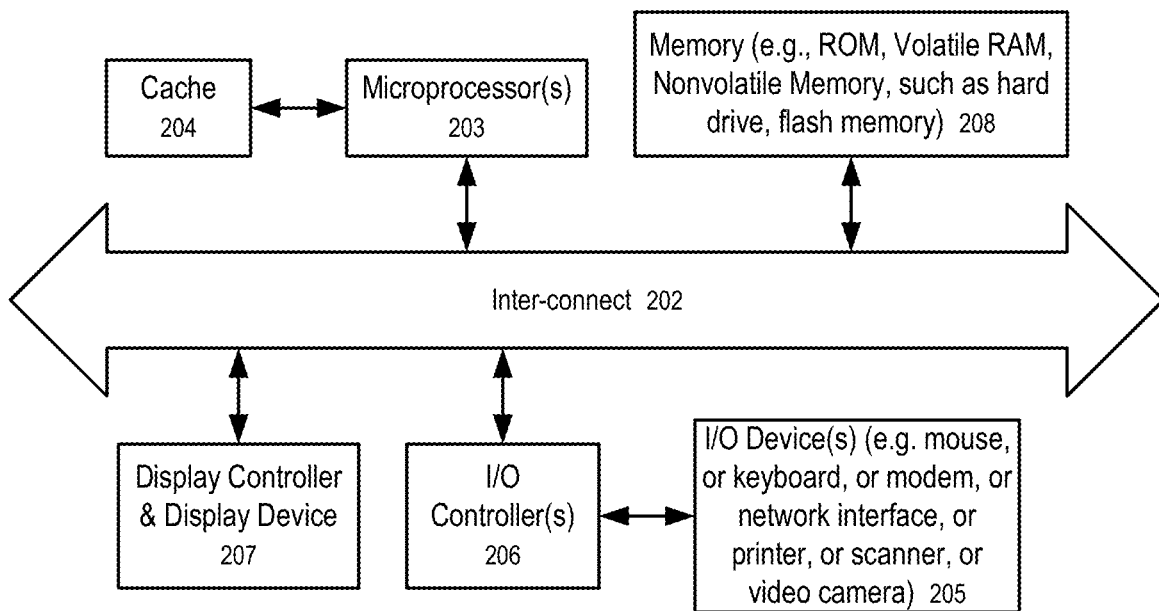
FIG. 11 shows a block diagram of a computing device (e.g., an evaluation server, an administrator server, or an authenticity server) which can be used in various embodiments.

FIG. 11 shows a block diagram of a computing device 201 (e.g., evaluation server 150, administrator server 302, or authenticity server 1005), which can be used in various embodiments. While FIG. 11 illustrates various components, it is not intended to represent any particular architecture or manner of interconnecting the components. Other systems that have fewer or more components may also be used. In an embodiment, an evaluation server, an administrator server, an authenticity server, or an identity provider may each reside on separate computing systems, or one or more may run on the same computing device, in various combinations.

In FIG. 11, computing device 201 includes an interconnect 202 (e.g., bus and system core logic), which interconnects a microprocessor(s) 203 and memory 208. The microprocessor 203 is coupled to cache memory 204 in the example of FIG. 11.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In one embodiment, a computing device as illustrated in FIG. 11 is used to implement evaluation server 150, application marketplace 123, service provider 170, identity provider 172, administrator server 302, and/or other servers.

In another embodiment, a computing device as illustrated in FIG. 11 is used to implement a user terminal or a mobile device on which an application is installed or being installed. A user terminal may be in the form, for example, of a notebook computer or a personal desktop computer.

In some embodiments, one or more servers can be replaced with the service of a peer to peer network of a plurality of data processing systems, or a network of distributed computing systems. The peer to peer network, or a distributed computing system, can be collectively viewed as a computing device.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 12:
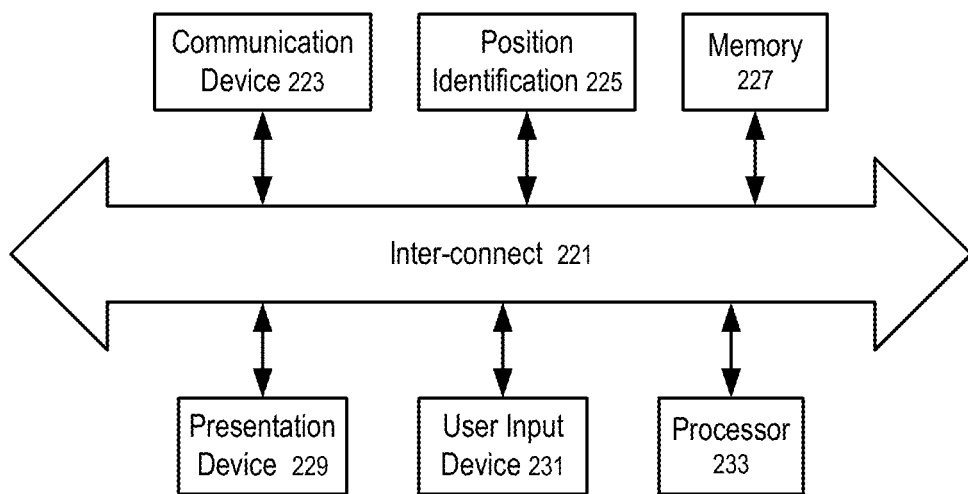
FIG. 12 shows a block diagram of a computing device (e.g., a mobile device of a user or a user terminal), according to one embodiment.

FIG. 12 shows a block diagram of a computing device (e.g., a mobile device of a user or a user terminal), according to one embodiment. In FIG. 12, the computing device includes an inter-connect 221 connecting the presentation device 229, user input device 231, a processor 233, a memory 227, a position identification unit 225 and a communication device 223.

In FIG. 12, the position identification unit 225 is used to identify a geographic location. The position identification unit 225 may include a satellite positioning system receiver, such as a Global Positioning System (GPS) receiver, to automatically identify the current position of the computing device.

In FIG. 12, the communication device 223 is configured to communicate with a server to provide data, including application data (e.g., an application identifier and a source identifier for a newly-sourced application). In one embodiment, the user input device 231 is configured to receive or generate user data or content. The user input device 231 may include a text input device, a still image camera, a video camera, and/or a sound recorder, etc.

Side-Load Protection Variations

Various non-limiting embodiments and examples related to side-load protection and/or determination of a source of side-loaded software are now discussed below. The embodiments and examples of this section (i.e., "Side-Load Protection Variations") do not limit the generality of the foregoing discussion.

In a first embodiment, an application has been installed (or in other cases will be or is planned to be installed) on a mobile device (e.g., mobile device 149) and a determination is made whether the source of the application is from an untrusted channel. For example, for an application on an Android mobile device, the application has been obtained from a source other than the Google Play Store.

Various use cases 1.1-1.6 are described below (pseudo-code is used in portions of the discussion below for ease of explanation). These use cases relate to various situations in which one or more applications (sometimes referred to simply as an "app") are to be installed on, are already installed on or otherwise interact with, or are intended for use on or with a mobile device. These applications may be tested in various ways as described below. In particular, use cases 1.5-1.6 relate to allowing or disallowing a side-loaded application. In some cases, this allowing or disallowing may relate to permitting or preventing installation of the application, or execution of an application that has already been installed. The "Server" and/or "server" mentioned in the use cases below can be, for example, evaluation server 150.

Various acronyms and terms used in the use cases below have the following meanings, with possible values indicated for some terms:

MCD-State: Mobile Device State [Trusted/Untrusted/Unknown]
SD-MCD: State Designation for the Mobile Device [Trusted/Untrusted]
Admin-MCD-State-Desig: Administrator Mobile Device State Designation [Trusted/Untrusted]
App-State: State of the Application [Trusted/Untrusted]
SD-App: State Designation for the Application [Trusted/Untrusted]
App-Sig: Signature of Authorship of the Application Use case 1.1: Testing a single downloaded app (white-listed channels and black-listed channels)
At the mobile device:
Download the app,
Test the channel ID associated with the app against a first known list of good channel IDs
If a match is not found
    test the channel ID with a first known list of bad channel IDs
    if a match is found
        set the Mobile Device State (MCD-State) to 'untrusted'
        send a message containing the MCD-State, the app id and the channel to a server
    else if a match is not found
        set the MCD-State to 'unknown'
        send a message containing the MCD-State, the app id and the channel to a server receive a message from the server, the message containing a State Designation for the Mobile Device (SD-MCD)
    set the MCD-State based on the received SD-MCD
At the Server:
Receive message from the mobile device
If the MCD-State is 'unknown'
    test the channel ID associated with the app against a second known list of good channel IDs
    if a match is not found
        test the channel ID with a second known list of bad channel IDs
        if a match is found
            set the SD-MCD to 'untrusted'
        else if a match is not found
            present a message to an administrator (e.g., admin server 302), the message containing the app id and the channel ID
            receive an administrator mobile device state designation (Admin-MCD-State-Desig) from the administrator
            set the SD-MCD on the received Admin-MCD-State-Desig
            update the second known list of good channel IDs or the second known list of bad channel IDs based on the Admin-MCD-State-Desig
            send a message to the mobile device containing the SD-MCD.
Use case 1.2: Testing all apps on the mobile device (white-listed channels and black-listed channels)
At the mobile device:
Receive a first known list of good channel IDs
Receive a first known list of bad channel IDs
For each app to be tested
    test the channel ID associated with the app against a first known list of good channel IDs
    if a match is not found
        test the channel ID with a first known list of bad channel IDs
        if a match is found
            set the MCD-State to 'untrusted'
            send a message containing the MCD-State, the app id and the channel to a server
        else if a match is not found
            set the state of app (App-State) on the mobile device to 'unknown'
            send a message containing the App-State, the app id and the channel to a server
            receive a message from the server, the message containing a State Designation for the App (SD-App) on the mobile device
            if the MCD-State is not 'untrusted'
                set the MCD-State on the received SD-App
At the Server:
Receive message from the mobile device
If the App-State on the mobile device is 'unknown'
    test the channel ID associated with the app against a second known list of good channel IDs
    if a match is found
        set the SD-App on the server to 'trusted'
    if a match is not found
        test the channel ID with a second known list of bad channel IDs
        if a match is found
            set the SD-App on the server to 'untrusted'
        else if a match is not found
            present a message to an administrator containing the app id and the channel ID
            receive an administrator mobile device app state designation from the administrator
            set the SD-App on the server based on the received administrator mobile device app state designation
            update the second known list of good channel IDs or the second known list of bad channel IDs based on the administrator mobile device app state designation
    send a message to the mobile device containing the value of the SD-App on the server.

In one variation, the order for the above, as regards at the mobile device, is that the channel IDs are sent to the mobile device, and then at the device the channel IDs associated with the app are tested against a previously-received list of good/bad channel IDs (e.g., white list 432 and black list 434 of FIG. 4).

Regarding the above at the server, a channel ID associated with an individual app is sent from MCD to the server where it is tested.

In one example, if the App-State of the app on the MCD is 'unknown,' which will be the case if the app is not from Google Play or an Amazon store [these are the only app stores currently filling out the value retrieved by the Android getInstallerPackageName( ) method], then an identifier can be sent for the app (e.g., package name or hash of the app) to the server (e.g., evaluation server 150), which may have other information about the origin and channel ID of the app, and the app identifier is used at the server to determine whether the app should be trusted or not.

In the case in which the channel ID is determined by monitoring file system or network activity somewhere else (e.g., on this particular mobile device, or on a different device for the same app (e.g., having the same application identifier), or on a server (e.g., in a VM or emulator monitoring behavior of the application)), then a channel ID could be available at the server, and thus sending an app identifier to the server can resolve the appropriate channel ID and the designation of it as trusted or untrusted.

Also, there is an optional variation in which the app may have been delivered by a good channel ID, but the app is no longer available from that good channel (e.g., it has been pulled by the operator of that channel), or the version of the app being analyzed has been replaced by a newer version of the app (e.g., an update or a vulnerability fix); in either case, the app may be considered as having an App-State of 'untrusted' (or in an alternative approach as having a state of 'out-of-date').

In yet other variations of the above, a previously GOOD channel ID is now known or determined to be BAD (e.g., by evaluation server 150 or admin server 302), and a re-evaluation of apps from that channel is performed.

In another variation, a previously BAD channel ID is now known to be GOOD, and a re-evaluation of apps from that channel is performed.

In another variation, a previously UNKNOWN channel ID is now known to be GOOD or BAD, and a re-evaluation of apps from that channel is performed.

In another variation, an app from a channel ID previously considered to be GOOD has been determined to be undesirable (e.g., due to malware discovered in the channel, or for other behavioral reasons), and as a result the designation of that channel ID as GOOD is changed to BAD or UNKNOWN.

Use case 1.3: Testing a single downloaded app (white-listed channels and no black-listed channels)
At the mobile device:
Download the app,
Test the channel ID associated with the app against a first known list of good channel IDs
If a match is not found
set the MCD-State to 'unknown'
send a message containing the MCD-State, the app id and the channel to a server
receive a message from the server, the message containing a SD-MCD
set the MCD-State based on the received state designation
At the Server:
Receive message from the mobile device
If the MCD-State is 'unknown'
test the channel ID associated with the app against a second known list of good channel IDs
if a match is not found
present a message to an administrator containing the app id and the channel ID
receive an administrator mobile device state designation from the administrator
set the SD-MCD based on the received administrator mobile device state designation
if the administrator mobile device state designation is 'trusted'
update the second known list of good channel IDs based on the administrator mobile device state designation
send a message to the mobile device containing the SD-MCD Use case 1.4: Testing all apps on the mobile device (white-listed channels but no black-listed channels)
At the mobile device:
Receive a first known list of good channel IDs (e.g., from an evaluation server or admin server 302)
For each app to be tested
test the channel ID associated with the app against a first known list of good channel IDs
if a match is not found
set the App-State on the mobile device to 'unknown'
send a message containing the App-State, the app id and the channel to a server
receive a message from the server, the message containing a SD-App on the mobile device
if the MCD-State is not 'untrusted'
set the MCD-State based on the SD-App
At the Server:
Receive message from the mobile device
If the App-State on the mobile device is 'unknown'
test the channel ID associated with the app against a second known list of good channel IDs
if a match is found
set the SD-App on server to 'trusted'
if a match is not found
present a message to an administrator containing the app id and the channel ID
receive an administrator mobile device app state designation from the administrator
set the SD-App on the server based on the received administrator mobile device app state designation
send a message to the mobile device containing the value of the SD-App on the server.

Use case 1.5: Allowing/disallowing a single side-loaded app (white-listed channels and white-listed app authors)
At the mobile device:
Download the app,
Retrieve the channel ID
Retrieve the Signature of Authorship of the app (App-Sig)
Test the channel ID associated with the app against a first known list of good channel IDs
Test to the App-Sig against a first known good list of authorship signatures
If a match is found for either test
set the App-State to 'trusted'
Else if a match is not found
set the App-State to 'untrusted'
send a message containing the App-State, the App id, the App-Sig and the Channel-ID to the server
receive a message from the server wherein the message contains an SD-App
set the App-State based on the received SD-App value
At the server:
Receive a message containing the App-State, the App id, the App-Sig and the Channel-ID from the mobile device
Test the channel ID associated with the app against a second known list of good channel IDs
Test to the App-Sig against a second known good list of authorship signatures
If a match is found for either test
set the App-State to 'trusted'
Else
set the SD-App to 'untrusted'
Send a message containing the SD-App to the Mobile Device (MCD)

In one variation of the above, the app has not been installed yet, and the MCD is downloading the app; in order to do the next step of "Retrieve the channel ID" via the "getInstallerPackageName( )" method, the app is first installed. In an alternative approach, this processing is done before the installation proceeds (e.g., because the download is intercepted to determine a channel ID, or because there is logic in the InstallerPackage that is will determine a channel ID).

In one variation, the actions taken above are to set App-State; being "allowed/disallowed" means if "allowed" then permitting installation to proceed, and if disallowed, then either uninstalling the app if it has already been installed, or blocking the app from executing if the app has already been installed. In an embodiment, the signed application installation package contains a directive that the application is only intended for distribution from one or more specific channels, and if the application has been provided via a channel that was not listed, then the application will not be installed.

Use case 1.6: Conditionally allowing/disallowing a single side-loaded app
At the Mobile Device:
Download an app
Test the channel ID associated with the app against a first known list of good channel IDs
Test to the App-Sig against a first known good list of authorship signatures If a match is found for either test
    set the App-State to 'trusted'
Else if a match is not found
    set the App-State to 'untrusted'
    send a message containing the App-State, the App id, the App-Sig and the Channel-ID to the server
    receive a message from the server wherein the message contains a set of conditions that are required in order for the app to be allowed
    present the received conditions to the user
    receive and execute input settings from the user
    if the settings meet the required conditions
        set the App-State to 'trusted'
        send a message containing the App-State, the App id, and indicating that the set of conditions have been fulfilled to the server
    else
        send a message containing the App-State, the App id, and indicating that the set of conditions have not been fulfilled to the server
At the Server:
Receive a message containing the App-State, the App id, the App-Sig and the Channel-ID from the Mobile Device
Test the channel ID associated with the app against a second known list of good channel IDs
Test to the App-Sig against a second known good list of authorship signatures
If a match is found for either test
    set the App-State to 'trusted'
Else if a conditional match is found
    retrieve the set of conditions required for the app to be allowed
    send a message to the Mobile Device wherein the message contains the set of conditions required for the app to be allowed
    receive a message from the Mobile Device containing the App-State, the App id, and indicating whether or not the set of conditions have not been fulfilled.

Various different situations associated with the above use cases may exist. In some cases, a channel is white for all apps or black for all apps, or sometimes an admin (e.g., admin server 302) may configure a more-complicated combination. For example, a particular channel ID may be predominantly GOOD (e.g., Google Play Store), but there may be certain known BAD apps available from that channel. In this case the channel ID has a 'default' designation as GOOD, but there is a black list for that channel of specific apps known to be BAD, and this channel specific list is also consulted during any decision processes (e.g., by the admin server and/or the evaluation server).

In another example, an enterprise (e.g., admin server 302) may not only store a list of GOOD channel IDs, but may also choose to have a channel-specific list of white-listed apps, which are the only ones from that channel that are to be allowed as 'trusted.' An example of this is that only enterprise-approved apps are allowed from that channel and not any other channels.

Another variation involves there being multiple destinations or install-locations on a single mobile (or other computing) device. Specifically, each 'container' on a mobile device can represent a separate install location (e.g., the 'personal' container and the 'work' container), as with the Google at Work product or other container solutions like those available from Good Technology. In this case, the designation of a channel as GOOD or BAD depends on the 'install location' for the app; that is, in one case, the only GOOD channel ID for the Work container on the device is the enterprise version of the Google Play app store; the general consumer version of the Google Play app store is not considered as a GOOD channel ID for the Work container. This variation may apply, for example, to any of the use cases above.

In some cases, an app appears to be available from both trusted and untrusted channels (e.g., the app is determined to be the same app based on a hash of each app). In these cases, if the app is identical to the app that is available from the trusted channel, then the app state is set to trusted, otherwise it is set to untrusted. Also, evaluation server 150 may or may not know where the actual app installed on the device was sourced from (e.g., whether from the trusted channel or the untrusted channel). Thus, the evaluation server may choose to determine that the app is untrusted or unknown because the actual source of the app is not known.

Some embodiments relate to wearable apps. These are apps which run on a wearable device (e.g., Android Wear), but these apps are packaged inside a handheld app, because users cannot browse and install apps directly on the wearable itself. If packaged properly, when users download the handheld app, a system automatically pushes the wearable app to the paired wearable. For example, see https://developer.android.com/training/wearables/apps/packaging.html Also see https://developer.android.com/training/building-wearables.html There are cases of wearable apps being packaged inside the APK for the handheld device for subsequent installation onto a wearable device. With respect to detection of malware, or determination of whether the app is undesired, the wearable app may be scanned using a whitelist or a blacklist or a decision component. Also, there are cases in which wearable apps do not run on the mobile device, but instead run on a paired or connected wearable, and which are provisioned via a connection through the mobile device. Here, the source identifier for the embedded wearable app consists of the source identifier of the containing app plus the fact that the wearable app was contained within that wearable app. The side load protection system may distinguish between the containing app for installation or running on the mobile device and the embedded app for installation or running on the wearable device; e.g., one may be allowed, while the other may not, the decisions of the system can be independent of each other for these two apps and devices.

In one example, for an app that was preloaded on the device, the result from "getInstallerPackageName( )" can be "null." If this value returned cannot be used to distinguish pre-loaded from non-pre-loaded apps, the system can determine by other attributes if the app had originally been pre-loaded [e.g., such as if the app is installed in location/ system/app or/system/priv-app (Android 4.4 or greater)].

In another example, an app's install channel is detected on the device, or is detected in a piece of code that operates somewhere in the network path from the install/download network source to the device (e.g., in a network appliance/ router/firewall/etc.). For example, by observing that an application is being downloaded to the device from a particular network location, a channel ID can be determined for that application as being an identifier for the source of the download, e.g., a network IP address, or domain name, or URL, or other network identifier. In such a variation, the system may choose to not allow a network connection to a network location known to be a source of bad channel IDs for applications, based on user preference, user policy or enterprise policy (e.g., as set by the admin server 302), or may choose to not allow an application to be downloaded from such a network source (other communications with this network source might be allowed).

In various cases, one detects a trusted/untrusted channel BEFORE the install, DURING the install, or AFTER the install. The URL http://developer.android.com/reference/android/content/pm/PackageInfo.html describes the PackageInfo class on Android. This may be obtained from the getInstallerPackageName(String packageName) method in the PackageManager class. See http://developer.android.com/reference/android/content/pm/PackageManager.html #getInsta llerPackageName(java.lang.String)

This stackoverflow article (http://stackoverflow.com/questions/13289748/can-packagemanager-getinstaller-packagena me-tell-me-that-my-app-was-installed-f) says that:

Google Play: "com.android. vending" or "com.google.play" or "com.google.android.feedback"
Amazon: "com.amazon.venezia"
Elsewhere: "null"
Samsung's installer may return com.sec.android.app.samsungapps.
The getInstallerPackageName is API Level 5 (Android 2.0+).

If the source of the information of "channel ID" is calling "getInstallerPackageName( )", then there will typically be a non-null answer only for Google Play or the Amazon store or the Samsung store. A 'null' value means an unknown channel ID—and thus is determined (at least initially) to be an untrusted channel ID. If the actual source of the app can be determined as the network location or URL used to download the app, than that network location is the source ID or channel ID for the application.

In another embodiment, enterprise resources are protected when an application on a mobile device associated with the enterprise has been determined to have an application installed from an untrusted channel. In one example, a use case 2.1 relates to applying an enterprise policy (in many variations).

In this example, one or more of the following actions are taken:
At the mobile device:
access enterprise policy rules
follow enterprise policy rules (many possible actions or combinations) such as:
present warning/notification info to the user,
remove untrusted app,
suspend access to the untrusted app,
instruct user to remove app,
provide instructions to the user,
suspend access to enterprise resources,
remove enterprise apps from the user interface,
disable access to enterprise apps on the mobile device,
suspend access to vpn (virtual private network),
suspend access to enterprise wifi,
suspend access to enterprise contact list,
suspend single sign on access requests,
present user with ability to restrict permissions for one or more other applications,
transmit inventory of installed apps to a server,
delete enterprise content on the mobile device including
bookmarked web sites
photos
notes
documents
suspend access to enterprise content on the mobile device including
bookmarked web sites
photos
notes
documents
require password to access enterprise resources,
remove enterprise email account from presentation on the mobile device,
lock the phone,
locate the phone,
etc.
At the server:
access enterprise policy rules
follow enterprise policy rules (many possible actions or combinations) such as:
transmit warning/notification in a message for presentation to the user,
transmit message to mobile device to remove untrusted app,
transmit message to mobile device to suspend access to the untrusted app,
transmit message to mobile device to instruct user to remove app,
transmit message to mobile device to provide instructions to the user,
transmit message to mobile device to suspend access to enterprise resources,
suspend access of the mobile device to enterprise resources in the network,
transmit message to mobile device to remove enterprise apps from the user interface,
transmit message to mobile device to disable access to enterprise apps on the mobile device,
suspend access of the apps on the mobile device to enterprise resources in the network
transmit message to mobile device to suspend access to vpn,
deny vpn access requests from the mobile device,
transmit message to mobile device to suspend access to enterprise wifi,
deny wifi access requests from the mobile device
suspend access to enterprise contact list,
transmit message to mobile device to suspend single sign on access requests,
deny single sign on requests from the mobile device,
transmit message to mobile device to present user with ability to restrict permissions for one or more other applications,
transmit message to mobile device to transmit inventory of installed apps to a server,
transmit message to mobile device to delete enterprise content on the mobile device including
bookmarked web sites
photos
notes
documents
transmit message to mobile device to suspend access to enterprise content on the mobile device including
bookmarked web sites
photos
notes
documents
transmit message to mobile device to require password to access enterprise resources,
transmit message to mobile device to remove enterprise email account from presentation on the mobile device, prevent delivery of enterprise content to the mobile device,
etc.

In another embodiment, trust is restored between an enterprise admin server and a mobile device that hosts an app that was installed from an untrusted channel. In one example, a use case 3.1 relates to managed restoration of suspended functionality. For example, one or more of the following actions are taken:

At the mobile device or terminal:
Perform one or more of the following:
  Restore the mobile device to factory settings.
  Restore the mobile device memory to the state that existed at a time that preceded the installation of the untrusted app.
  Receive an one or more instructions from a server and execute those instructions on the mobile device.
Report the completion of all necessary actions and the readiness of the mobile device to re-enter a 'trusted' state by sending a message to a server.
Receive an instruction from the server to set the mobile device to a trusted state.
Set the state of the mobile device to 'trusted'
Restore access to enterprise resources.
  present 'everything is ok' notification to the user,
  provide instructions to the user,
  restore enterprise apps to the user interface,
  enable access to enterprise apps on the mobile device,
  restore access to vpn,
  restore access to enterprise wifi,
  restore access to enterprise contact list,
  restore single sign on access requests,
  present user with ability to change permissions for one or more other applications,
  restore enterprise content on the mobile device including
    bookmarked web sites
    photos
    notes
    documents
  restore access to enterprise content on the mobile device including
    bookmarked web sites
    photos
    notes
    documents
  restore single sign on access to enterprise resources,
  restore enterprise email account presentation on the mobile device,
At the server:
Receive a message from the mobile device that the completion of all necessary actions has occurred and the mobile device is ready to re-enter a 'trusted' state
Restore access to enterprise resources.
  Send a message to the mobile device providing instructions to the user,
  Send a message to the mobile device to restore enterprise apps to the user interface,
  Send a message to the mobile device to enable access to enterprise apps on the mobile device,
  Enable enterprise apps to access enterprise resources in the network
  Send a message to the mobile device to restore access to vpn,
  Enable access to the enterprise vpn
  Send a message to the mobile device to restore access to enterprise wifi,
  Enable access to the enterprise wifi
  Send a message to the mobile device to restore access to enterprise contact list
  Enable access to the network copy of the enterprise contact list
  Send a message to the mobile device to restore single sign on access requests,
  Enable access to single sign on access requests
  Send a message to the mobile device to present user with ability to change permissions for one or more other applications,
  Send a message to the mobile device to restore enterprise content on the mobile device including
    bookmarked web sites
    photos
    notes
    documents
  Enable access to enterprise content on the mobile device including
    bookmarked web sites
    photos
    notes
    documents
  Enable access to enterprise content on in he network including
    bookmarked web sites
    photos
    notes
    documents
  Send a message to the mobile device to restore access to enterprise content on the mobile device including
    bookmarked web sites
    photos
    notes
    documents
  Send a message to the mobile device to restore access to enterprise content on in the network including
    bookmarked web sites
    photos
    notes
    documents
  Send a message to the mobile device to restore single sign on access to enterprise resources,
  Send a message to the mobile device to restore enterprise email account presentation on the mobile device,
Send a message to the mobile device containing an instruction from the server to set the mobile device to a trusted state.
Send a message to the mobile device to present 'everything is ok' notification to the user,
Receive a message from the mobile device confirming that the mobile device is in a 'trusted' state.

In another embodiment, a determination is made as to whether any high-risk activities occurred while a mobile device was in an untrusted state due to a side-loaded application. In one example, a use case 4.1 relates to an access usage log and report. For example, one or more of the following actions is taken:

On the mobile device:
Determine the time of installation of the side loaded app associated with the mobile device entering the 'untrusted' state
Transmit the determined time of installation of the app associated with the mobile device entering the 'untrusted' state to a server (e.g., evaluation server 150 or admin server 302)

Determine usage parameters such as the times and durations and quantities where appropriate of any of the following:
Mobile device locked while still communicating data
Camera on
Microphone on
Mobile device accesses or attempts to access personally identifiable data
Mobile device accesses or attempts to access enterprise resources
Mobile device connected via vpn or attempts to connect via vpn
Mobile device connected via enterprise wifi or attempts to connect via wifi
DNS resolution attempts (DNS probing by the device)
USB connector in use
Bluetooth in use
NFC in use
802.15 in use
Data sent to an address inside the enterprise addressing domain
Data sent to an address outside the enterprise addressing domain
Address is a known 'bad' address (e.g., location of a CNC server or malware server)
Data received from an address inside the enterprise addressing domain
Data received from an address outside the enterprise addressing domain
Address is a known 'bad' address (e.g., location of a CNC server or malware server)
Single sign on used to access a resource or single sign on attempted to be used for accessing a resource.
Enterprise content accessed or attempted to be accessed
App installed or app update installed
Operating system or firmware update applied
Device hard reset performed
Device booted into recovery mode
The locations of the mobile device
Recording the identifiers of nearby beacons, Wi-Fi SSIDs or BSSIDs, or Bluetooth identifiers, or other network related identifiers
Switching off the mobile device
Switching on the mobile device
Removal and insertion of memory cards and sim cards
Use of sensors on the mobile device (part of device or connected to device), such as biometric sensors, accelerometer, gyroscope, magnetic sensor, proximity sensor, temperature sensor, barometric sensor, etc.
Reading information from the/proc filesystem
Attempts to read or write information to normally protected areas of a filesystem
Transmit the results of the determination of usage parameters to a server (e.g., evaluation server 150)
Receive an acknowledgement from the server
Display the determination of usage parameters on the display of the mobile device.
At the server:
Receive a message from the mobile device containing the time of installation of the app associated with the mobile device entering the 'untrusted' state
Receive a message from the mobile device containing usage parameters such as the times and durations and quantities where appropriate of any of the following:
Mobile device locked while still communicating data
Camera on
Microphone on
Mobile device accesses or attempts to access personally identifiable data
Mobile device accesses or attempts to access enterprise resources
Mobile device connected via vpn or attempts to connect via vpn
Mobile device connected via enterprise wifi or attempts to connect via wifi
DNS resolution attempts (e.g., DNS probing by the device)
USB connector in use
Bluetooth in use
NFC in use
802.15 in use
Data sent to an address inside the enterprise addressing domain
Data sent to an address outside the enterprise addressing domain
Address is a known 'bad' address (e.g., location of a CNC server or malware server)
Data received from an address inside the enterprise addressing domain
Data received from an address outside the enterprise addressing domain
Address is a known 'bad' address (e.g., location of a CNC server or malware server)
Single sign on used to access a resource or single sign on attempted to be used for accessing a resource.
Enterprise content accessed or attempted to be accessed
App installed or app update installed
Operating system or firmware update applied
Device hard reset performed
Device booted into recovery mode
The locations of the mobile device
Recording the identifiers of nearby beacons, Wi-Fi SSIDs or BSSIDs, or Bluetooth identifiers, or other network related identifiers
Switching off the mobile device
Switching on the mobile device
Removal and insertion of memory cards and sim cards
Use of sensors on the mobile device (part of device or connected to device), such as biometric sensors, accelerometer, gyroscope, magnetic sensor, proximity sensor, temperature sensor, barometric sensor, etc.
Reading information from the/proc filesystem
Attempts to read or write information to normally protected areas of a filesystem
Determine the level of risk based on the received messages In one variation of the above, data has been sent that should not have been sent, and the amount of data and/or the frequency of such activity was unusual or inappropriate. The actual data that is sent is captured or inspected (or received). When inspecting such data, the administrator is notified of the findings.

In another embodiment, a population is managed in which the population includes mobile devices associated with an enterprise. The mobile devices have multiple diverse apps installed from multiple diverse channels and some of those apps are determined to be side-loaded apps (e.g., determined using evaluation server 150). In one example, a use case 5.1 relates to comparing a population of interest with a control population.

For example, one or more of the following actions are taken:

At the server (e.g., evaluation server 150):
Measure the proportion of mobile devices hosting an app downloaded from an untrusted channel
Compare the measured proportion with similar proportions reported for another population of mobile devices
If the measured proportion is sufficiently greater than the reported proportion:
Send a notification of the measured proportion and the reported proportion to an administrator (e.g., admin server 302)
Receive a determination of the level of risk from the administrator.
If the determined level of risk is higher than an acceptable level of risk:
Revoke access to enterprise resources for all of the mobile devices hosting the app that was downloaded from an untrustworthy channel
Send a message to each of the mobile devices hosting the app downloaded from the untrusted channel indicating that the devices are in an 'untrusted' state
Send instructions to each of the mobile devices for presentation to the user
Send instructions to the mobile devices per the use case 2.1 discussed in detail above.

In another embodiment, a determination is made of the channel or other source for an application. In one example, a use case 6.1 relates to a value obtained from an operating system (OS) for determining a channel ID, if the ID is available. If a channel ID is not available, a channel is determined from network and/or file system activity by monitoring file system changes.

For example, one or more of the following actions may be taken:
At the mobile device:
Monitor for changes in the file system
Detect a file being written which represents an application (e.g., .apk, .ipa, etc.)
Determine which application is writing the file to the file system
Determine which network addresses are being read from by the application that is writing the file to the file system
Assign a channel ID for the detected downloaded app based on the active network address or the application which is writing the file to the file system In another example, a use case 6.2 relates to determining a channel ID by monitoring network activity.

For example, one or more of the following actions may be taken:
At the mobile device:
Monitor network activity for applications
Detect a network transmission being read at the device which represents an application (e.g., .apk, .ipa, etc.) (e.g., this can be determined by an HTTP header Content-type header, or an MIME type in the transmission (e.g., application/vnd.android.package-archive), or the detection of a 'magic number' or file format signature)
Assign a channel ID for the detected downloaded app based on the active network address from which the transmission containing an application is coming.
At a network appliance (or server):
Monitor network activity for a mobile device,
Detect a network transmission being sent to the device which represents an application (.apk, .ipa, etc.) (e.g., this can be determined by an HTTP header Content-type header, or an MIME type in the transmission (e.g., application/vnd.android.package-archive), or the detection of a 'magic number' or file format signature)
Assign a channel ID for the detected downloaded app based on the active network address from which the transmission containing an application is coming.

In one embodiment, previous behavior associated with a side-loaded app on another phone is used to predict the same behavior based on the early indications on the subject phone.

In other embodiments, side-loaded apps are identified in various ways. In one embodiment, an origin of the app is identified, and a determination is made (e.g., by evaluation server 150) whether the app is still available in the version that is currently being assessed (e.g., when being considered for installation on mobile device 149).

For origin detection, some things can be done in advance; for applications that are still available, a server checks corpus or a known App Store to see if the app still available there, or if a more recent version of the same app (e.g., as determined by similarity analysis as discussed herein) is now available, or if the version currently being analyzed is no longer available.

In some embodiments regarding origin detection, when a channel ID is not otherwise obtainable, a system may determine a source or channel ID by observing activity in a device's network connections or browser activity or file system operations. E.g., code that executes within a browser (such as a browser extension or plugin or a built-in browser function) or code that is observing the browser's activity (e.g., via monitoring of Android intents, or IOS protocol handlers, or via a network intercept on a device, such as for example a network shim or adapter or VPN or in a network appliance). Such code can detect that an app (e.g., an .apk or .ipa or other app packaging file format) is being downloaded (e.g., looking at a URL for source, or looking at HTTP header Content-type (e.g., application/vnd.android.package-archive for an Android APK, or application/octet-stream for an iOS IPA file); or seeing how the file name is represented in headers if present to see that a .apk or .ipa application file type is being downloaded). An app whose download is detected in this manner can be determined to be from a source or channel ID of the network location or URL used for the download.

In one embodiment, it may be detected whether an app download is via a client pull request or a web App Store push request, or an MDM app push request.

In one embodiment, an app has the same hash as a version from a known source, but is not delivered via that source. For example, an app is delivered via USB or Bluetooth (BT) or another peripheral form of communication (e.g., an Android USB ADB interface). Or an app is or was delivered by some other app (e.g., a third-party App Store app).

In one embodiment regarding post-installation detection for an application, a server or other computing device determines a source of the application by visiting/going to a plurality of well-known app stores, and seeing if an app with the same hash is available for download there (e.g., this can include an enterprise App Store or an MDM controlled store). Alternatively, one can use a cache of such info obtained previously from these source(s) (e.g., at a security company server); and determine that (i) an app with this hash is available there now; or (ii) an app with this hash is not available there now, but was available there in the past; and/or (iii) a newer version of the app (e.g., as determined by component analysis and/or similarity analysis as described herein) is now available there. Also, in some cases, the same app can have been available from multiple sources.

In one embodiment, for reports to administrators or other enterprise reports, it is determined whether this app is present on any other devices for the enterprise (e.g., mobile devices managed by admin server 302) plus numbers of devices and/or details of device activity, including present and/or historical. The prevalence of this app on any worldwide devices may be determined, including details of app or history or statistics of usage or behavior; and optionally determination of the prevalence among other enterprises' devices anonymized with optional classification of enterprise size and IR type (e.g., SAIC Code).

In one embodiment, high confidence (e.g., confidence determined to be above a threshold) findings can be reported to an admin server, including support for a correlation of the app presence with any of: network endpoints visited; other apps present on the mobile device; or any other metadata related to device or networks connected to the mobile device, or user or other metadata. Also, a server can track the origin as to what network(s) device the mobile device was connected to at the time of download, or the specific computing device/network through which the download to the mobile device was made.

In some cases, an app is preloaded on a device. It can be determined whether the app has been updated since the preload time (e.g., updated by an automatic update and/or a user-initiated update); and/or whether a firmware flash or OTA OS UPDATE has occurred.

In one variation, an indication is put inside the app (e.g., inserted by the developer, such as by a developer server, into or with the code of the application) of an intended channel for delivery. The app should not show up with a different channel ID having been determined after analysis (e.g., by evaluation server 150). Otherwise, the app is considered to be from a bad source or untrusted.

In one embodiment, a change in the assessment of an app (e.g., as being benign, or malware, or other) may trigger a change in the assessment of a channel (e.g., the channel through which the app was distributed). For example, if a channel had been hitherto determined to be unknown (vs. trusted or untrusted), then the channel assessment may be altered to trusted or untrusted.

Evaluation and Monitoring of Applications Installed on Computing Devices

As described in more detail below, a user may express an intent as to how the user desires its computing device (e.g., mobile device 149) to behave. The intent may be explicitly provided by the user or may be otherwise determined (e.g., by reference to a database on a remote server). In one embodiment, the user's intent defines how the user wants to control receiving of certain types of messages (e.g., advertisements). The type of control desired by the user in its various forms of experience on a computing device (e.g., a mobile device 149) is expressed in the user's intent. This intent may be used to determine various behaviors of the computing device. For example, some undesired behaviors may be stopped by disabling various components of one or more applications that have been previously installed on the user's mobile device.

In one embodiment, the system of FIG. 1 may be used for control of behavior on computing devices or for analysis of software components, each as described herein, in which user terminals and mobile devices, or other computing devices communicate with a messaging server and/or application marketplace 123, or with an identity provider (some examples of an identity provider were discussed above), according to various embodiments as described below. In FIG. 1, the user terminals (e.g., 141, 143, . . . , 145) and/or mobile devices 147, 149 are used to access and/or communicate with evaluation server 150, an identity provider, application marketplace 123 (e.g., an Android or Google Play marketplace), and/or a messaging server (e.g., an email server) (not shown) over communication network 121.

A server (e.g., evaluation server 150 or administrator server 302) receives at least one behavioral preference of the user from mobile device 149, and the at least one behavioral preference is determined by the application based on input from the user. The server stores the at least one behavioral preference for later uses such as responding to queries from other computing devices regarding the intent of the user of mobile device 149. In one embodiment, the server is independently maintained by each of many ad networks. The Ad Network Detector as discussed herein may manage these behavioral preferences on behalf of a user for these networks. In an alternative embodiment, an identity provider (e.g., such as was discussed above) includes a database, which stores component identities and user policies.

In one embodiment, an application referred to herein as "Ad Network Detector" may be downloaded from the Google Play service onto a user's mobile device 149. The expressing of user intent and control of behavior for mobile device 149 as described below may be incorporated into or otherwise work in conjunction with the Ad Network Detector application.

The Ad Network Detector application scans a user's phone or tablet for the presence of ad networks used in mobile apps, giving the user information about what types of ads can be displayed, and what information is gathered by the ad networks. With access to this information, the user is able to decide whether to keep the application that has a particular ad network on the user's phone.

Mobile device (e.g., smartphone or tablet) usage has increased dramatically, and some advertisers have begun to experiment with aggressive, new techniques to display ads on mobile devices. These techniques include pushing ads to the standard Android notification bar, dropping generically designed icons on the mobile desktop, and modifying browser settings like bookmarks or the default homepage. Because each of these techniques can display an advertisement outside the context of a specific application, it's difficult for users to know exactly which app is responsible for any given ad. The Ad Network Detector application provides a method for users to determine which ad network and application are the source for such ads.

Some ad networks also collect information that identifies a specific device or user for use in targeted marketing campaigns. Much like for browser-based ads, this practice allows users to see more personalized or relevant ads. It is sometimes difficult for a user to know what aspects of the user's information are collected by ad networks. The capabilities and information collection methods specific to each ad network may be determined from investigation. The Ad Network Detector application informs the user what data is being collected, and by which ad network/application.

In this embodiment, the Ad Network Detector application provides information to the user to about practices supporting mobile advertising. The application may detect many ad networks. Some of the ad networks detected may include the following examples:

LeadBolt
AdFonic
AdKnowledge

AdMob
BuzzCity
Casee
Everbadge
JumpTap

Regarding ad network capabilities and privacy, in this embodiment the capabilities and information collection methods specific to each ad network may be investigated. Based on this investigation, the Ad Network Detector application details what identifying information is collected by each ad network, and how it is collected. This may include personal information directly linkable to an individual user, such as an email address, and device and network information that is specific to an individual device or network, rather than to the user.

In one embodiment, a screen is presented by an installed application (e.g. the Ad Network Detector application after installation from application marketplace 123) to a user on a display of mobile device 149. In this embodiment, a user expresses his or her intent to control behavior of application components on mobile device 149.

In one example, a BTController application has previously been installed on the mobile device 149 by the user, among numerous other user-installed applications. The BTController includes an advertisement network component having several behaviors. A first behavior is the display of advertisements in the notification bar of mobile device 149.

In this embodiment, the components of each application (e.g., BTController) previously installed on mobile device 149 are determined (e.g., determined by an application or another tool installed on the mobile device for that purpose). For example, a scan to determine these components may be initiated by the user by her clicking on or touching a start scan button of a user interface.

An example of a component to be identified is the LeadBolt advertising network included in the BTController application. In addition, at least one behavior (e.g., displaying of ads in the notification bar) associated with each of the components for an installed application is identified.

The identified behaviors are presented to the user (e.g., in a list of scan results). At least one behavioral preference expressing the intent of the user is determined (e.g., a desire of the user to opt out of a particular behavior). This intent is then implemented on the mobile device by reconfiguring the identified components of various applications on the mobile device as necessary to conform to the user's expressed intent.

In one embodiment, a status display presented to the user by the installed application that indicates the status of analyzing applications on the mobile device 149 (i.e., other applications that are installed on the mobile device) to identify their respective components, according to one embodiment. An extent of progress of the analysis or scan is indicated by a bar.

In one embodiment, a set of results is presented to the user from the analyzing of the applications on the mobile device 149. The results include a list of behaviors identified. For example, one behavior is the display of ads in the notification bar of the mobile device. The number of applications identified that include a component exhibiting the listed behavior is indicated in vertical arrangement or column.

For example, only one application was identified that includes a component exhibiting this behavior. Two applications were identified that include a component exhibiting a different behavior. In contrast, zero applications were identified including a component that exhibits yet another behavior. It should be noted that the count, in this implementation, refers to the number of components that exhibit a particular behavior. This count (or an additional count) in other implementations could reflect the number of applications that exhibit the behavior. Any given component may be present in several different applications, so these two counts are not necessarily equal.

In one embodiment, a screen presents information about an advertisement network (LeadBolt) incorporated in an application (BTController) installed on mobile device 149. The screen includes a description of the behavior associated with the application.

In one embodiment, a screen presents an opt-out button for the user to opt out of the advertisement network. The screen includes a description describing an opt-out option for the advertisement network. The user expresses her intent by clicking on or touching (e.g., on a touch screen) opt-out button.

In one embodiment, the user's intent may be stored locally in a memory of mobile device 149. Alternatively, this intent may be stored remotely on a different computing device such as a server (e.g., a server operated by the software developer of the Ad Network Detector discussed above) accessible via communication network 121. This server may also be accessible by third-party application developers in order to conform behaviors to intents previously expressed by respective users. In another embodiment, this server is operated by the owner of the component.

Various other embodiments are now described below. In a first embodiment, a computer-readable storage medium stores computer-readable instructions (e.g., instructions of an Ad Network Detector), which when executed, cause a computing device (e.g., a mobile device of a user) to, for an application installed on the mobile device of the user, determine components of the application; identify, via at least one processor of the mobile device, at least one behavior associated with each of the components, including a first behavior (e.g., ad display in a notification bar) associated with a first component; present results from the identifying to the user, the results to include a list of behaviors including the first behavior; and receive a selection from the user of at least one behavioral preference. Further information regarding determining the components of an application is discussed in greater detail below in the section titled "Analyzing Components of an Application".

In one embodiment, the at least one behavioral preference is selected from the group consisting of: opting out of the first behavior; opting out of one or more of the components including the first component; a set of user preferences for specifically-identified behaviors; and a policy. In one embodiment, the at least one behavioral preference is a policy, and the policy is enforced on new applications installed on the mobile device. In one embodiment, the first component enables the user to selectively opt out of individual behaviors of the first component.

In one embodiment, the selection from the user of at least one behavioral preference is to opt out of the first behavior, and the instructions further cause, after the opting out, running the first component to determine whether the first behavior is active. In one embodiment, the determining whether the first behavior is active comprises at least one activity selected from the group consisting of: running the first component in an emulated environment on a different computing device (e.g., a developer server); and monitoring behavior on the mobile device after receiving the selection from the user.

In one embodiment, the selection from the user of at least one behavioral preference is to opt out of the first behavior, and the instructions further cause, after the opting out, determining a status of the opting out using an application programming interface of the first component. In one embodiment, the instructions further cause the mobile device to, in response to the selection from the user, reconfigure execution of the first component so that the first behavior no longer occurs on the mobile device.

In one embodiment, the instructions further cause, in response to the selection from the user, uninstalling the application from the mobile computing device. In one embodiment, the instructions further cause, in response to the selection from the user, disabling further execution of the first component on the mobile device. In one embodiment, the first component is shared by the application and an additional application, and the disabling affects both the application and the additional application.

In one embodiment, the first behavior is a presentation of messages to the user. In one embodiment, the messages include at least one advertisement presented in a notification area of the mobile device. In one embodiment, the presentation of messages is outside of a context of the application presented to the user during normal operation of the application. In one embodiment, the first component is a part of the application.

In one embodiment, the instructions further cause displaying opt-out options to the user, wherein the opt-out options are solely for applications already installed on the mobile device. In one embodiment, the instructions further cause displaying opt-out options to the user, the opt-out options comprising all possible opt-out flows for the user on the mobile device as determined from a database. In one embodiment, the first component is a linked library packaged with the application prior to installation of the application on the mobile device.

In one embodiment, the mobile device is, for example, a tablet device, or an Android phone device. In one embodiment, the first component is a portion of the executable code of the application, and the executable code enables the application to interact with an advertising network or an analytics network. In one embodiment, interaction with the advertising network comprises display of advertisements provided from the advertising network.

In one embodiment, a non-transitory computer-readable storage medium stores computer-readable instructions, which when executed, cause a computing device to: for an application installed on a computing device of a user, determine components of the application; identify, via at least one processor, at least one behavior associated with each of the components, including a first behavior associated with a first component; and determine at least one behavioral preference of the user.

In one embodiment, the instructions further cause storing the at least one behavioral preference on the computing device so that the application can locally determine the at least one behavioral preference. In one embodiment, the instructions further cause the first component to evaluate the at least on behavioral preference to determine how the first component is to behave on the computing device.

In one embodiment, the instructions further cause storing the at least one behavioral preference on a different computing device so that an advertisement network associated with the first component can query the different computing device (e.g., a developer server) in order to determine the at least one behavioral preference of the user. In one embodiment, the instructions further cause the first component to execute in conformance with results from the query of the different computing device, wherein the query includes a user identifier of the user.

In one embodiment, the instructions further cause: in response to downloading or installing the application, scanning the application to confirm compliance with the at least one behavioral preference of the user; and if the application violates the at least one behavioral preference, alerting the user of the violation or blocking installation of the application.

In one embodiment, a system comprises: a display; at least one processor; and memory storing instructions configured to instruct the at least one processor to: determine components of an installed application; identify at least one behavior associated with each of the components, including a first behavior associated with a first component; present, on the display, at least one component of the installed application for which a user can opt out; and receive a selection from the user of an opt-out for a first component of the at least one component.

In one embodiment, the instructions are further configured to instruct the at least one processor to present an opt-out status to the user for components for which the user has previously opted out.

In one embodiment, a method includes: for an application installed on a computing device of a user, determining components of the application; identifying, via at least one processor of the computing device, at least one behavior associated with each of the components, including a first behavior associated with a first component; presenting, on a display of the computing device, results from the identifying to the user, the results to include a list of behaviors including the first behavior; and receiving, via a user interface of the computing device, a selection from the user of at least one behavioral preference.

In one embodiment, a method includes: storing, in a memory (e.g., a memory of the developer server), a first application (e.g., the Ad Network Detector application) comprising computer-readable instructions, which when executed, cause a mobile device of a user to: determine components of a second application (e.g., BTController application) installed on the mobile device; identify at least one behavior associated with each of the components, including a first behavior associated with a first component (e.g., LeadBolt component); and determine at least one behavioral preference of the user; and sending, via at least one processor (e.g., microprocessor(s) of the developer server), over a communication network, the first application for storage in a data processing system (e.g., application marketplace 123) for subsequent installation from the data processing system onto the mobile device.

In one embodiment, the method further comprises communicating, via the at least one processor, with the first application after installation of the first application on the mobile device. In one embodiment, the data processing system comprises an application marketplace. In one embodiment, a network operator (e.g., Verizon or AT&T) controls the data processing system, and the mobile device is configured to operate with a cellular network operated by the network operator.

In one embodiment, a system (e.g., a developer server) comprises: at least one processor; and memory storing a first application, which when executed on a mobile device of a user, causes the mobile device to: determine components of a second application installed on the mobile device; identify at least one behavior associated with each of the components, including a first behavior associated with a first component; and determine at least one behavioral preference of the user; and the memory further storing instructions configured to instruct the at least one processor to send the first application to a data processing system (e.g., application marketplace 123) so that the first application can be later installed, over a communication network, on the mobile device from the data processing system.

In one embodiment, the instructions are further configured to instruct the at least one processor to communicate with the first application after installation of the first application on the mobile device.

In one embodiment, a method includes: communicating, via at least one processor (e.g., a processor of a software server), with an application (e.g., the Ad Network Detector application) executing on a mobile device of a user, the application identifying at least one behavior on the mobile device, the at least one behavior associated with each of a plurality of components of a plurality of other applications installed on the mobile device, and the at least one behavior including a first behavior associated with a first component; receiving at least one behavioral preference of the user from the mobile device, the at least one behavioral preference determined by the application based on input from the user; and storing, in a memory (e.g., storing in a database distributed among multiple database servers), the at least one behavioral preference.

In one embodiment, the method further comprises storing the at least one behavior. In one embodiment, the method further comprises receiving a query from an advertisement network, associated with the first component, the query requesting the at least one behavioral preference of the user. In one embodiment, the method further comprises receiving, from the mobile device, an identification of the first component; and running, via the at least one processor, the first component in an emulated environment to determine whether the first behavior is active.

In one embodiment, the method further comprises receiving a query regarding the at least one behavioral preference in order to determine conformance of a new application with the at least one behavioral preference. In one embodiment, the method further comprises providing information in response to a request, received over a communication network, in order to evaluate the at least one behavioral preference and determine how the first component is to behave on the mobile device.

Additional exemplary, non-limiting details regarding various implementations of the above embodiments are now described here below. In one example, a user may opt-out of specific components (e.g., as determined using the approaches described herein). The user is presented a list of components that the user can opt out of. The user may perform opt-out actions, or these may be done automatically upon user request or selection. Then, the user may see (e.g., on a display of a mobile device) a status indication that the user has opted out of identified components.

In one embodiment, there are various types of opt-out options. For example, a user may opt-out entirely of a component, opt-out of particular behaviors of a component, opt-in entirely to a component, opt-in to particular behaviors of a component, purge some or all data collected by a component, reset an identifier used to identify the user or device to a component, or otherwise modify the component's behavior on the device or the data transferred to or from the component on the device.

In one embodiment, opt-out options may be displayed to a user (e.g., on a display of a mobile device) using various approaches. In a first approach, this is done by detecting which components are present in installed applications on a mobile device, and then only displaying opt-out flows for the applications are installed on the mobile device. In a second approach, input is received from a user as to which behaviors the user wishes to opt out of. In a third approach, all possible opt-out flows, as determined from a database, are presented to the user.

In one embodiment, a user selects a degree of functionality within a range from minimum optional functionality to maximum optional functionality and a mobile device automatically translates that into actions to opt in and/or out of automatically-selected behaviors.

In one embodiment, a status for opt-out may be determined in various ways. A first way uses an API provided by the vendor or developer of the component to determine the opt-out status. A second way determines whether behavior is still active by running the corresponding component (e.g., in an emulated environment on a server or by monitoring behavior on the user's mobile device).

In one embodiment, a user declares preferences for specific behaviors desired on the user's mobile device. The components themselves evaluate these declared preferences in order to determine how the components should behave on the user's mobile device.

For example, the user may set its preferences, and then these preferences are stored locally or on a remote server (e.g., a developer server). A component queries these preferences (e.g., by sending a query) in order to determine how the component should behave (or is required to behave by the mobile device or another computing device).

In one embodiment, various types of preferences that can be set by the user relate to the following: location collection for targeted ads, notifications in a notification area of the user's device, planting of bookmarks or icons on a device, and app tracking used to deliver targeted ads (e.g., related to determining what apps a user has installed).

In one embodiment, various methods may be used for storing the users preferences. In a first approach, a local service on a device is used, whereby applications can query the local service to determine what preferences a user has set.

In a second approach, a server-side service permits ad networks to query a user's preferences based on a user identifier (e.g., phone number, IMEI, Android ID, Apple UDID, or hashed/salted-hashed versions of them).

In another embodiment, preferences are declared for which behaviors a user desires. Automatic scanning or alerting is performed when an application that violates these preferences is downloaded or installed.

For example, upon installation, the mobile device detects which components are in an application, and determines the behaviors that are associated with components of the application. If any of these behaviors are disallowed, or require an alert, the mobile device may either block the application from installing (or notify the user to uninstall the application), or may alert the user that the application contains a disallowed behavior in one of its components.

Now discussing additional non-limiting examples, there are various mechanisms that a user can use to express his or her intent. One example is an affirmative opt-in or opt-out for specific behaviors. For example, a user may say she does not want a specific component to track her location, or she does not want Google analytics to know certain information about her. Another might be that the user sets a preference indicating the desire that the user does not want any third party components to have access to or view the user's location data.

In another example, an application policy may be implemented. For any app that has a component that performs an unidentified behavior, the Ad Network Detector will block the app from being installed on the user's phone or other device. These are behavior-based preferences that are manifested in the prevention of installation for any applications that may contain components that express such behaviors.

In one example, when an application is running on a user's phone, it should ask a preference service or a preference store (e.g., implemented on a software developer server) what the preference is for the user and then respect that preference during execution. Information about user preferences for many users may be made available in a single online location so that a component can query and respect the preferences.

Regarding determining the components that are present in an application, the application can be identified and broken into components. After identification, there are various techniques that may be used to determine the behavior of those identified components. In some cases, structural comparisons of the call graphs of components in an application may be examined (e.g., determining which component is talking to the operating system of the mobile device, and which aspects of the operating system are involved). Other forms of static analysis may also be used that involve analyzing the code inside of a component. By analyzing the code, it can be determined whether the component can obtain a user's location, for example, or perform other functions. In one example, a knowledge base may be maintained that includes a list of components that are commonly distributed online and the corresponding behaviors of those components.

Also, dynamic analysis may be used, which is essentially running the application component in an emulated environment or on an actual device and detecting what is occurring (e.g., what services the component connects to or communicates with) on a computing device to determine whether a component has a particular behavior. Additional details regarding determination of components and component attribution are provided in the section below titled "Analyzing Components of an Application".

In one example, the user may be presented with a screen that shows the applications installed on the user's device or the behaviors on the device (or even the full set of all behaviors that are possible on the device, even outside of the apps that the user has already installed on the device) and what applications/components the behaviors are attributed to.

In one example, a user can opt out of specific components. The user may be shown which components are on already her phone, or the user can say she does not want a certain type of behavior, and the Ad Network Detector only shows the user the specific network opt-outs that involve that behavior.

In another example, the user has expressed her preferences regarding behavior. An online preference service stores these preferences, and components are required to query the service prior to installation on a mobile device of the user. The service may be implemented on the mobile device, or on a separate server.

Additional information regarding various non-limiting examples of mobile devices and their usage more generally, including the presenting of information regarding a mobile device to a user, is described in U.S. Pat. No. 8,538,815, issued Sep. 17, 2013, entitled "SYSTEM AND METHOD FOR MOBILE DEVICE REPLACEMENT," by Mahaffey et al.; U.S. patent application Ser. No. 13/960,585, filed 2013 Aug. 6 (which is a continuation of U.S. Pat. No. 8,538,815), now U.S. Pat. No. 8,635,109 issued Jan. 21, 2014, and is entitled "SYSTEM AND METHOD FOR PROVIDING OFFERS FOR MOBILE DEVICES"; and U.S. patent application Ser. No. 14/098,473, filed 2013 Dec. 5 (which is a continuation of U.S. patent application Ser. No. 13/960, 585), and is entitled "SYSTEM AND METHOD FOR GENERATING EFFECTIVE OFFERS TO REPLACE MOBILE DEVICES," the entire contents of which applications are incorporated by reference as if fully set forth herein.

Analyzing Components of an Application

Various additional embodiments related to component analysis and attribution (e.g., identifying and determining components of an application) are now set forth below. The embodiments below do not limit the generality of any embodiments in the foregoing description.

In one embodiment, an application is a mobile application, which contains one or more components (e.g., a library, ad network or analytics software development kit (SDK), or other set of code designed to work together). A component identity is information about a component. Examples of component identities include the following: a category (e.g. ad network, analytics, and malware SDK), authorship (e.g. Acme, Inc., John Smith), name of a component (e.g. "AdMob"), a range of versions or all versions of a component (e.g. AdMob 6.x, AdMob, zlib), and a particular version of a component (e.g. zlib 1.2.7, AdMob SDK 6.0.1). The data associated with a given component may be stored in a database.

In one embodiment, a component's behavior is generally that behavior existing or occurring (e.g., functions performed) when a component is functioning on a computing device (e.g., functioning in an application running on mobile device 149). One example of a behavior is the sending of certain types of data to a server (e.g., sending browser history to a server at www1.adcompany.com, or sending a location to a server at tracking.analyticscompany.net). Other examples include the following: accessing data on a computing device (e.g., contacts, call history); and performing certain functions on a device (e.g., changing brightness of a screen, sending a text message, making a phone call, pushing advertisements into a notification bar).

In one embodiment, a component's structure is how a component is implemented in code. This structure may include a code package and/or a code module structure. Also, a component's structure may include characteristics of the executable code of the component, such as for example, cross-references in a control flow/call graph, references to static data, and machine instructions used.

Various further embodiments related to component analysis are now described below. In a first embodiment, a non-transitory computer-readable storage medium stores computer-readable instructions, which when executed, cause a system to: for an application installed on a computing device (e.g., mobile device 149) of a user, determine components (e.g., components 104 and 106) of the application; and identify, via at least one processor, at least one behavior (e.g., sending device location to an ad server) associated with each of the components, including a first behavior associated with a first component. The instructions may cause the system to present, on a user display of the computing device, an identification of the components. The instructions may cause the system to determine at least one behavioral preference of the user.

In one embodiment, the instructions cause the system to store a user policy (e.g., user policy 108 or one of policies 116) based at least in part on the at least one behavioral preference (e.g., user intents expressed by the user on a mobile device), and to enforce the user policy on new applications installed on the computing device.

In one embodiment, the instructions cause the first component to execute in conformance with results from a query of an identity provider (e.g., the identity provider as described earlier above, or another computing device). The instructions may cause the system to, in response to installing the application, scan the application to confirm compliance with a user policy of the user, where the user policy is stored on the identity provider. In one embodiment, the instructions may cause the system to enforce, based on identified behaviors associated with the components, a user policy for each of the components.

The instructions may cause the system to compare permissible behaviors in the user policy for the components with the identified behaviors. In one example, the comparing of the permissible behaviors comprises determining behaviors, observed for the components on other computing devices, from a data repository (e.g., a database). The instructions may cause the computing device to, in response to the determining the behaviors from the data repository, configure or disable execution of one or more of the components on the computing device.

In one embodiment, a system includes: a data repository (e.g., a database) storing component data for known components, the component data including data for a first known component; at least one processor; and memory storing instructions, which when executed on a computing device, cause the computing device to: for a new component in a first application for a computing device of a user, perform a comparison of the new component to the component data; and based on the comparison, make a determination that the new component corresponds to the first known component.

In one embodiment, the instructions further cause the computing device to, in response to the determination, perform at least one of: comparing a first known behavior of the first known component to a user policy of the user; and comparing an observed behavior of the new component to the user policy. In one embodiment, the component data includes component identities, each component identity corresponding to respective identifying information for a known component. In one embodiment, the determination is made prior to installing the new component on the computing device.

In one embodiment, the instructions further cause the computing device to associate a similarity value (e.g., a value within an arbitrary range of zero to one) with the comparison, and wherein the determination is made in response to the similarity value being greater than a threshold value. In alternative embodiments other forms of comparison of the similarity value to a threshold may be done (e.g., where the similarity value is lower than the threshold). In one embodiment, the comparison is based at least in part on a structure of the new component, the structure selected from the group consisting of a packaging structure, a module structure, and an executable code structure.

In one embodiment, the component data includes known structural characteristics and known behavioral characteristics. In one embodiment, the performing the comparison comprises comparing the known structural characteristics and the known behavioral characteristics to identified characteristics of the new component.

In one embodiment, the instructions further cause the computing device to generate a notification when the identified characteristics are determined to differ from at least one of the known structural characteristics and the known behavioral characteristics. In one embodiment, the generating the notification comprises sending an alert to the computing device.

In one embodiment, a method includes: storing, in memory, component data for known components, the component data including data for a first known component; for a new component in a first application for a computing device of a user, perform, via at least one processor, a comparison of the new component to the component data; and based on the comparison, make a determination that the new component corresponds to the first known component.

In one embodiment, the new component is selected from the group consisting of code from the first application, and a library in the first application. In one embodiment, each of a plurality of different applications includes the new component, the new component corresponds to a set of behaviors when executed on a computing device, and the component data comprises behavioral data including the set of behaviors.

In one embodiment, the method further comprises associating the set of behaviors with the new component. In one embodiment, each of a plurality of computing devices has been observed when running a respective one of the different applications, and each of the plurality of computing devices exhibits the set of behaviors. In one embodiment, the determination is based in part on a context of operation of the new component on the computing device.

In one embodiment, the context is an accessing, during execution of the first application, of location information while the first application has a visible presence to a user (e.g., the first application is presenting location information to the user on a user display), and the set of behaviors includes determining a location of the computing device. In one embodiment, the component data includes a plurality of contexts each associated with at least one acceptable behavior. In one embodiment, the component data includes risk scores for known components, and the method further comprises providing a risk score in response to a query regarding an application installed or to be installed on the computing device of the user.

In one embodiment, a method comprises: storing, in memory, a first application comprising computer-readable instructions, which when executed, cause a mobile device of a user to: for a new component of a second application installed on the mobile device, perform a comparison of the new component to component data for known components, the component data including data for a first known component; and based on the comparison, make a determination that the new component corresponds to the first known component; and sending, via at least one processor, over a communication network, the first application for storage in a data processing system for subsequent installation from the data processing system onto the mobile device.

In one embodiment, a system includes: at least one processor; and memory storing a first application, which when executed on a mobile device of a user, causes the mobile device to: for a new component of a second application installed on the mobile device, perform a comparison of the new component to component data for known components, the component data including data for a first known component; and based on the comparison, make a determination that the new component corresponds to the first known component; and the memory further storing instructions configured to instruct the at least one processor to send the first application to a data processing system so that the first application can be later installed, over a communication network, on the mobile device from the data processing system.

Now discussing a component analysis process for one particular embodiment, a new application may be decomposed into identifiable components. An identity of each component may be displayed to the user. Behavioral and/or structural characteristics attributable to each component identity may be identified. The behavior for a given component may be displayed to the user.

A user policy (e.g., user policy 108) based on component behavior may be enforced on the user's computing device. For example, the user policy may require that there be no applications that send location to an advertising network. In another example, the user policy may require that no applications send identifiers to an advertising network.

Behavioral and/or structural characteristics of a component present in the new application may be identified. This may be, for example, an application 1013 that has been installed on mobile device 149.

A comparison is made between the characteristics attributable to the component identity and the characteristics that have been identified in the new application. In one embodiment, if the identified characteristics are different from the characteristics attributable to the component identity, then an alert is generated to indicate that the behavior of the component has changed. The characteristics attributable to the component identity may be stored in a database of the identity provider and may be accessed when making this comparison. For example, these attributable characteristics may be stored as component data associated with respective component identities (i.e., known data regarding component behavior or other characteristics of a component may be stored for each component identity).

Now, further detail regarding how component analysis is performed is described below. As mentioned above, an application is decomposed into identifiable components. In particular, a data repository stores a set of component identities in a database.

Each component identity has identifying information for a given component that, if present in an application, indicates that the given component is present in the application. Examples of identifying information include the following: a package name prefix for a set of one or more classes, a class name, or a code fingerprint of a code block, method, class, package, etc.

When used, fingerprinting can be performed in a variety of ways. A first way is the creating of an abstract representation of an instruction set. Another way is to, from an abstract representation, create a set of n-gram indices that can create a fingerprint identifier for a set of code (e.g., a hash of indices) or that can be compared to another set of indices to perform a fuzzy match. In yet another way, asset or resource fingerprinting may be used. As a final way, fingerprinting may be done by analyzing the network traffic generated by an application on a device or in a dynamic analysis system. Server communication, network traffic destined to a server, may be used to associate a component with a particular network service. Some examples of network traffic include traffic to server with name server1.somewhere.com, traffic to server with IP 8.8.8.8 or 2001:4860:4860::8888, HTTP request with header "User-Agent: MyHttpLibrary-1.1", HTTP request with a particular URI or URI pattern, and traffic that matches a SNORT or YARA rule.

Analysis of a new application can be used to determine if identifying information for a given component identity matches the new application. If it matches, then the given component is present in the new application. This analysis can be done at the client (e.g., mobile device 149), the server (e.g., the identity provider discussed above), or using a combination thereof.

In one embodiment, the analysis is done at one computing device (e.g., either on the client or the server). The database of identifying information is stored locally on the computing device. The new application is also present locally (e.g., the new application itself has been previously sent to the identity provider from mobile device 149, or from application marketplace or developer server prior to installation on mobile device 149).

In this embodiment, there are multiple options for analysis. In a first option, for each item of identifying information in the database, the new application is searched to determine if the identifying information matches the new application. Alternatively, information can be extracted from the new application, and then a check or comparison done to see if that information matches any of the identifying information stored in the database.

In another embodiment, a client submits information to a server to determine components that are present in an application. The database of component identifying information (known component data) is stored on the server. The application is present on the client. The client extracts information (e.g., component identifying information) from the application, and then sends this extracted information to the server.

The server checks to see if the extracted information matches any of the identifying information in the database (e.g., the extracted information may be received as a query from mobile device 149). If so, the server sends back information about component identities to the client (e.g., the server sends results from the query to mobile device 149).

In a different embodiment, the client submits an identifier for the new application to a server. This identifier may be, for example, a hash of the application binary code, a package name, a title of the application, or another form of application identifier. This server stores data regarding previously-analyzed applications. This data includes a list of components for each of the previously-analyzed applications. In yet other embodiments, the application information is gathered from an application store or marketplace, or from another device different from the client (e.g., where the application is not installed on a client, but is stored within an application store for downloading and installation, or is being staged for placement into an application store). Information from or about the application may be gathered from the application store or marketplace, or such other device. U.S. Publication No. 2012/0240236, filed 2010 Aug. 25, now U.S. Pat. No. 9,043,919 issued May 26, 2015, entitled "Crawling Multiple Markets and Correlating," is incorporated by reference as if fully set forth herein. U.S. Publication No. 2012/0240236 is a continuation-in-part of U.S. Pat. No. 8,533,844, entitled "System and Method for Security Data Collection and Analysis."

The server of the different embodiment above uses the identifier received from the client and compares this identifier to the data regarding previously-analyzed applications. If there is a match between the identifier and a previously-analyzed application, then the components for that matched application (obtained from the stored list of components above) are determined to be in the new application (and this result may be sent to the client). This matching to the database may be done similarly as was described earlier for the component analysis above. The server of the different embodiment above sends information about these identified component identities back to the client.

After a component has been identified as being present in an application, the identity of the component may be displayed to the user. For example, identification and display of components present in an application may be done similarly as was described above for the Ad Network Detector. Behavioral and/or structural characteristics that are attributable to a given component as stored in the database for various component identities may be sent from the server to the client for those components that have been identified as being present in an application.

In one embodiment, there are various ways to identify characteristics that are actually present in a component of an application. For example, U.S. Pat. No. 8,533,844, issued Sep. 10, 2013, and entitled "System and Method for Security Data Collection and Analysis", by Mahaffey et al.; U.S. patent application Ser. No. 13/958,434, filed 2013 Aug. 2, now U.S. Pat. No. 9,100,389 issued Aug. 4, 2015, entitled "ASSESSING A DATA OBJECT BASED ON APPLICATION DATA ASSOCIATED WITH THE DATA OBJECT"; and U.S. patent application Ser. No. 14/688,292, filed 2015 Apr. 16, now U.S. Pat. No. 9,344,431, issued May 17, 2016, entitled "System and Method for Assessing an Application Based on Data From Multiple Devices," which applications are incorporated by reference as if fully set forth herein, provide a general discussion about the gathering of information from an application on a mobile device for further processing at a server. According to this embodiment, information that has been gathered as described by Mahaffey et al. in U.S. Pat. No. 8,533,844 is then used for component analysis at the identity provider (discussed above) in order to identify characteristics of a component.

In another embodiment, behavioral characteristics may be determined or collected using other approaches. For example, behavior may be determined based on network traffic (e.g., SMS, IP) data, or based on the code source of a given behavior (e.g., a class name or a package name responsible for geo-locating, or a fingerprint of a code segment responsible for sending SMS traffic).

In one embodiment, component identity-attributable characteristics are compared to actually-present characteristics (e.g., as gathered for a new application just installed on a mobile device). For example, if behavior is part of the known data for a component identity, and a new application's component behavior matches this known behavior, then it is assumed that information about the component identity applies to the new application. Information about the component identity may include, for example, a text description, risk scoring, and data whether an application is malware or is not malware. For example, this information may be provided as a result or response to a query from a mobile device.

If the actual behavior and the known behavior for the component identity are different, this may indicate that the component in the new application is a newer version or a tampered-version, and that the component needs to be reviewed again in order to update the database. Also, an alert may be generated based on the component information determined above. For example, an email may be sent to an analyst to do further analysis of a component, or an entry may be created in a work queue regarding further component analysis to be done.

In various other embodiments, the results from component identification for applications on a device are presented to the user. The user may provide input in a user interface to define or update a user policy based on this component identification. For example, the user may opt-out of an identified component.

In another embodiment, a component review process is provided for reviewing potentially undesirable code at scale (where manual review is not practical). The component analysis as described above is automated so that a human is not required to do component analysis manually. Characterizing components that have been previously reviewed (e.g., stored as data for a component identity with a risk score) and determining when that component has changed behavior (i.e., the actual behavior is different from the known behavior stored in the component identity) can create an automated process where humans only need to re-review component code when its behavior has changed. A behavior change may also be associated with a code fingerprint having changed slightly (e.g., if doing a fuzzy match, there is a threshold for which it is considered that there is no change, and another threshold for which it is considered that that there is a sufficient change in behavior). In various embodiments a comparison to a threshold may be done to see if a value is lower or greater than the threshold (which may include the cases of equal to or lower, or equal to or higher than the threshold). Similarly, other characteristics disclosed can be used to determine if the component in the new application exactly matches the known component or if it partially matches in a way that merits re-analysis.

Yet another embodiment relates to behavioral risk analysis of applications. In this embodiment, the component analysis involves separating identified components that have already been reviewed (i.e., components that have known component data stored in a database), and that are common across numerous different applications (or across copies of the same application) as installed on many computing devices, from components that are unique (e.g., an associated behavior has not been observed before) to a particular new application (e.g., behavior unique to a single, most-recent installation on mobile device 149). These unique behaviors are specifically audited within the context of the new application (e.g., application 1013).

As an example of context, it is common for ad networks to ask for location data. This is a well-accepted behavior. If a user is looking, for example, at a game like Angry Birds, an application that asks for a location may be exhibiting acceptable behavior if this behavior is associated with an ad network that has been previously observed as being acceptable (e.g., as determined from data stored in a database). However, in other cases, actual game code that is itself asking for location may be inappropriate behavior.

The amount of code that is unique to any given application is typically fairly small. Most applications (e.g., for mobile devices) predominantly use code that is in at least one or many other applications (the majority of code in an application is typically not unique and there is a lot of commonality in code between applications).

Sometimes, when a behavior is analyzed in the context of a known SDK, the behavior is a repeatable behavior that has previously been determined to be acceptable (or to have a low risk score). Thus, for example, if a library has already been reviewed, then further analysis can be skipped.

In an embodiment regarding similarity of known and new applications, fuzzy matching and fingerprinting may be used (as was discussed above). For example, a similarity score of zero to one may be used. A similarity score is returned from the server after analysis of a new application. The code in the new application is compared to code that is already in the identified component library (e.g., a library in a database on an identity server).

Typically, there is not an exact code similarity match because there are many changes that a compiler can make to a particular application installation to make it different than other installations. Similarities are defined so that if the differences are over a similarity threshold, then a determination is made that a known component is present in the newly-installed application. For example, the new application may include a slightly-customized version of a component (that was previously determined to be acceptable). In alternative embodiments other forms of comparison to a threshold may be done (e.g., where a value is lower than the threshold). In other cases, the new application may include a new version of a component that has not been previously analyzed. In one embodiment, unacceptable code that has been only slightly modified to defeat similarity protection mechanisms is instead detected as unacceptable based on behavioral observation and component analysis as discussed above.

In one embodiment, components are analyzed with respect to similarity of previously known components. Behaviors can include use of personal identifying information or device information, or any actions that can be taken by applications on the device, including user interface displays, notifications, network communications, and file reading or writing actions. Policies to control or restrict the behavior of applications and their components may be defined and applied. This can include the identification of advertising networks and defining policies to permit various opt-out actions for these advertising networks.

Assessing Application Authenticity

Various embodiments related to assessing application authenticity are now set forth below. In one embodiment, a method includes: evaluating (e.g., by a server or a mobile device) authenticity of a first application (e.g., software being downloaded to a mobile device) to provide a result, where the evaluating uses a plurality of inputs. In response to the result, an action is performed on the computing device.

In one embodiment, the result is a determination of a source of software. In another embodiment, the result is a state designation that is sent to evaluation server 150 for use similarly as described above for the administrator state designation. State designations from the authenticity server 1005 and the administrator server may both be used by server 150 in its determination of the state designation to send to mobile device 149.

In one example, the evaluating may be done by a server for an application that a user of a mobile device desires to install from an application marketplace. In one embodiment, the computing device is a server, and the action is sending a notification from the server to the mobile device, the notification including an assessment of authenticity of the first application.

In one embodiment, the computing device is a mobile device on which the first application is being or has been installed, and the action is providing of a notification in a user interface of the mobile device relating to an assessment of authenticity of the first application. In an alternative embodiment, the application may have been previously installed on the mobile device, but the user desires an evaluation of authenticity (e.g., to consider whether to remove the application from the mobile device).

In one embodiment, one or more of the plurality of inputs may be received from a distributor of the first application, an online application store, a carrier/operator/device manufacturer (e.g., for preloaded software on a mobile device), and/or from a computing device within an enterprise or an organization's internal network.

In one embodiment, the computing device is a server (e.g., authenticity server 1005), and the first application has a first package identifier and a first signing identifier, the method further comprising receiving the first package identifier and the first signing identifier from a mobile device on which the first application is being or has been installed. The first package identifier may be, for example, an Android package name, an Apple IOS bundle identifier, or a hash of such name or identifier, etc. The first signing identifier may be, for example, a certificate (e.g., a signing certificate, digital certificate, etc.), a certificate thumbprint, or a public key, or a hash of a certificate, a hash of a public key, or other data which can be used to identify the signer. In one embodiment, the method further comprises receiving the first application itself from the mobile device (e.g., for testing or other operation for evaluation by the server).

In one embodiment, the plurality of inputs comprises receipt (e.g., from a computing device of a developer of the first application) of a developer signing certificate for the first application, and the evaluating comprises comparing the developer signing certificate to the first signing identifier.

In one embodiment, the plurality of inputs comprises one or more of the following: receipt, from a computing device, of an indication of ownership in the first application by a developer (e.g., a developer of known or assumed credibility simply makes an assertion or claim to ownership in an electronic communication); a prevalence of the first application (e.g., the application is the most popular version that has been distributed and this version is assumed to be authentic); and a model (e.g., a model to predict expected characteristics associated with a first application and/or to assess observed behavior or characteristics for the first application). In one embodiment, the first application has a first signing identifier, and the plurality of inputs comprises a history of the first signing identifier.

In one embodiment, the method further comprises comparing a first signing identifier of the first application to a signing key in a registry of known signing keys. In one embodiment, the registry comprises a plurality of package identifiers, each identifier associated with a respective one of the known signing keys, and the method further comprises comparing a first package identifier of the first application to the plurality of package identifiers.

In one embodiment, the result from the evaluating is a score, and the performing of the action is conditional on the score exceeding a threshold (or other alternative forms of comparison to the threshold).

In one embodiment, the evaluating comprises: identifying a plurality of applications that are similar to the first application (e.g., using component analysis as discussed above); classifying the similar applications, based on a respective signing identifier for each application; and identifying, based on the classifying, applications having a signing identifier of a developer, and applications having a signing identifier that is different from the signing identifier of the developer.

In one embodiment, the method further comprises sending a notification to a computing device of the developer that identifies the applications having the signing identifier that is different from the signing identifier of the developer.

In one embodiment, the identifying the plurality of applications that are similar to the first application comprises identifying applications having at least one of an identical package identifier, code similarity, identical strings, similar strings, identical media assets, and similar media assets. In one embodiment, a server determines the similarity of newly-observed applications to a previously known-to-be authentic application (e.g., stored in a database at the server). In one example, this determination includes component analysis (e.g., comparison of known and new components) and/or application/component/code similarity assessment as was discussed earlier above. In another example, the server can notify the developer of the authentic application, or challenge the developer to authenticate itself as the actual application signer for the newly-observed application(s).

In one embodiment, the method further comprises receiving the signing identifier of the developer, sending data to the developer to be signed by the developer with a private key, receiving the signed data from the developer, and confirming the signed data corresponds to the signing identifier of the developer. For example, the data sent to the developer may be an archive or a nonce, or the data may be for the issuing of a crypto-based challenge to the developer.

In yet another embodiment, the first application may be examined in the context of known business entity databases (e.g., Equifax database, Dun & Bradstreet database, etc.) or other information sources, and information obtained from such sources may be used as one or more of the plurality of inputs in the evaluating of the first application. For example, these inputs may include: the company name as determined from a WHOIS response; the name of an owner of the IP space that the first application talks to (e.g., an inquiry can be made as to who owns the application server that the first application communicates with); the response to an inquiry as to whether the package name for the first application corresponds to a valid organizational domain name, and further whether that domain name's WHOIS name shows up in a business database; and the developer name as determined in an online application store such as Google Play.

In one embodiment, authenticity is assessed by a method in which mobile device 149 of a user communicates with authenticity server 1005 to evaluate the authenticity of new application 1013, for example which is being newly-installed on the mobile device (or alternatively has already been installed), according to one embodiment. In other embodiments, some or all of the authenticity functions described for authenticity server 1005 may be performed by an identity server.

Authenticity server 1005 receives from mobile device 149 a package identifier and a signing identifier associated with new application 1013. Authenticity server 1005 uses a plurality of inputs, such as are described herein, to evaluate the authenticity of new application 1013. This evaluation provides a result, for example a score indicating the risk of the new application being inauthentic. Based on this result, an action is performed by authenticity server 1005. If the score is above a threshold, the application may be deemed as being untrusted, or a state designation of untrusted may be sent to server 150.

In one example, this action is the sending of a notification to a mobile device 149 in order to alert the user that the new application 1013 may be fraudulent or a tampered version. New application 1013 may have been provided, for example, to application marketplace 123 or directly to mobile device 149, by developer server, along with a signing certificate. The developer server also provides a package identifier for new application 1013. The signing certificate of the developer server is one form of signing identifier that may be provided to authenticity server 1005 for evaluation of application 1013.

Authenticity server 1005 has a database 1007 for storing information and data regarding applications, such as previously known or identified applications that are considered to be authentic. The authentic developer or other source of the application is stored in database 1007. Database 1007 further may include component data 1009, which corresponds to information about software components as was discussed earlier above. Database 1007 further may include repository 1003, which stores package identifiers and corresponding signing identifiers, for example such as collected or identified for previously authentic, known-good, or deemed good applications.

The evaluation of authenticity may alternatively be performed in part or fully on mobile device 149. If an inauthentic application is discovered, then the user of mobile device 149 may be notified on a display of a user interface. This notification may include an assessment of the authenticity of the new application 1013.

In one embodiment, authenticity server 1005 compares a signing certificate of the developer from the developer server to an existing signing identifier contained in repository 1003. Authenticity server 1005, in one example, compares this signing certificate to a known, good signing key stored in repository 1003.

Various other non-limiting embodiments are now described below. In a first embodiment, authenticity server 1005 has a registry of known application signing keys and the package names they are registered for. If an application pretends to own one of those package names with a different signing key, a user is alerted that the application is likely tampered with. In some cases, authenticity server 1005 may also use similarity detection (e.g., similarity analysis as was discussed earlier above) to determine that, even if an application has a different package name, it is highly similar to another previously-known application, but has a different signer.

In one embodiment, all applications are identified that are similar to a given application (e.g., where the given application is being newly-installed on a mobile device). One or more of the following inputs may be used in evaluating the new application: whether applications have the same package name, code similarity between the applications, similar or identical strings (especially strings that occur infrequently) between new and known applications, and similar or identical media assets (e.g., images, sounds, video, etc.) between new and known applications. In some embodiments, similarity and/or component analysis as was discussed above may be used.

In one embodiment, applications that have been determined to be similar (e.g., as described above) are classified based on signing certificates, which are used to classify applications into two groups: applications with a given developer signing certificate, and applications with a different signing certificate. This classification is used for one or more of the following: identifying potentially pirated applications (e.g., for copyright enforcement); identifying potentially malicious applications; optimizing a sales strategy (e.g., such as identifying additional markets where an application could be sold); and managing release processes (e.g., identifying versions of an application that are sold in different markets).

In one embodiment, a workflow for establishing ownership of a signing certificate includes: a developer or other user uploads the certificate, then receives download of a jar (or Java archive), which the developer must sign to prove that it has the private key corresponding to the certificate. In one embodiment, the workflow is extended to allow a developer to manage multiple signing certificates.

In one embodiment, a workflow for discovering applications, based on proof of certificate ownership includes: a developer or other user proves certificate ownership, then authenticity server 1005 finds all packages signed with the same certificate, and also identifies similar applications, signed both by the same certificate and other certificates. In one embodiment, the workflow is extended to allow a developer to manage multiple signing certificates.

In an alternative embodiment, authenticity server 1005 provides monitoring and security services to Android or other system developers. These services determine developer identification (to confirm that the developer is who it purports to be). The services may include monitoring tools and/or anti-piracy functions. If the developer's application has been pirated and is being distributed in different markets, authenticity server 1005 notifies the developer.

The services may also include brand protection. For example, a bank may want to know if a version of its application has been pirated and is being misused for phishing. In one embodiment, the services include looking at actual software assets being used in applications (e.g., logos, images, etc.) to determine if they are being used in non-sanctioned manners. Application assessments and/or reports for the above services may be provided to a brand owner, developer, or other entity. In another example, a vendor of application components (e.g., such as advertising SDKs, sensor activity SDKs, etc.) may want to know if a version of its components are being used in an application. In one embodiment, the services include looking at application components being used in applications (libraries, SDKs, components, etc.) to determine that they are being used in sanctioned or non-sanctioned manners. Application assessments and/or reports for the above services may be provided to a vendor or developer or distributor of such application components or other entity.

In one embodiment, an assessment of privacy is provided by the services. This includes analyzing potential privacy issues in the application. Authenticity server 1005 may generate a privacy policy for the developer based on permissions provided by the developer. In one embodiment, a security assessment is provided by the services. Authenticity server 1005 analyzes potential security vulnerabilities and provides recommendations to the developer or other entity.

In one embodiment, the services above permit a developer to develop a good reputation. For example, an application/developer certification may be provided to a user after an evaluating of authenticity of an application. For example, a seal of approval or other visual indication may be provided in a user interface display for this purpose to indicate to a user that an application is authentic. The services above may be supported by analysis of application components as described above (e.g., when providing piracy or brand protection).

Additional information regarding various non-limiting examples of analyzing, characterizing, and/or scoring applications with respect to security is described in previously-published U.S. Patent Publication No. 2011/0047594, published Feb. 24, 2011, now U.S. Pat. No. 9,367,680, issued Jun. 14, 2016, entitled "System and Method for Mobile Communication Device Application Advisement," by Mahaffey et al., and also in previously-published U.S. Patent Publication No. 2013/0263260, published Oct. 3, 2013, entitled "System and Method for Assessing an Application to be Installed on a Mobile Communication Device", by Mahaffey et al., the entire contents of which applications are incorporated by reference as if fully set forth herein.

In particular, U.S. Patent Publication No. 2013/0263260 describes a system that checks for harmful behavior of an application to be installed on a mobile device. A server computer receives from the mobile device data pertaining to the application to be installed and information pertaining to the mobile device. The server processes the data and information to determine an assessment for the application to be installed. The assessment is provided to the mobile device and the assessment is displayed on the device if the assessment is one of dangerous and potentially dangerous. The data and information received from the mobile device may be used, for example, as one or more inputs in the plurality of inputs for evaluating the first application as described herein.

Also, in particular, U.S. Patent Publication No. 2011/0047594 describes a system for providing advisement about applications on mobile devices such as smartphones, netbooks, and tablets. A server gathers data about mobile applications, analyzes the applications, and produces an assessment that may advise users on a variety of factors, including security, privacy, battery impact, performance impact, and network usage. The disclosure helps users understand the impact of applications to improve the experience in using their mobile device. The disclosure also enables a server to feed information about applications to other protection systems such as application policy systems and network infrastructure. The disclosure also enables advisement about applications to be presented in a variety of forms, such as through a mobile application, as part of a web application, or integrated into other services via an API. The data gathered by the server may be used, for example, as one or more inputs in the plurality of inputs for evaluating the first application as described herein. Also, some of the forms of advisement discussed may be used, for example, in providing notifications to the user and/or to developers or others regarding evaluations of software authenticity.

Additional information regarding various non-limiting examples of some analytic methods for determining application behavior is described in U.S. patent application Ser. No. 14/063,342, filed Oct. 25, 2013, now U.S. Pat. No. 9,642,008, issued May 2, 2017, entitled "System and Method for Creating and Assigning a Policy for a Mobile Communications Device Based on Personal Data," by Timothy Micheal Wyatt, the entire contents of which application is incorporated by reference as if fully set forth herein. For example, one or more of the methods for determining behavior may be used when evaluating application authenticity as described herein.

Additional information regarding various non-limiting examples of security evaluation and scoring relating to a plurality of trust factors is described in U.S. patent application Ser. No. 14/072,718, filed Nov. 5, 2013, published as U.S. Pub. No. 2014/0325586 on Oct. 30, 2014, now U.S. Pat. No. 9,307,412 issued Apr. 5, 2016, entitled "Method and System for Evaluating Security for an Interactive Service Operation by a Mobile Device," by Derek Halliday, the entire contents of which application is incorporated by reference as if fully set forth herein. For example, some of the trust factors may be used as inputs when evaluating application authenticity.

In one specific example, the context in which a signing certificate or other signing identifier or signing is observed is assessed using factors which may include one or more trust factors as described in U.S. patent application Ser. No.

14/072,718 above. These factors may, for example, be used in formulating a score that is compared to a threshold that is used to make a decision whether to perform an action in response to evaluating an application (e.g., various forms of comparison to the threshold may be used, as described previously).

In particular, U.S. patent application Ser. No. 14/072,718 describes a method for evaluating security during an interactive service operation by a mobile device that includes launching, by a mobile device, an interactive service configured to access a server over a network during an interactive service operation, and generating a security evaluation based on a plurality of trust factors related to a current state of the mobile device, to a security feature of the application, and/or to a security feature of the network. When the security evaluation is generated, an action is performed based on the security evaluation. In some examples, these actions may be performed in response to the result from an evaluation of application authenticity.

In another embodiment, the first application is evaluated to determine its components and/or to identify behaviors associated with each of the components. This evaluation may provide some or all of the plurality of inputs used in the evaluating of the first application as was discussed above. In one embodiment, the components of the first application can be analyzed regarding similarity to previously-known components when assessing authenticity of the first application.

Behaviors associated with one or more components of the first application may include, for example, use of personal identifying information or device information, or any actions that can be taken by applications on the device, including user interface displays, notifications, network communications, and file reading or writing actions. In one embodiment, the evaluating of the first application may include analysis of components of the first application as described in the section above titled "Analyzing Components of an Application" (and also further optionally include analysis of components in other applications being compared to the first application).

In one embodiment, the first application above is a mobile application, which contains one or more components, such as were discussed previously above. The source of the components is indicated by a component identity. In one example, the component identity is an authorship (e.g., an identification of a developer of the first application), or the name of a component. Previously collected data associated with a given component may be stored in a database (e.g., as was discussed above).

In one embodiment, as discussed in more detail below, for a first application being installed on mobile device 149, components are identified and behaviors exhibited on mobile device 149 are attributed to one or more of the components. Any given component may be present in several different applications on mobile device 149 and/or may be common to numerous copies or versions of an application that have been installed on computing devices for large numbers of other users. In one embodiment, this commonality of component presence permits observing and collecting structural and behavioral data associated with the component. This known component data is stored in a database (e.g., database 1007 discussed above) and the component data is associated with a particular component identity. Thus, a data repository of prior component data can be used to compare to data more recently obtained for new components (such as those identified in newly-installed applications on a mobile device) when evaluating authenticity of the first application being installed.

More specifically, as characteristics and behaviors associated with components on mobile device 149 are identified and attributed, these characteristics and behaviors may be compared with known characteristics and behaviors stored either locally on mobile device 149 or stored remotely on authenticity server 1005 in database 1007. The results from such comparisons may be used as inputs for the evaluating of the first application being installed (e.g., for making decisions regarding disabling of one or more particular components that are being considered for a new installation on the mobile device).

In one embodiment, behavioral and/or structural characteristics of a component present in the first application may be identified (e.g., as was discussed in the section titled "Analyzing Components of an Application" above). This may be, for example, an application that is being installed on mobile device 149 and for which the user desires to determine if the application is from an authentic source (e.g., a known developer of an earlier or related version of the new application).

A comparison is made between the characteristics attributable to a component associated with the first package identifier and characteristics that have been identified in the new application. In one embodiment, if the identified characteristics are different from the characteristics associated with the first package identifier, then an alert is generated to indicate that the new application is not authentic. The characteristics associated with the first package identifier may be stored in a database of authenticity server 1005 and may be accessed when making this comparison (alternatively, the characteristics may be stored in a database and/or the comparison made or supported by an identity provider). For example, these attributable characteristics may be stored as component data associated with respective component identities.

Each component identity has identifying information for a given component that, if present in an application, indicates that the given component is present in the application. Examples of identifying information include the following: a package name prefix for a set of one or more classes, a class name, or a code fingerprint of a code block, method, class, package, etc.

Analysis of a new application being installed can be used to determine if identifying information for a given component identity matches the new application. If it matches, then the given component is present in the new application. This analysis can be done at the client (e.g., mobile device 149), the server (e.g., authenticity server 1005 or an identity provider), or using a combination thereof. This match that determines presence of the component in the new application can be used as an input in evaluating authenticity of the new application.

In a different embodiment, the client submits an identifier for the new application to a server (e.g., authenticity server 1005). This identifier may be, for example, a hash of the application binary code, a package name, a title of the application, or another form of application identifier. This server stores data regarding previously-analyzed applications. This data includes data associated with each component of a set of components for each of the previously-analyzed applications.

The server uses the identifier received from the client and compares this identifier to the data regarding previously-analyzed applications. If there is a match between the identifier and a previously-analyzed application, then the components for that matched application (obtained from the stored set of component data above) are determined to be in the new application. This result may be sent to the client. Also, this result may be used as one of the plurality of inputs in evaluating the application. In one example, this matching is done similarly as was described earlier above for the component analysis on a single device. The server sends information about these identified component identities back to the client (e.g., a notification that a new application is not authentic, or a score indicating the risk of a fraudulent application).

If the actual behavior and the known behavior for the component identity are different, this may indicate that the component in the new application is either a newer version or a tampered-version (i.e., is not authentic), and that the component needs to be reviewed again in order to update the database. Also, an alert may be generated based on the component information determined above. For example, an email may be sent to an analyst to do further analysis of a component, or an entry may be created in a work queue regarding further component analysis to be done. In another example, a notification is sent to the developer of a prior, known-good version of an application (e.g., to alert the developer that a fraudulent version of the application was identified).

Yet further additional non-limiting embodiments and examples are now discussed below. In a first embodiment, a developer registers through a website and provides its signing key. The developer claims authorship of a given application. An application that is signed with this key is considered to be authored by the developer. If the same application is signed by a different person or entity, then authenticity server 1005 alerts the developer that another entity is potentially illegitimate.

In one embodiment, authenticity server 1005 implements an authenticity component and a response component. An application is evaluated by the authenticity component and the result from the authenticity component is acted upon by the response component.

The authenticity component is a data set that may include a plurality of inputs used for evaluating an application. For example, these inputs may include that a developer signs an application, the prevalence of an application, the context or environment in which the application is observed, and a history of the signing key or certificate associated with an application.

The output from this evaluation may be a score such as, for example, 0.4 or 0.6 on a scale of 0.0-1.0. This multi-input authenticity component model provides a result that is acted upon by the response component. In one embodiment, the score is used to make a decision to set a state designation for an application to trusted or untrusted.

Another embodiment is based on probability, in which it is assumed that the most popular version of a given application is the legitimate one. Another embodiment assumes that the application that is published in Google Play, or another legitimate application store, is the legitimate or authentic one.

If another version of that same application is signed by a different person, then one of the applications is authoritative and the other is not. Authenticity server 1005 alerts the user the mobile device as to whether a version being installed is authentic.

In one embodiment, there are various ways to determine the authentic version of several versions of an application being distributed. In some cases the most popular version of an application may not be the authentic version of the application. Thus, a collection of factors are used from the exemplary inputs provided above (e.g., whether the application is published in the Google Play store, what is the context of the observation of the application, does the application have good online reviews over an extended predetermined time period, such as for example more than 6 months, etc.).

In one embodiment, the history of usage of a signature is considered as an input. For example, if a signing key is used to sign an application that authenticity server 1005 knows is bad, then if that same key signs other applications, those applications can also be assumed to be bad. This is like a signer reputation. If the signer is connected to prior suspicious activity, then the signer itself can be flagged as suspicious, and this fact considered in evaluating authenticity.

Another input may be the signing of different applications that authenticity server 1005 knows are provided from different developers. Another input is that the applications may communicate with different servers in different parts of the world—this indicates that one of the applications is not authentic and/or that there are potentially different developers.

In one embodiment, the first appearance of a signed application indicates authenticity. For example, the first person to sign and package that application is considered or assumed to be the authentic author. Authenticity server 1005 may have a huge network of devices (e.g., greater than 10,000 or 1 million devices) that report all the applications that they see. Therefore, presumably the legitimate application appears first as stored in database 1007. For example, the first time that the server sees an application, it will take the signature on that application and consider it to be the authentic signature.

In one embodiment, another input is the number of stars or other rating level that an application gets in Google Play or another store. For example the application may have been in a store for at least a predetermined time period (e.g., at least one or two years) and have a good rating. If the application has at least a predetermined number of ratings, for example, 300,000 ratings, and a star value over a given level, then the application is likely a legitimate version of the application.

In one embodiment, the longevity of the key is an input. The longevity may be a weighted user distribution based on time period and number of users. For example, if the application is observed for a year, but with very little users, that is a negative input. However, in contrast, having a million users over a year is a positive sign.

In one embodiment, various inputs are provided into a black box model used in authenticity evaluation. The inputs may include, for example, the signing key as registered by the developer itself, the usage history of a signing key, a history-weighted time of first appearance, an appearance in certain reputable application stores, a signing key used to sign applications that are substantially different, applications that talk to substantially different servers, applications that have substantially different code bases, and two applications that are signed and appear under different developer names in an authoritative marketplace such as Google Play.

In one embodiment, there are different interfaces provided for different users to provide information from authenticity server 1005 about the result from the evaluation of the authenticity. For the user (e.g., user of a mobile device), there may just be a warning provided (e.g., a popup that states that an application is not authentic). An alternative is a notice that indicates (e.g., an authentication seal that appears in the lower right-hand corner of a window) to the user that this is an authentic application. As one example, a user is presented and sees an authentication seal when a banking application is being installed by the user on its mobile device.

Closing

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible or non-transitory machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
receiving, from prior computing devices, data regarding prior software associated with the prior computing devices;
storing, in a database, the data regarding the prior software;
receiving, by a first computing device, a request from a second computing device other than the prior computing devices, wherein the request is for access by the second computing device to a service provided by a third computing device, wherein the third computing device is separate from the first computing device;
in response to receiving the request, performing, by the first computing device, an evaluation of the second computing device, wherein the evaluation comprises determining a source of first software on the second computing device by comparing the first software to the prior software using the stored data in the database, and further comprises determining a security state of the second computing device, the security state including a risk level, and the security state based on the source of the first software;

generating, by the first computing device based on the evaluation, a token for the second computing device, the token comprising first data encoding the risk level; and sending the token to at least one of the second computing device or the third computing device, wherein the first data is used to configure the service provided to the second computing device.

2. The method of claim 1, wherein the service provided to the second computing device is configured by the third computing device according to the security state of the second computing device.

3. The method of claim 2, wherein the security state is determined by the third computing device based at least on the risk level determined from the evaluation by the first computing device.

4. The method of claim 2, further comprising receiving data from security software on the second computing device, wherein the security state of the second computing device is determined at least using the data received from the security software.

5. The method of claim 2, wherein the third computing device is configured to grant, deny, or limit the access to the service based on the security state of the second computing device.

6. The method of claim 1, wherein the access requires authorization by a fourth computing device of an identity provider, and wherein the evaluation is based at least in part on data received from the fourth computing device.

7. The method of claim 1, further comprising sending a communication to a fourth computing device of an identity provider, wherein the communication indicates the risk level, and wherein access to the service requires authorization by the fourth computing device.

8. The method of claim 1, wherein an extent of access to the service provided to the second computing device is based on the risk level.

9. A system comprising:
at least one processor of a first computing device; and
memory storing instructions configured to instruct the at least one processor to:
receive a request from a second computing device, wherein the request is for access by the second computing device to a service provided by a third computing device, wherein the third computing device is separate from the first computing device;
in response to receiving the request, perform an evaluation of the second computing device, wherein the evaluation comprises:
determining a source of software on the second computing device by identifying first components of the software, and comparing the first components to second components of software associated with prior installations made on computing devices other than the second computing device, and
generating data regarding a security state of the second computing device, the security state based at least in part on the source of the software;
send at least a first portion of the data regarding the security state to a fourth computing device of an identity provider, wherein the fourth computing device is configured to authenticate the second computing device using the first portion of the data;
receive, from the fourth computing device, an authentication of the second computing device; and
in response to receiving the authentication, send at least a second portion of the data regarding the security state to the third computing device, wherein the second portion of the data is used by the third computing device to configure the service provided to the second computing device.

10. The system of claim 9, wherein the instructions are further configured to instruct the at least one processor to receive data from the fourth computing device, and wherein the evaluation is based at least in part on the data received from the fourth computing device.

11. The system of claim 9, wherein the software on the second computing device is used to access the service.

12. The system of claim 9, wherein the third computing device is configured to set the security state for the second computing device to have access to the third computing device.

13. The system of claim 9, wherein the instructions are further configured to instruct the at least one processor to:
periodically perform subsequent evaluations of the second computing device to determine updated security states of the second computing device; and
send data regarding the updated security states to the third computing device, wherein the third computing device is configured to change a level of access to the service based on one or more of the updated security states.

14. The system of claim 9, wherein the instructions are further configured to instruct the at least one processor to:
after the second computing device has started receiving the service, perform a subsequent evaluation of the second computing device to determine an updated security state of the second computing device; and
send a communication regarding the updated security state to the third computing device, wherein the third computing device is configured to, in response to receiving the communication, terminate access to the service or decrease a level of access to the service.

15. The system of claim 9, wherein data extracted from one or more communications received from the third computing device is used in performing the evaluation.

16. The system of claim 9, wherein data extracted from one or more communications received from the fourth computing device of the identity provider is used in performing the evaluation.

17. The system of claim 9, wherein the second components are stored in a database of the identity provider.

18. The system of claim 9, wherein comparing the first components to the second components is supported by the identity provider.

19. A non-transitory computer-readable storage medium storing instructions, which when executed, cause a first computing device to:
receive a request from a second computing device, the request for access by the second computing device to a service provided by a third computing device, wherein the third computing device is separate from the first computing device;
in response to receiving the request, perform an evaluation of the second computing device, wherein the evaluation comprises determining a source of software on the second computing device by comparing behavior of the software with behavior of similar software previously installed on computing devices other than the second computing device, and determining a risk level based on the source of the software;

generate, based on the evaluation, a token for the second computing device, the token comprising first data encoding the risk level; and sending the token to the second computing device, wherein the token is used by the second computing device to configure the service provided by the third computing device.

20. The non-transitory computer-readable storage medium of claim 19, wherein the instructions further cause the first computing device to:

perform a subsequent evaluation of the second computing device;

determine, based on the subsequent evaluation, that an updated risk level of the second computing device exceeds a threshold; and in response to determining that the updated risk level exceeds the threshold, revoke the token.

21. The non-transitory computer-readable storage medium of claim 19, wherein the second computing device accesses the service over a network, and wherein the evaluation is based at least in part on a security feature of the network.

* * * * *